(12) United States Patent
Suzuki

(10) Patent No.: US 7,924,475 B2
(45) Date of Patent: Apr. 12, 2011

(54) IMAGE READING APPARATUS

(75) Inventor: Nobuhiko Suzuki, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 988 days.

(21) Appl. No.: 11/741,365

(22) Filed: Apr. 27, 2007

(65) Prior Publication Data

US 2007/0257422 A1 Nov. 8, 2007

(30) Foreign Application Priority Data

Apr. 27, 2006 (JP) ................................. 2006-124470

(51) Int. Cl.
*H04N 1/04* (2006.01)
*B65H 29/20* (2006.01)

(52) U.S. Cl. .................. 358/474; 358/498; 271/3.14

(58) Field of Classification Search .................. 358/474, 358/486, 494, 496, 498, 1.2, 505, 521, 408, 358/497; 399/16, 364, 373, 374, 71, 367, 399/406, 363, 365, 368, 379; 271/3.01, 3.08, 271/3.14

See application file for complete search history.

(56) References Cited

U.S. PATENT DOCUMENTS

| | | | |
|---|---|---|---|
| 5,339,139 A | 8/1994 | Fullerton et al. | |
| 5,438,435 A * | 8/1995 | Lawniczak | 358/496 |
| 6,038,424 A * | 3/2000 | Nakagawa | 399/367 |
| 6,081,687 A | 6/2000 | Munemori et al. | |
| 6,522,860 B2 * | 2/2003 | Nose et al. | 399/374 |
| 6,785,485 B2 * | 8/2004 | Kamimura | 399/71 |
| 7,547,017 B2 * | 6/2009 | Mizubata et al. | 271/265.03 |
| 2005/0082747 A1 * | 4/2005 | Tamura et al. | 271/184 |
| 2006/0071393 A1 * | 4/2006 | Mizubata et al. | 271/10.01 |

FOREIGN PATENT DOCUMENTS

| | | |
|---|---|---|
| JP | 07-191502 | 7/1995 |
| JP | 09-307701 | 11/1997 |
| JP | 8-085649 | 4/1999 |
| JP | 11-177747 | 7/1999 |
| JP | 2000-089524 | 3/2000 |
| JP | 2005-239361 | 9/2005 |

OTHER PUBLICATIONS

Office Action from corresponding JP Application No. 2006-0124470 dated May 7, 2008.

* cited by examiner

*Primary Examiner* — Jerome Grant, II
(74) *Attorney, Agent, or Firm* — Banner & Witcoff, Ltd.

(57) ABSTRACT

An image reading apparatus includes: a first feed path; a second feed path; a detection unit; a feed system; an image read unit; a feed path switching unit; a drive source; a drive force transmission unit; a control unit that has a first feed mode that feeds a document from the first feed path to a document discharge portion and a second feed mode that feeds a document from the first feed path to the second feed path, and shifts a current feed mode from the second feed mode to the first feed mode; and an image modification unit that modifies the image read by the image read unit based on drive loss information acquired with regard to a drive loss of the drive force transmission unit occurring at the time of switching of the feed mode by the control unit.

14 Claims, 46 Drawing Sheets

IMAGE READING APPARATUS

CROSS-REFERENCE TO THE RELATED APPLICATION

This application is based upon and claims priority from prior Japanese Patent Application No. 2006-124470 filed on Apr. 27, 2006, the entire contents of which are incorporated herein by reference.

TECHNICAL FIELD

Illustrative aspects of the present invention relates to an image reading apparatus which includes a document feeder called an automatic document feeder (ADF) and reads, in the process of document feeding, images of a document at a given scan point.

BACKGROUND

In the prior art, in an image reading apparatus which is used in a copier, a scanner, a multi-function apparatus having a copying function and a scanning function, or similar apparatus, the image reading apparatus includes an automatic document feeder (ADF) which feeds a document from a sheet feed tray to a sheet discharge tray through a feed path. In order to read both the first and second sides of a document of which images are printed, a document feeder bidirectionally feeds the document while it is being fed, to thereby reverse the leading and trailing ends of the document and thus scan both sides of the document (for example, see JP-A-8-85649).

FIG. 45 is a typical view of a feed path used in a existing document feeder capable of scanning (reading) both sides of a stack of documents. As shown in FIG. 45, a stack of documents P placed on a sheet feed tray 100 with the first side (first page) thereof facing upward is fed to a feed path 102 by a sheet feed roller 101. In the feed path 102, the document P is fed to feed rollers 103 which are disposed properly according to this situation. When the document P passes through a scanning position X, the first side of the document P is scanned by an image read unit such as a CCD or a CIS. When a sensor detects the trailing end of the document P after the first side thereof is scanned, sheet discharge rollers 104 are caused to stop in a state where the sheet discharge rollers 104 nip the vicinity around the trailing end of the document P.

As shown in FIG. 46, the reversible rollers 104 reverse the transfer direction of the nipped document P to a return path 105. The document P is fed from the return path 105 again to a side upstream of the scanning position X. As a result, the leading and trailing ends of the document P are reversed. Then the document P is fed by the feed rollers 103, and while being passing through the scanning position X, the second side of the document P is scanned by the image read unit. When a sensor detects the trailing end of the document P after the second side of the document P is scanned, the sheet discharge rollers 104 are again stopped in a state where the vicinity around the trailing end of the document P is nipped. Afterwards, the document P is sent back along the return path 105. When the document P is moved from the return path 105 again into the feed path 102, the document P is held in a state where the leading and trailing ends of the document P are reversed once more, that is, the first side of the document P is opposed to the scanning position X. The document P is transferred along the feed path 102 and is discharged into a sheet discharge tray 106 with the first side thereof facing downward. As a result, both the first and second sides of the document P are scanned and the document P is discharged to the sheet discharge tray 106 in the order that the sheets of the document P were stacked on the sheet feed tray 100.

The sheet feed roller 101, feed rollers 103, and sheet discharge rollers 104 are rotated in given directions by being transmitted with a drive force from a motor. The sheet feed roller 101 and feed rollers 103 are always rotated in one direction, that is, in a direction to feed the document P from upstream to downstream of the feed path 102. On the other hand, the sheet discharge rollers 104 are rotated in both forward and backward directions to carry out a switchback feed. For example, as shown in FIG. 46, when the document P is nipped between the feed rollers 103 and sheet discharge rollers 104, it is necessary that a document feed direction of feed rollers 103 and a document feed direction of the sheet discharge rollers 104 are coincident with each other. In addition, when the document is nipped by the feed rollers 103 on the immediate upstream side of the scanning position X and the sheet discharge rollers 104, it is necessary that a document feed direction of the feed rollers 103 and a document feed direction of the sheet discharge rollers 104 are coincident with each other. Therefore, for example, a motor to drive the feed rollers 103 and a motor to drive the sheet discharge rollers 104 are separately provided, the feed rollers 103 are always rotated in one direction, and sheet discharge rollers 104 are switched in the rotating direction at a given timing. In addition, an electromagnetic clutch is provided so as to transmit drive to the sheet feed roller 101, the feed rollers 103, the sheet discharge rollers 104, etc., from a single motor and cut drive force to rollers uninvolved in feeding of the document P at a predetermined timing.

SUMMARY

Illustrative aspects of the invention relate to a document feeder which is capable of feeding a document for double-sided scanning and capable of discharging a document without damage or jam, even when a size of the document cannot be applied to the double-sided scanning.

Additional aspects of the invention relate to an apparatus that can improve the quality of scan images being scanned in the process of feeding thereof when a long-sized document that cannot be applied to double-sided scanning is fed.

Additional aspects of the invention relate to an image reading apparatus including: a first feed path connected to a document discharge portion from a document placement portion via a scan point; a second feed path whose one end is connected to the first feed path at a connecting position on a feed-direction downstream side of the scan point; a detection unit that is provided a given distance to a feed-direction upstream side from the connecting position and that detects a presence or absence of a document; a document feed unit provided at least on the first feed path; an image read unit that scans an image of a document fed by the document feed unit at the scan point; a feed path switching unit that is provided at the connecting position and that switches a document feed path to either the second feed path or to a document discharge path which leads to a document discharge portion; a drive source that is controlled so as to be rotary-drivable in both forward and backward directions and that applies a drive force to at least the document feed unit and the feed path switching unit; a drive force transmission unit that transmits a drive force to switch the document feed path to the document discharge path side from the drive source to the feed path switching unit based on a one-direction rotation of the drive source, transmits a drive force to switch the document feed path to the second feed path side from the drive source to the feed path switching unit based on an other-direction rotation of the drive source, and transmits a document-feed-direction drive force irrespective of the rotation direction of the drive source; a control unit that has a first feed mode that feeds a document from the first feed path to the document discharge portion by rotating the drive source in one direction and a second feed mode that feeds a document from the first feed path to the second feed path by rotating the drive source in the other direction, and switches a current feed mode from the second feed mode to the first feed mode by controlling the rotation direction of the drive source based on a detection result by the detection unit during image reading of the document fed in the second feed mode; and an image modification unit that modifies the image scanned by the image read unit based on drive loss information acquired with regard to a drive loss of the drive force transmission unit occurring at a time of switching the current feed mode by the control unit.

BRIEF DESCRIPTION OF THE DRAWINGS

These and other aspects of the present invention will be made more fully apparent from the following detailed description taken in conjunction with the accompanying drawings, in which.

DETAILED DESCRIPTION

In the description that follows, various connections are set forth between elements in various examples of overall structures. The scanner should understand that these connections in general, and unless specified otherwise, may be direct or indirect, and that this specification is not intended to be limiting in this respect.

Various examples of apparatuses and methods in accordance with the invention will be described below with reference to the appended drawings. While the invention is described primarily in terms of "document", this skilled in the art will appreciate, of course, that aspects and features of the invention may be used in conjunction with a wide variety of feeding systems and methods, including systems and methods for feeding other sheet type materials, such as plastics (e.g., transparencies), fiber materials, metals, flexible sheets, and the like.

Figure 1:
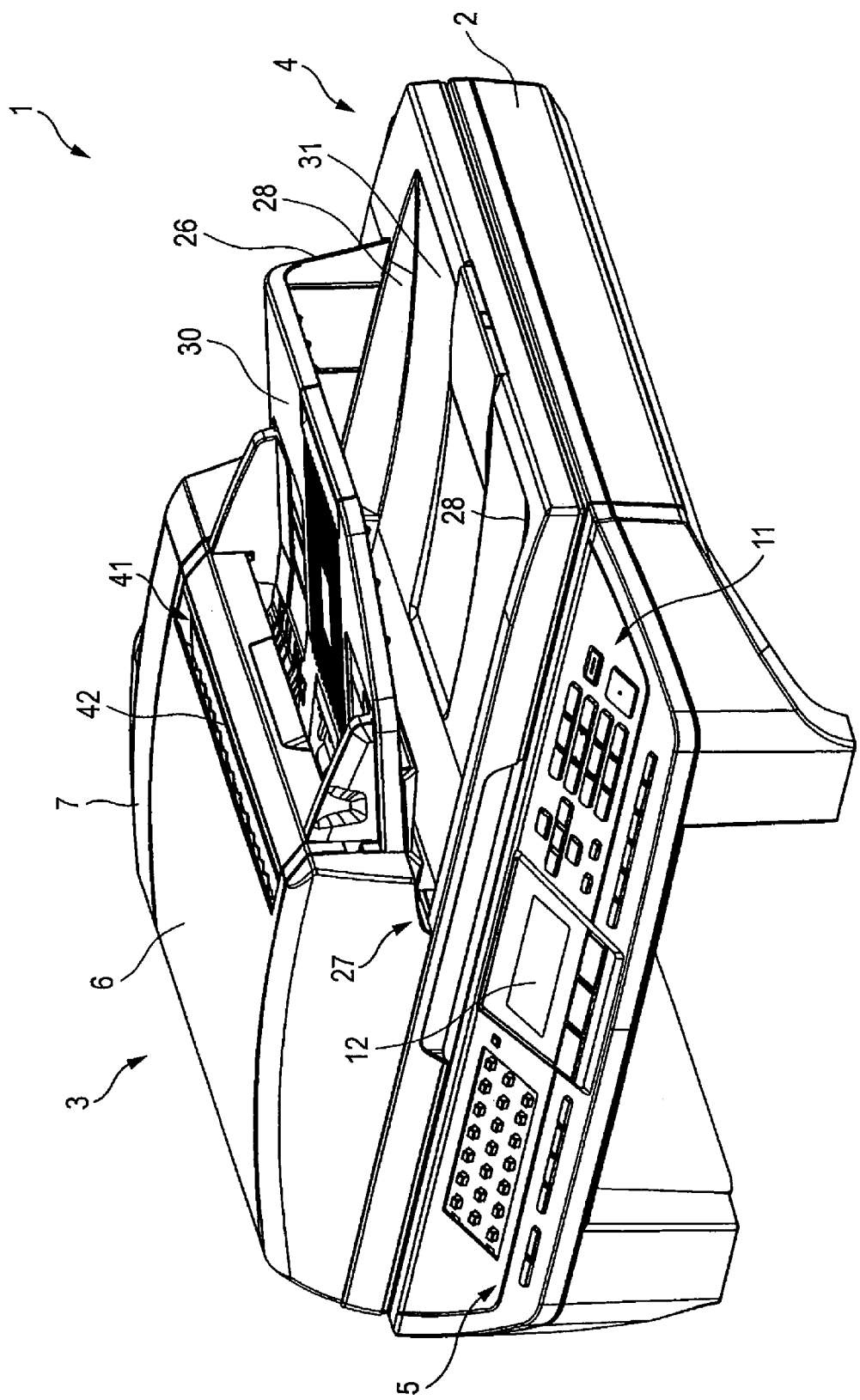
FIG. 1 is a perspective view showing the external structure of an image reading apparatus according to an aspect of the present invention.
Figure 2:
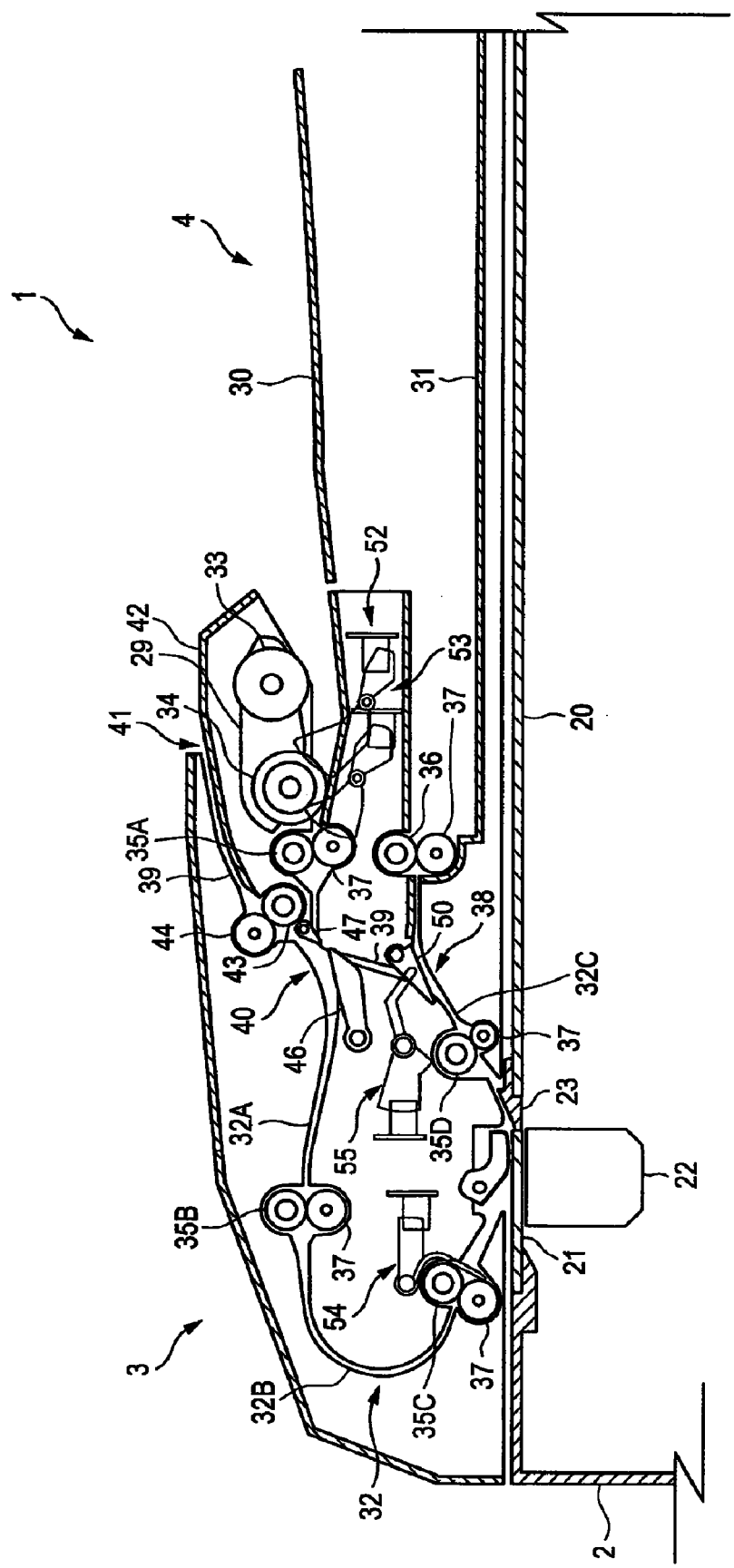
FIG. 2 is a sectional view showing the internal structure of the image reading apparatus.

FIG. 1 shows the configuration of the image reading apparatus 1 according to an illustrative aspect of the invention. FIG. 2 shows the configuration of the main interior portions of the image reading apparatus 1. The present image reading apparatus 1 can be realized as an image read part which has a scanner function integrated therewith and used to scan the images of a document, for example, in a copying machine, a facsimile, a scanner apparatus, and a multi-function device (MFD) having an integrated scanner function.

As shown in FIGS. 1 and 2, the present image reading apparatus 1 is structured such that a document cover 4 including an ADF 3 functioning as an automatic document feed mechanism is openably and closably mounted on a document placement base member 2 functioning as a flatbed scanner (FBS) through hinges provided on the back surface side (on the rear side in the depictions of the FIGS. 1 and 2). The ADF 3 corresponds to a document feeder according to an aspect of the invention.

An operation panel 5 is disposed on the front side of the document placement base member 2. The operation panel 5 includes various operation keys 11 and a liquid crystal display part 12. A user can input a desired instruction using the operation panel 5. For example, the input of "Start" showing the commencement of reading a document and "Stop" showing the termination of such scanning, as well as the choice of a simplex scanning mode or a duplex (double-sided) scanning mode can be carried out using the operation keys 11. On receiving these given inputs, the image reading apparatus 1 carries out a given operation. The image reading apparatus 1 can also be operated by instructions other than the instructions inputted to the operation panel 5. The image reading apparatus 1 can also be connected to a computer and thus can be operated by instructions which are transmitted thereto from the computer through a printer driver, a scanner driver, or the like.

As shown in FIG. 2, on the document placement base member 2, and more specifically, on the top surface thereof facing the document cover 4, there are disposed platen glass members 20, 21. When the document cover 4 is opened, the platen glass members 20, 21 are exposed as the top surface of the document placement base member 2. When the document cover 4 is closed, the whole of the top surface of the document placement base member 2 including the platen glass members 20, 21 is covered by the document cover 4. In the interior of the document placement base member 2, there is incorporated an image read unit 22 in such a manner as to be opposed to the platen glass members 20, 21.

The platen glass member 20 is a member on which a document can be placed when the image reading apparatus 1 is used as an FBS. For example, the platen glass member 20 may be composed of a transparent glass plate. In the center of the top surface of the document placement base member 2, there is formed an opening from which the platen glass member 20 can be exposed, whereby the area of the platen glass member 20 that is exposed from the opening provides a document scan area in the FBS.

The platen glass member 21 functions as a scan point when the ADF 3 of the image reading apparatus 1 is used, and as an example, may be composed of a transparent glass plate. In the scan point of the document placement base member 2, there is formed an opening from which the platen glass member 21 can be exposed. The platen glass member 21 exposed from the opening is extended in the depth direction of the image reading apparatus 1 correspondingly to the length in the main scanning direction of the image read unit 22.

A positioning member 23 is interposed between the platen glass members 20 and 21. The positioning member 23 is a long flat-plate-shaped member which is extended in the depth direction of the image reading apparatus 1 similarly to the platen glass member 21. When a document is placed onto the platen glass member 20 serving as the document placement surface of the FBS, the positioning member 23 is used as the positioning reference of the document. For this purpose, on the top surface of the positioning member 23, there are disposed indications for indicating the position of the center as well as the positions of the two ends of various document sizes such as A4 size and B5 size. On the top surface of the positioning member 23, there is further formed a guide surface by which a document passing on the platen glass member 21 by the ADF 3 can be scooped up and deflected and also can be then returned to the ADF 3.

The image read unit 22 is an image sensor which radiates the light from a light source onto the document through the platen glass members 20, 21, gathers the reflected light from the document onto a light receiving element, and converts the light to an electric signal. The image read unit 22 can be formed of, for example, a close-contact type image sensor (CIS) or a charge coupled device (CCD) of a reduction optical system. The image read unit 22 is disposed such that it can be moved back and forth below the platen glass members 20, 21 by a belt drive mechanism functioning as a scanning mechanism. On receiving the drive force of a carriage motor, the image read unit 22 can be moved back and forth parallelly to the platen glass members 20, 21.

The document cover 4 includes the ADF 3 which successively feeds a document from a sheet feed tray 30 (a document placement portion) through a document feed path 32 to a sheet discharge tray 31 (a document discharge portion). In the feed process that is carried out by the ADF 3, the document passes through the scan point on the platen glass member 21 and the images of the document can be scanned by the image read unit 22 which is located below the platen glass member 21.

As shown in FIGS. 1 and 2, on the document cover 4, there are disposed the sheet feed tray 30 and sheet discharge tray 31 in respective upper and lower stages, with the sheet feed tray 30 being situated in the upper stage. On the sheet feed tray 30, there can be placed a document the images of which are to be scanned by the ADF 3. Two or more sheets of documents are placed onto the sheet feed tray 30 in such a manner that they are piled on top of one another with the first sides thereof facing upward and the leading ends thereof in the sheet feed direction are inserted into the document feed path 32. The apparatus back surface side of the sheet feed tray 30 is curved downward to thereby form a protection wall 26. The lower end of the protection wall 26 is connected to the top surface of the document cover 4. When the document cover 4 is opened with respect to the document placement base member 2, the protection wall 26 prevents the document on the sheet discharge tray 31 from falling down. Downward from the apparatus front surface side of the sheet feed tray 30, there is formed a cutaway portion 27 in a part of the body of the ADF 3. This cutaway portion 27 enhances the visibility of the document from the apparatus front surface side when the document is discharged to the sheet discharge tray 31. Especially, a document of a small size is generally difficult to see due to the sheet feed tray 30. The cutaway portion 27 creates a space between the sheet feed tray 30 and sheet discharge tray 31 to thereby be able to enhance the visibility of a document, especially, that of a small-sized document.

The output tray 31 is positioned at a vertical distance from the lower side of the sheet feed tray 30, and is made integral with the upper face of the document holding cover 4 Therefore, the document is held, as it is discharged from the ADF 3, on the sheet discharge tray 31 such that its first side is directed downward while being separated from any other documents on the sheet feed tray 30. The two side portions 28 of the sheet discharge tray 31, which are respectively composed of the apparatus front surface side and apparatus back surface side of the sheet discharge tray 31, are formed as slanting surfaces which gradually rise upwardly toward a respective side. When the documents discharged to the sheet discharge tray 31 are to be removed therefrom, while holding the documents from above, the documents can be slid along the slanting surfaces of the two side portions 28 and can be taken out. The two side portions 28 facilitate removal of the documents from the sheet discharge tray 31.

Inside of the ADF 3, as shown in FIG. 2, the document feed path 32, which is generally U-shaped in a longitudinally sectional view, is formed to connect the sheet feed tray 30 and the sheet discharge tray 31. This document feed path 32 of the members forming the ADF body and the guide plates is formed into a continuous passage of a predetermined width for the document to pass therethrough. Specifically, the document feed path 32, which is generally U-shaped in the longitudinally sectional view, extends from the sheet feed tray 30 to one end side of the document cover 4 (i.e., the left hand side of the drawing), continuously curves to turn downward to the scanning position of the platen glass plate 21 and extends from the scanning position to the sheet discharge tray 31.

The document feed path 32 is extended from the sheet feed tray 30 toward one end side (in FIG. 2, toward the left side) of the document cover 4, and is curved downward in a reversing manner to reach the scan point on the platen glass member 21, and also extended from the scan point toward the sheet discharge tray 31, whereby the longitudinal section view of the document feed path 32 has a substantially U-like shape facing sideways. The document feed path 32 is mainly composed of three portions, an upper portion 32A and a lower portion 32C which respectively constitute the straight line portions of the upper and lower stages forming the substantially U-like shape, and a curved portion 32B curved in such a manner so as to connect the upper and lower portions 32A and 32C. The document feed path 32 is used as a common document feed path through which the document can be fed by the ADF 3 not only when the images of one side of the document are scanned, but also when the images of both sides of the document are scanned.

The document feed path 32 includes a feed system for feeding documents existing on the sheet feed tray 30 to the document feed path 32 and a document feed unit for feeding the documents from the sheet feed tray 30 to the sheet discharge tray 31. In detail, as shown in FIG. 2, the feed unit is composed of a pick-up roller 33 and a separation roller 34 respectively provided in the document feed path 32, whereas the document feed unit is composed of feed rollers 35A, 35B, 35C, 35D, a sheet discharge roller 36, and respective pinch rollers 37 to be pressure contacted with the feed rollers 35A, 35B, 35C and 35D. A drive force is transmitted from a single motor 67 (a drive source; see FIG. 6) to the respective rollers that constitute the feed unit and the document feed unit. Here, a drive force transmission mechanism that transmits the drive force of the motor 67 to the respective rollers will be described later.

As shown in FIG. 2, the pickup roller 33 and separation roller 34 are provided in the vicinity of the most upstream portion of the document feed path 32. The separation roller 34 is freely rotatably provided on the leading end portion of an arm 29 having its base end side pivotally supported on a shaft 111 (see FIG. 12) which pivotally supports the separation roller 34. The separation roller 34 is rotatably provided at a position spaced from the pickup roller 33 in the sheet feed direction in such a manner that it is in contact with an opposed surface of the document feed path 32. The pickup roller 33 and separation roller 34 are driven and rotated when the drive force from the motor 67 (see FIG. 6) is transmitted thereto, and the arm 29 is also moved up and down when the drive force from the motor 67 is transmitted thereto. The pickup roller 33 and separation roller 34 have the same diameter and are rotated at the same peripheral speed. At an opposite position of the separation roller 34, there is disposed a separation pad which pressure-contacts a roller surface of the separation roller 34 to separate the document by means of friction.

The feed rollers 35A, 35B, 35C and 35D are respectively disposed at different positions in the document feed path 32. According to the present aspect, the feed roller 35A is disposed on the immediate downstream side of the separation roller 34, the feed roller 35B is disposed in the upper portion 32A of the document feed path 32, the feed roller 35C is disposed on the immediate upstream side of the scan point in the lower portion 32C of the document feed path 32, and the feed roller 35D is disposed on the immediate downstream side of the scan point in the lower portion 32C of the document feed path 32. This arrangement is given as an example, and the number and arrangement of the feed rollers 35A, 35B, 35C and 35D can be changed while still maintaining the spirit and scope of the invention.

At respective positions opposing the feed rollers 35A, 35B, 35C and 35D, there are disposed the pinch rollers 37. The shafts of the pinch rollers 37 are respectively elastically energized by their associated springs, whereby the pinch rollers 37 are respectively pressure contacted with the roller surfaces of the feed rollers 35A, 35B, 35C and 35D. When the feed rollers 35A, 35B, 35C and 35D are rotated, the pinch rollers 37 pressure contacted with these rollers are also rotated to follow the feed rollers. The pinch rollers 37 respectively press the document against the feed rollers 35A, 35B, 35C and 35D to thereby transmit the rotation forces of the feed rollers 35A, 35B, 35C and 35D to the document.

The sheet discharge roller 36 is disposed in the neighborhood of the furthest downstream portion of the document feed path 32, and similar to the feed rollers 35A, 35B, 35C and 35D, when the drive force from the motor is transmitted to the sheet discharge roller 36, the sheet discharge roller 36 is driven and rotated. At the opposite position of the sheet discharge roller 36, there is also disposed a pinch roller 37, which is elastically energized by a spring and is thereby pressure contacted with the sheet discharge roller 36.

A bidirectional feed path 39 (corresponding to a second feed path of the present invention) is connected to the lower portion 32C of the document feed path 32. The bidirectional feed path 39 is connected to a connecting position 38 downstream of the feed roller 35D of the lower portion 32C. The bidirectional feed path 39 is a path which, when scanning both sides of the document, reverses the leading and trailing ends of a document with the first side thereof having scanned at the scan point and then feeds again the document from the portion of the document feed path 32 downstream from the scan point to the portion of the document feed path 32 upstream from the scan point. The bidirectional feed path 39 is extended obliquely upward from the connecting position 38 toward the upper side of the sheet feed tray 30, and crosses the upper portion 32A of the document feed path 32. The document, which has been switchback-fed from a crossing position 40 between the upper portion 32A and bidirectional feed path 39, is then returned back to the document feed path 32.

A terminal end 41 of the bidirectional feed path 39 is opened on the top surface of the ADF 3. On the side of the sheet feed tray 30 that extends from the terminal end 41 of the bidirectional feed path 39, there is formed a document support portion 42 in such a manner that it continues from the terminal end 41. The document support portion 42 is used to support the document projected from the terminal end 41 of the bidirectional feed path 39, and forms an upper cover 6 (see FIG. 1) of the ADF 3 on the upper side of the sheet feed roller 33 and separation roller 34. The upper cover 6 is formed so as to cover the whole of the ADF 3 including the sheet feed roller 33 and separation roller 34, while being able to be opened and closed with respect to a frame of the ADF 3. The document support portion 42, which is formed as a portion of the upper cover 6, is extended from the terminal end 41 toward the sheet feed tray 30 up to the upstream side of a sheet feed position to which the documents are fed by the sheet feed roller 33 and separation roller 34. Accordingly, in the double-sided scanning operation, a portion of the document which has entered the bidirectional feed path 39 and is projected from the terminal end 41 outwardly from the ADF 3 is supported by the document support portion 42, and thus the document does not hang down to the downstream side (in FIG. 2, the left side) of the sheet feed position of the documents stacked on the paper feed tray 30, so that disturbance of the document at the sheet feed position is prevented. Also, when the upper cover 6 is opened, the document feed path 32 and bidirectional feed path 39 within the ADF 3 are exposed in part, thereby enabling execution of a maintenance operation such as a jam removing operation.

As shown in FIG. 2, on the side of the bidirectional feed path 39 that extends to the terminal end 41 from the crossing position 40, there is disposed a switchback roller 43. When a drive force is transmitted thereto from the motor 67 (see FIG. 6), the switchback roller 43 is driven and rotated in both forward and backward directions. A pinch roller 44 is arranged at a position opposing the switchback roller 43. Because a shaft of the pinch roller 44 is elastically energized by an unillustrated spring, the pinch roller 44 is pressure contacted with a roller surface of the switchback roller 43, and as the switchback roller 43 is rotated, the pinch roller 44 is rotated to follow the switchback roller 43. The pinch roller 44 pressure-contacts the document against the switchback roller 43, whereby a rotation force of the switchback roller 43 is transmitted to the document. The switchback roller 43 and pinch roller 44 cooperate together in realizing a switchback feed unit which switchback-feeds the document.

In the present aspect, the bidirectional feed path 39 connected to the connecting position 38 on the downstream side of the scan point of the document feed path 32 is made to cross the upper portion 32A of the document feed path 32, and the switchback roller 43 is provided at the terminal end 41 side from the crossing position 40, however, the feed path of the bidirectional feed path 39 can have any feed path, and the feed path of the bidirectional feed path can be appropriately changed as long as it is connected to a given position on the downstream side of the scan point, and returns, with the leading and trailing ends of a document reversed, the document from the portion of the document feed path 32 downstream from the scan point to the portion of the document feed path 32 upstream from the scan point.

Figure 3:
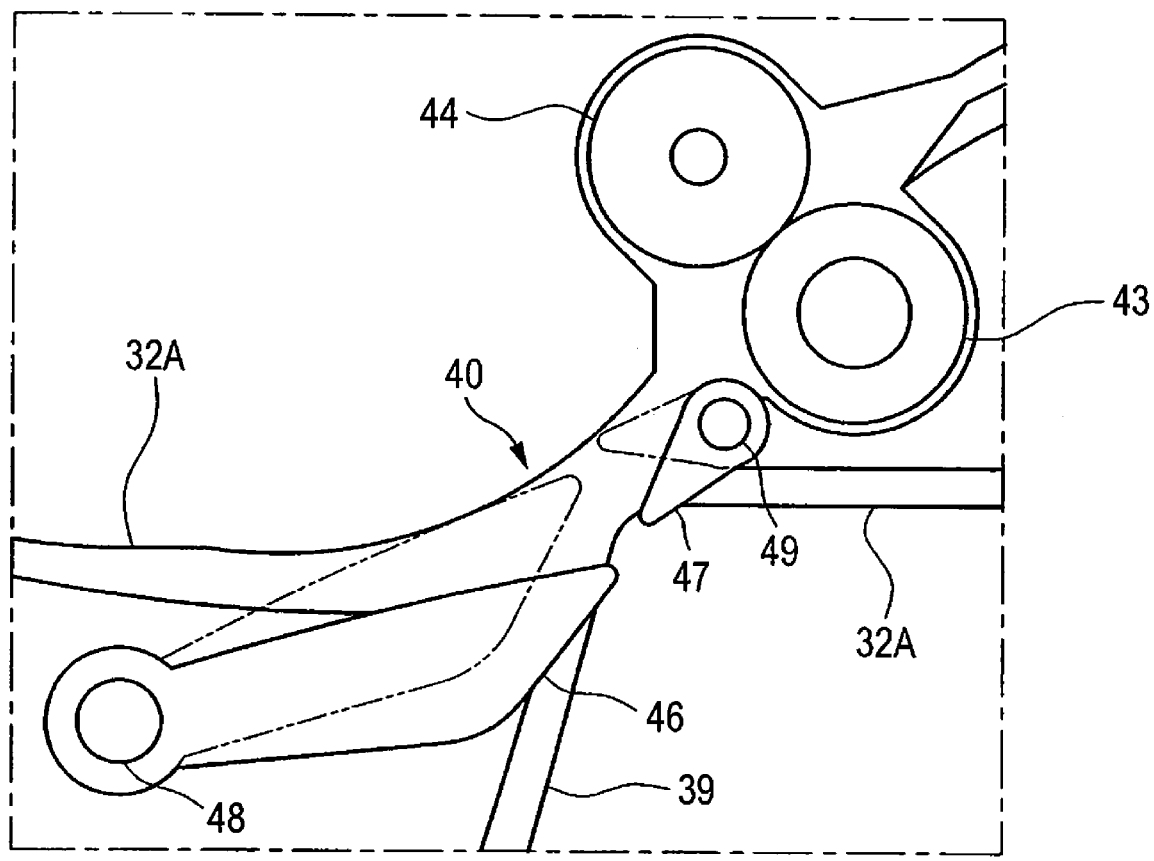
FIG. 3 is an enlarged view showing the structure of a crossing position.

FIG. 3 is an enlarged view showing the structure in the neighborhood of the crossing position 40. As shown in FIG. 2 and FIG. 3, a guide flap 46 and a guide flap 47 which are used to guide a document to a desired feed path are disposed in the crossing position 40. The guide flap 46 is disposed such that it can be rotated in a given range about a shaft 48 provided at a corner portion (in FIG. 3, the lower left side) between the scan point side of the document feed path 32 and the connecting position 38 side of the bidirectional feed path 39 in the crossing position 40. The guide flap 46 is composed of a vane-shaped flat plate and the leading end of the guide flap 46 is projected into the crossing position 40. In FIG. 3, there is shown only one guide flap 46. However, a plurality of guide flaps 46 may be disposed having the same shape at given intervals in the width direction of the document feed path 32 (in FIG. 3, in the figure sheet vertical direction, or in the apparatus depth direction), and the guide flaps 46 are rotated integrally.

The guide flap 46 changes its position to a third guiding position shown by a solid line in FIG. 3 and a fourth guiding position shown by an alternating long and two short dashed line as a result of rotating about the shaft 48. The guide flap 46 is, for example, when it is contacted with a guide member provided in the document feed path 32 or in the bidirectional feed path 39, restricted from rotating downward in FIG. 3 from the third guiding position and rotating upward in FIG. 3 from the fourth guiding position. When the guide flap 46 reaches the third guiding position, the feed path from the sheet feed tray 30 side (in FIG. 3, the right side) of the document feed path 32 to the scan point side (in FIG. 3, the left side) is allowed to be continuous, and at the same time, the feed path from the document feed path 32 to the connecting position 38 side (in FIG. 3, the lower side) of the bidirectional feed path 39 is closed. Accordingly, the document, which has arrived at the crossing position 40 from the sheet feed tray 30 side of the document feed path 32, is allowed to advance to the scan point side of the document feed path 32 and is restrained from entering the connecting position 38 side of the bidirectional feed path 39. Also, a document having arrived at the crossing position 40 from the terminal end 41 side (in FIG. 3, the upper side) of the bidirectional feed path 39 is allowed to enter the scan point side of the document feed path 32 and is restrained from moving to the connecting position 38 side of the bidirectional feed path 39.

When the guide flap 46 reaches the fourth guiding position, the feed path extending from the connecting position 38 side of the bidirectional feed path 39 to the terminal end 41 side is allowed to be continuous, and at the same time, the feed path extending from the connecting position 38 side of the bidirectional feed path 39 to the scan point side of the document feed path 32 is closed. Accordingly, the document, which has arrived at the crossing position 40 from the connecting position 38 side of the bidirectional feed path 39, is allowed to advance to the terminal end 41 side of the bidirectional feed path 39, whereas it is restrained from advancing to the scan point side of the document feed path 32.

The switching of the feed path by the guide flap 46 is achieved by the contact of the document with the guide flap 46. The guide flap 46 is normally held at the third position shown by the solid line in FIG. 3, due to its own weight or due to the energizing force of an elastic member such as a spring. When the document being delivered from the connecting position 38 toward the crossing position 40 along the bidirectional feed path 39 is contacted with the guide flap 46, the guide flap 46 is rotated in such a manner that it is pushed aside upwardly in FIG. 3 and reaches the fourth position shown by the alternating long and two short dashed line in FIG. 3. On the other hand, the document being delivered from the terminal end 41 side of the bidirectional feed path 39 to the crossing position 40 is contacted with the guide flap 46, but since the guide flap 46 is restricted from rotating downward in FIG. 3 from the third guiding position, the document is guided by the guide flap 46 to advance to the scan point side along the upper portion 32A of the document feed path 32. As for the vane shape of the guide flap 46, there is employed a shape which not only can easily change the position of the guide flap 46 when it is contacted by the document being delivered from the connecting position 38 side of the bidirectional feed path 39 to the crossing position 40, but also allows the document being delivered from the terminal end 41 side of the bidirectional feed path 39 to the crossing position 40 to be easily guided to the scan point side of the document feed path 32. In this manner, when the guide flap 46 is formed such that it is able to change its position due to the contact of the document with the guide flap 46, it is not necessary to change the position of the guide flap 46 positively by applying a drive force from the motor 67, which makes it possible to realize the guide flap 46 with a simple structure.

Now, the guide flap 47 is disposed in such a manner that it can be rotated in a given range about a shaft 49 provided in a corner portion (in FIG. 3, the upper right side) between the sheet feed tray 30 side of the document feed path 32 and the terminal end 41 side of the bidirectional feed path 39 at the crossing position 40. The guide flap 47 is composed of a flat plate having a vane-like shape, while the leading end of the guide flap 47 is projected into the crossing position 40. In FIG. 3, there is shown only one guide flap 47. However, a plurality of guide flaps 47 may be disposed having the same shape at given intervals in the width direction of the document feed path 32, and the guide flaps 47 are rotated integrally.

The guide flap 47 changes its position to a fifth guiding position shown by a solid line in FIG. 3 and a sixth guiding position shown by an alternating long and two short dashed line as a result of rotating about the shaft 48. The guide flap 47 is, for example, when it is contacted with a guide member provided in the document feed path 32 or in the bidirectional feed path 39, restricted from rotating rightward in FIG. 3 from the fifth guiding position and rotating upward in FIG. 3 from the sixth guiding position. When the guide flap 47 reaches the fifth guiding position, not only is the feed path extending from the terminal end 41 side of the bidirectional feed path 39 to the scan point side of the document feed path 32 allowed to be continuous, but also the feed path extending from the connecting position 38 side of the bidirectional feed path 39 to the sheet feed tray 30 side of the document feed path 32 is closed. Accordingly, the document, which has arrived at the crossing position 40 from the terminal end 41 side of the bidirectional feed path 39, is allowed to advance to the scan point side of the document feed path 32, whereas the document is restrained from advancing to the sheet feed tray 30 side. Also, the document having arrived at the crossing position 40 from the connecting position 38 side of the bidirectional feed path 39 is allowed to advance to the terminal end 41 side of the bidirectional feed path 39, whereas the document is restrained from advancing to the sheet feed tray 30 side of the document feed path 32.

When the guide flap 47 reaches the sixth guiding position, not only is the feed path from the sheet feed tray 30 side of the document feed path 32 to the scan point side allowed to be continuous, but also the feed-path from the sheet feed tray 30 side of the document feed path 32 to the terminal end 41 side of the bidirectional feed path 39 is closed. As a result, the document, which has arrived at the crossing position 40 from the sheet feed tray 30 side of the document feed path 32, is allowed to advance to the scan point side of the document feed path 32 whereas the document is restrained from advancing to the terminal end 41 side of the bidirectional feed path 39.

The switching of the feed path by the guide flap 47 is attained by the contact of the document with the guide flap 47. The guide flap 47 is normally held at the fifth guiding position shown by the solid line in FIG. 3, due to its own weight or due to the energizing force of an elastic member such as a spring. When the document being delivered from the sheet feed tray 30 side of the document feed path 32 is contacted with the guide flap 47, the guide flap 47 is rotated in such a manner that it pushed aside to the left side in FIG. 3 and reaches the sixth guiding position shown by the alternating long and two short dashed line in FIG. 3. On the other hand, even if the document, which has been delivered from the connecting position 38 of the bidirectional feed path 39 to the crossing position 40, is contacted with the guide flap 47, because the guide flap 47 is restricted from rotating to the right side in FIG. 3 from the fifth guiding position, the document is guided by the guide flap 47 so as to advance to the terminal end 41 side of the bidirectional feed path 39. As to the vane shape of the guide flap 47, there is employed a shape which not only can easily change the position of the guide flap 47 when it is contacted by the document being delivered from the sheet feed tray 30 side of the document feed path 32 to the crossing position 40, but also allows the document being delivered from the connecting position 38 side of the bidirectional feed path 39 to the crossing position 40 to be easily guided to the crossing position 40 from the connecting position 38 side of the bidirectional feed path 39. In this manner, when the guide flap 47 is formed such that it is able to change its position due to the contact of the document with the guide flap 47, it is not necessary to change the position of the guide flap 47 positively by applying a drive force from a motor or the like, which makes it possible to realize the guide flap 47 with a simple structure.

Figure 4:
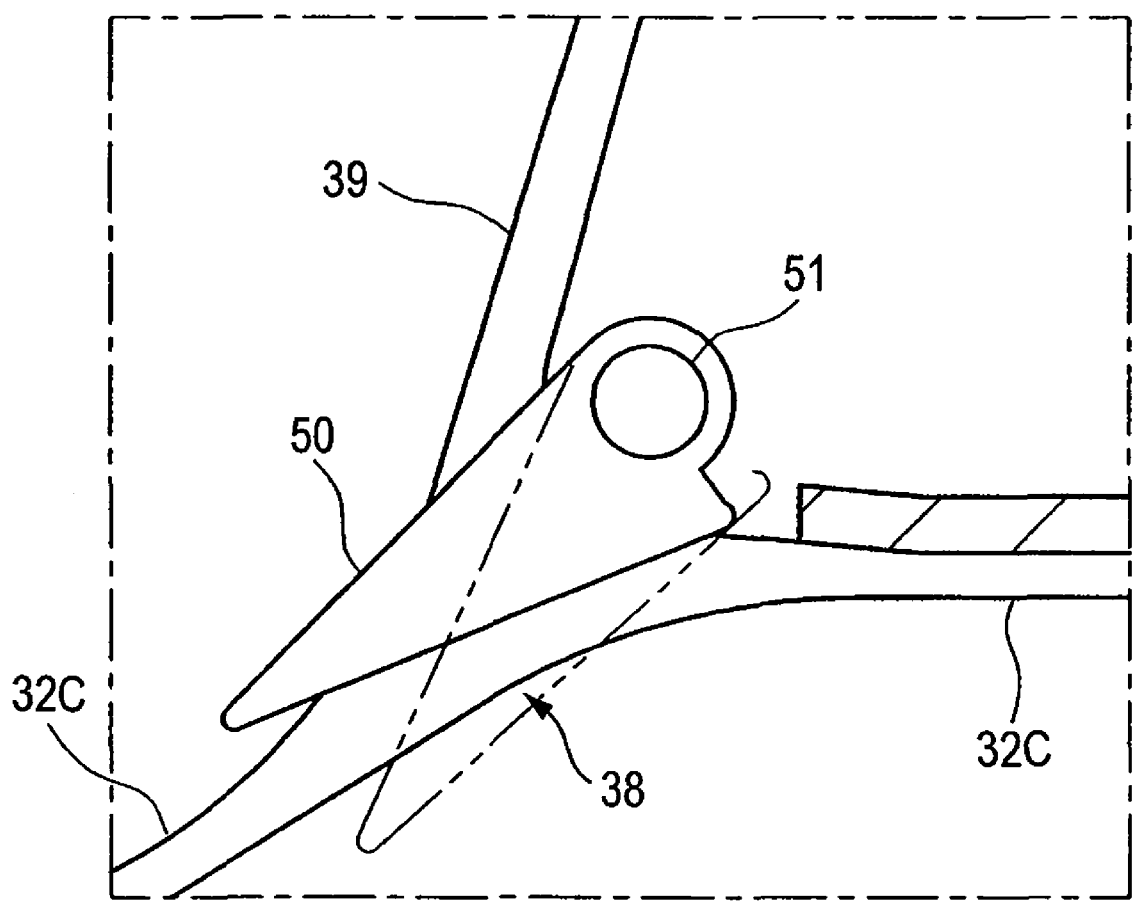
FIG. 4 is an enlarged view showing the structure of a connecting position.

FIG. 4 is an enlarged view showing the structure in the neighborhood of the connecting position 38. As shown in FIG. 2 and FIG. 4, a guide flap 50 is disposed in the connecting position 38. The guide flap 50 is disposed so as to be rotatable about a shaft 51, and when a drive force is transmitted from the motor 67 (see FIG. 6) thereto, the guide flap 50 is rotated to either a first guiding position shown by a solid line in FIG. 4 or a second guiding position shown by an alternate long and two short dashed line. When the guide flap 50 is rotated as such, the feed path of a document is thereby switched to the bidirectional feed path 39 side or the document feed path 32 (document discharge path) side leading to the sheet discharge tray 31. The guide flap 50, for example, when it is contacted with a guide member provided in the document feed path 32 or in the bidirectional feed path 39, is restricted from rotating upward in FIG. 4 from the first guiding position and rotating downward in FIG. 4 from the second guiding position. When the guide flap 50 is held at the first guiding position, the feed path from the scan point side (in FIG. 4, the left side) of the document feed path 32 to the sheet discharge tray 31 side (in FIG. 4, the right side) is allowed to be continuous. Accordingly, the document, which has passed through the scan point, is guided in the connecting position 38 toward the sheet discharge tray 31 along the lower portion 32C of the document feed path 32. When the guide flap 50 is held at the second position, the feed path from downstream of the scan point of the lower portion 32C of the document feed path 32 to the bidirectional feed path 39 is allowed to be continuous. Thus, the document having passed through the scan point is guided along the connecting position 38 so as to enter the bidirectional feed path 39. The guide flap 50 is disposed in such a manner that, in the connecting position 38, it is able to guide the document to either the document feed path 32 or the bidirectional feed path 39. In FIG. 4, there is shown only one guide flap 50. However, a plurality of guide flaps 50 may be disposed having the same shape at given intervals in the width direction of the document feed path 32, and the guide flaps 50 are rotated integrally. These guide flaps 50 correspond to a feed path switching unit of the present invention.

As shown in FIG. 2, a plurality of sensors which are used to detect the feeding of the document are provided in the document feed path 32 and bidirectional feed path 39. In detail, in the document feed path 32, a first front sensor 52 and a second front sensor 53 (corresponding to a detection unit of the present invention) are disposed respectively on the upstream and downstream sides of the separation roller 34, and a rear sensor 54 is arranged on the immediate upstream side of the scan point. A switchback sensor 55 is arranged between the connecting position 38 and crossing position 40 of the bidirectional feed path 39. These sensors are so called optical sensors and have the same structure except for that detectors are different in shape and the like due to a difference in detecting positions. Therefore, in the present aspect, the first front sensor 52 is used as a representative example, and the structure thereof will be described in detail.

Figure 5:
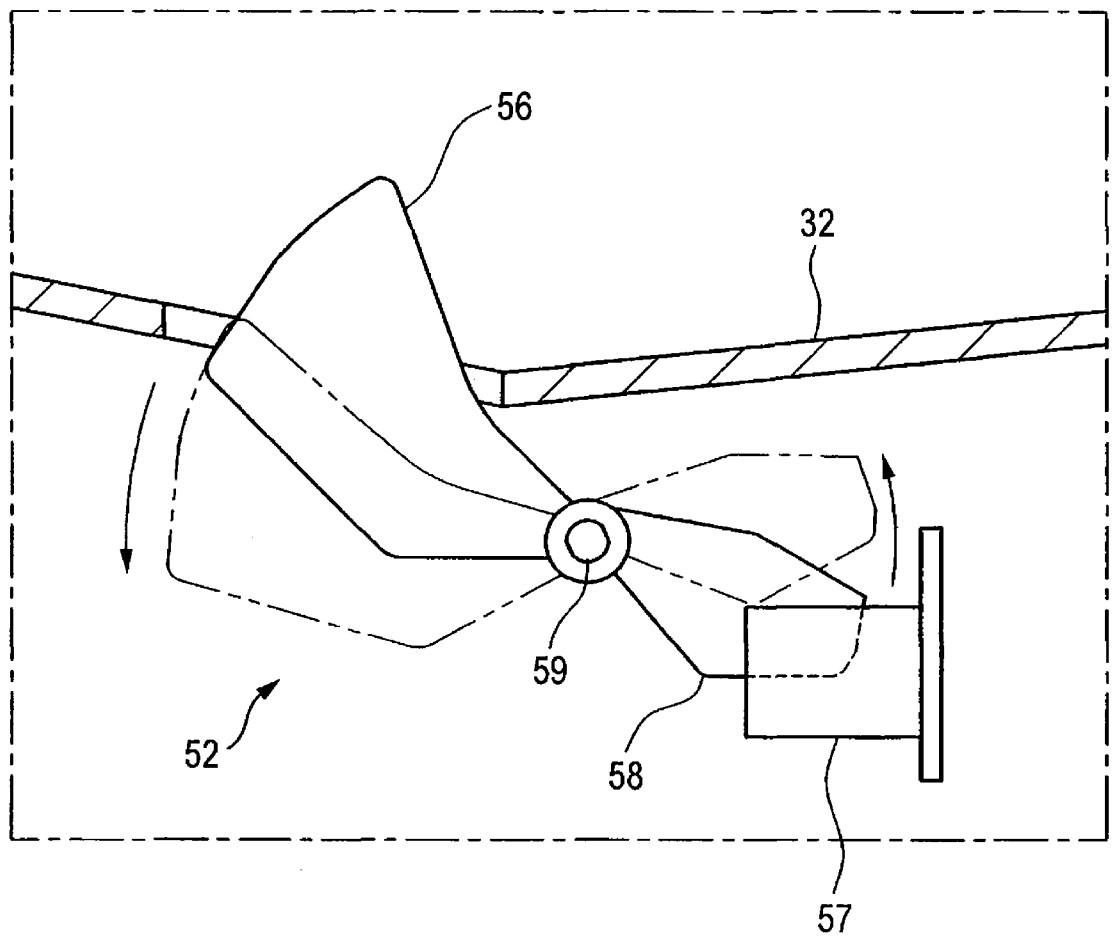
FIG. 5 is an enlarged view showing the structure of a first front sensor.

FIG. 5 is an enlarged view showing the structure of the first front sensor 52. As illustrated, the first front sensor 52 includes a detector 56 that is projected from the lower surface of the document feed path 32 and is turned so as to retract from the document feed path 32 by making contact with a document and a photointerrupter 57 that detects a turn of the detector 56. On the detector 56, a shading portion 58 subjected to detection by the photointerrupter 57 is integrally formed, and the shading portion 58 is provided so as to be freely turnable about a shaft 59. The detector 56 is elastically energized by an unillustrated energizing unit such as a spring to a position where the detector 56 projects into the document feed path 32, that is, in a clockwise direction in FIG. 5. Where no external force is applied to the detector 56, as shown by a solid line in FIG. 5, the detector 56 projects into the document feed path 32, and the shading portion 58 is located between a light-emitting portion and a light-receiving portion of the photointerrupter 57. Accordingly, light transmission of the photointerrupter 57 is interrupted, and the first front sensor 52 is turned off.

When a document is placed on the sheet feed tray 30, the document makes contact with the detector 56 and turns the detector 56 so as to retract from the document feed path 32. The shading portion 58 is also turned together with the detector 56, and as shown by an alternating long and two short dashed line in FIG. 5, the shading portion 58 leaves from the position between the light-emitting portion and light-receiving portion of the photointerrupter 57. Accordingly, light transmission of the photointerrupter 57 is no longer interrupted, and the first front sensor 52 is turned on. According to the on/off of the first front sensor 52, it can be detected whether the document has been placed on the sheet feed tray 30.

The second front sensor 53 disposed just downstream of the separation roller 34 is a sensor which, through its own on/off, can detect the presence or absence of a document fed to the document feed path 32. Based on a detect signal indicating either on or off of the second front sensor 53, the presence or absence of a document in the document feed path 32 can be detected. In addition, the second front sensor 53 is a sensor which detects a feed position of the leading or trailing end of the document, and in further detail, a feed position of the leading and trailing ends of the document. For example, by monitoring the number of rotations of the feed rollers 35A, 35B, 35C and 35D after detection of the leading or trailing end of the document by the second front sensor 53 through the number of steps of the motor 67 (see FIG. 6) or the output value of an encoder, the position of the leading or trailing end of the document in the document feed path is judged.

For the document feed path 32, the distance from the second front sensor 53 to the connecting position 38 of the lower portion 32C of the document feed path 32 is set longer than the feed-direction length of the document both sides of which can be scanned by the image reading apparatus 1. In other words, the second front sensor 53 is disposed at a position spaced from the connecting position 38 of the document feed path 32 toward the feed direction upstream side at least by an amount equivalent to the feed-direction length of the document both sides of which can be scanned. Therefore, when the feed-direction leading end of the document arrives at a given position upstream in the feed direction of the connecting position 38 of the document feed path 32, whether the second front sensor 53 detects the feed-direction trailing end side of the document can be used to settle whether the length of the document is longer than a given feed-direction length.

Whether both sides of a document can be scanned by the image reading apparatus 1 or not is judged by whether the document can be fed as a double-sided readable document by the ADF 3 or not. In the double-sided scanning feed, a document having passed through the scan point of the document feed path 32 is guided to the bidirectional feed path 39 and is switchback fed, whereby the document is returned from the crossing position 40 to the upstream side of the scan point of the document feed path 32. When a document having a feed-direction length longer than the feed distance of a loop-shaped route extending from the crossing position 40 of the document feed path 32 through the scan point, connecting position 38 and bidirectional feed path 39 in this order again to the crossing position 40 enters the bidirectional feed path 39 from the connecting position 38 of the document feed path 32 and arrives at the crossing position 40, there is a fear that the feed-direction leading end side of the document can be contacted with the feed-direction trailing end thereof to thereby cause inconveniences such as jammed sheets or damaged documents. Therefore, it is considered that a document having a feed-direction length longer than the above-mentioned loop-shaped feed distance cannot be fed as a double-sided readable document by the ADF 3. The use of the second front sensor 53 is not always limited to the detection of the feed-direction length of a document. For example, for registration of a document, the second front sensor 53 may be used to detect whether the feed-direction leading end of the document has arrived at the feed roller 35B or not; that is, the detect signal of the second front sensor 53 may be used together with the rotation amount of the motor 67 to judge whether such leading end has arrived or not.

The rear sensor 54 disposed just upstream of the scan point is a sensor which, according to its own on/off, detects the leading and trailing ends of a document being fed along the document feed path 32. By monitoring the number of rotations of the feed rollers 35A, 35B, 35C and 35D after detection of the leading or trailing end of the document by the rear sensor 54 through the number of steps of the encoder or motor 67, it is judged whether or not the leading or trailing end of the document has arrived at a given position upstream in the feed direction of the scan point or connecting position 38. The image scanning of the image read unit 22 is controlled according to the detect signal of the rear sensor 54. When the leading end of the document has arrived at the scan point, the image scanning is started, and when the trailing end of the document has arrived at the scan point, the image scanning is ended. Also, the timing for the second front sensor 53 to detect the presence or absence of a document in order to judge the feed-direction length of the document is the time when it is judged according to the detect signal of the rear sensor 54 that the feed-direction leading end of the document has arrived at a given position upstream in the feed direction of the connecting position 38.

The switchback sensor 55 interposed between the connecting position 38 and crossing position 40 of the bidirectional feed path 39 is a sensor which, according to its own on/off, detects the leading or trailing end of a document being fed along the bidirectional feed path 39. For example, by monitoring the number of rotations of the feed rollers 35A, 35B, 35C and 35D after detection of the leading or trailing end of the document by the switchback sensor 55 through the number of steps of the motor 67 or the output value of an encoder, it is judged whether the trailing end of the document has passed through the crossing position 40.

Figure 6:
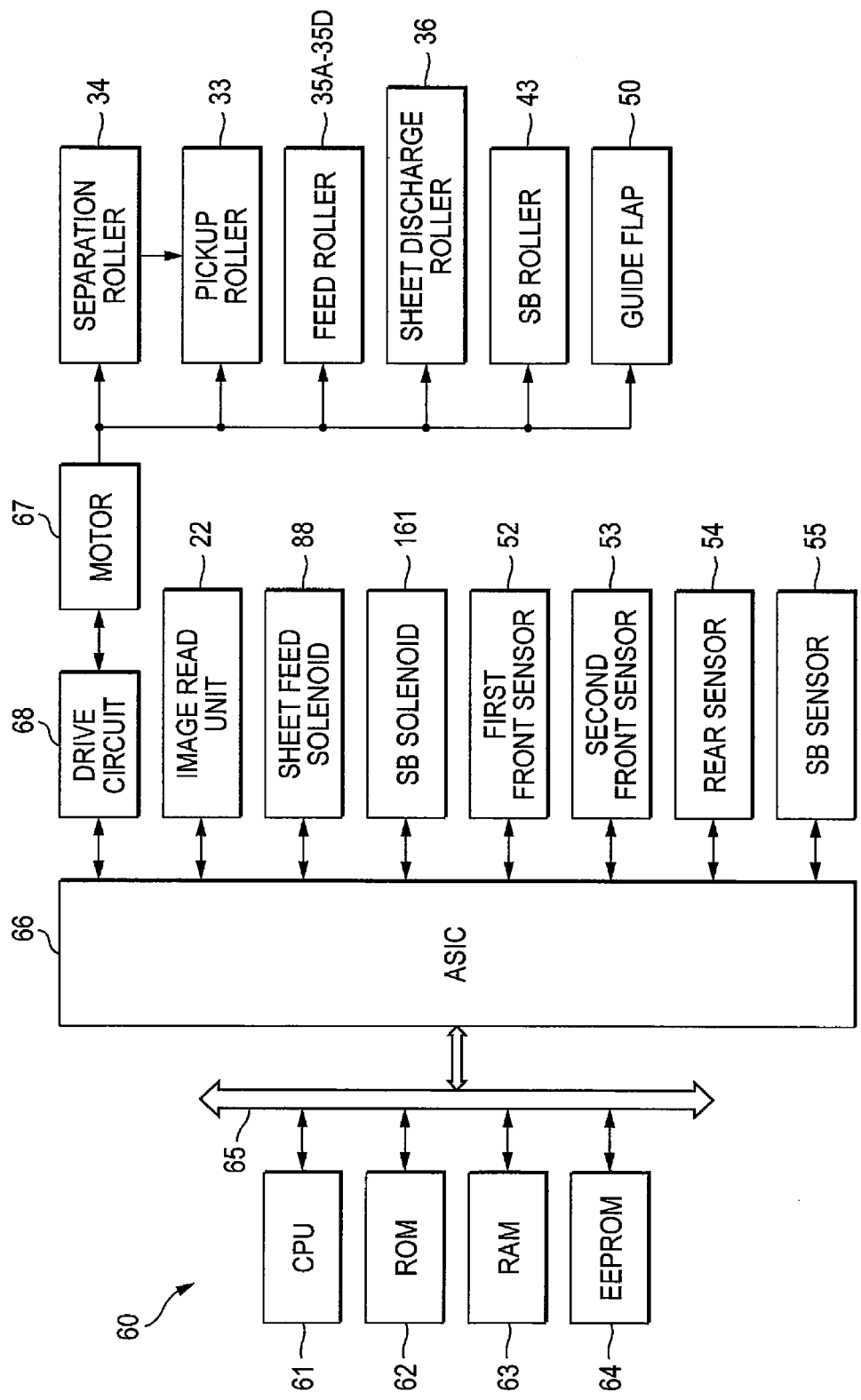
FIG. 6 is a block diagram showing the structure of a control part.

FIG. 6 shows the structure of the control part 60 of the image reading apparatus 1. The control part 60 is a part which controls the whole operation of the image reading apparatus 1. The control part 60, as shown in FIG. 6, is structured as a microcomputer which is mainly composed of a central processing unit (CPU) 61, a read only memory (ROM) 62, a random access memory (RAM) 63, and an electrically erasable and programmable ROM (EEPROM) 64, while the control part 60 is connected through a bus 65 to an application specific integrated circuit (ASIC) 66.

In the ROM 62, stored are programs and the like which are used to control various operations of the image reading apparatus 1 and ADF 3. The RAM 63 is used as a storage area or an operation area which temporarily stores therein various kinds of data used when the CPU 61 executes the above programs and as a storage area of correction information (an example of drive loss information of the present invention), feed mode information, scanning state information, and rotation direction information to be described later. The EEPROM 64 is a storage area which stores therein various settings and flags to be continuously stored even after the power supply is turned off. The control part 60 composed of these elements is supplied with power from a backup power supply and can therefore retain the information stored in the RAM 63 even when the power supply of the apparatus has been turned off. The CPU 61, ROM 62, RAM 63 and EEPROM 64 cooperate together in realizing a control unit, an image modification unit, a first drive loss information acquisition unit, a second drive loss acquisition unit, and a third drive loss information acquisition unit according to the present invention. Moreover, the CPU 61 and RAM 63 cooperate together in realizing a storage unit according to the present invention.

The ASIC 66, according to an instruction from the CPU 61, generates a phase exciting signal to be electrically applied to the motor 67, applies this phase exciting signal to the drive circuit 68 of the motor 67, and electrically applies a drive signal to the motor 67 through the drive circuit 68, thereby controlling the rotation of the motor 67. The motor 67 is a motor which, through its rotation in both of the forward and backward directions, can apply a drive force to the pickup roller 33, separation roller 34, feed rollers 35A, 35B, 35C, and 35D, sheet discharge roller 36, feedback roller (SB roller) 43, and guide flap 50. The motor 67 serves as a single drive source of the ADF 3. As the motor 67, a motor employing any structure or any driving method can be applied as long as it can be driven and rotated in both of the forward (CC rotation) and backward (CCW rotation) directions, however, in the present aspect, description is given of a stepping motor controlled and driven by a pulse driving method. A history of stop instructions and forward rotation (CW rotation) or backward rotation (CCW rotation) instructions is stored in the RAM 63.

The drive circuit 68 is used to drive the motor 67, and specifically, upon receiving an output signal from the ASIC 66, the drive circuit 68 generates a pulse signal for rotating the motor 67. The pulse signal is generated based on aperiodic signal generated by the ASIC 66. The pulse signal generated by the drive circuit 68 is outputted to the motor 67. Upon receiving this pulse signal, the motor 67 is rotated in a given rotational direction and the rotational force of the motor 67 is transmitted through the respective drive force transmission mechanisms 70, 110, 120, 150, and 170 to be described later to the pickup roller 33, separation roller 34, feed rollers 35A, 35B, 35C, and 35D, sheet discharge roller 36, feedback roller (SB roller) 43, and guide flap 50, respectively.

The periodic signal generated by the ASIC 66 is fed back to the CPU 61 through the bus 65, and the CPU 61 counts the number of pulses of the pulse signal generated by the drive circuit 68. By counting the number of pulses of the pulse signal outputted to the motor 67 in such a manner, the number of steps of the motor 67 is counted. Here, the counted pulse signal is temporarily stored as the step number of the motor 67 in the RAM 63.

An image read unit 22, which scans the images of a document being fed from the ADF 3 to the scan point, is connected to the ASIC 66. Based on a control program stored in the ROM 62, the image read unit 22 scans the images of a document. Although not shown in FIG. 6, a drive mechanism for reciprocating the image read unit 22 is also operated when an output signal from the ASIC 66 is applied thereto.

The first front sensor 52, second front sensor 53, rear sensor 54 and switchback sensor 55 are connected to the ASIC 66. In response to the on/off of the respective sensors, the CPU 61, based on the control program stored in the ROM 62, allows the ASIC 66 to output a given output signal to thereby operate the motor 67 and image read unit 22. In addition, on/off histories of these respective sensors are stored in the RAM 63. Of the on/off histories of the respective sensors, on/off histories of the rear sensor 54 and switchback sensor 55 are used as scanning state information.

A sheet feed solenoid 88 and a switchback solenoid (SB solenoid) 161 are connected to the ASIC 66. The CPU 61, based on the control program stored in the ROM 62, allows the ASIC 66 to output an output signal at a given timing to thereby operate the sheet feed solenoid 88 and switchback solenoid 161.

Hereinafter, description will be given of the drive force transmission mechanisms from the motor 67 to the pickup roller 33, separation roller 34, feed rollers 35A, 35B, 35C, and 35D, sheet discharge roller 36, switchback roller 43, and guide flap 50. The respective shafts of the separation roller 34, feed rollers 35A, 35B, 35C, and 35D, sheet discharge roller 36, feedback roller (SB roller) 43, and guide flap 50 are extended in the width direction of the document feed path 32. The separation roller 34, feed rollers 35A, 35B, 35C, and 35D, sheet discharge roller 36, switchback roller 43, and guide flap 50 are provided at given positions of the respective shafts according to the width of the document feed path 32. As a matter of course, the respective rollers and the like may be provided across almost the entire area in the axial direction of the respective shafts, or a plurality of rollers and the like may be provided at given intervals in the width direction of the document feed path 32

As shown in FIG. 1, for the ADF 3 provided on the top surface of the document cover 4, the document feed path 32 and the respective rollers are housed in the frame. The motor 67 and power transmission mechanisms that apply a drive force to the respective rollers are also housed in the frame of the ADF 3. Driven gears are provided at one-end sides of the respective shafts of the separation roller 34, feed rollers 35A, 35B, 35C, and 35D, sheet discharge roller 36, switchback roller 43, and guide flap 50. The drive force is transmitted to the respective driven gears through the drive force transmission mechanisms from the motor 67, whereby the respective rollers and the like are driven. In the present aspect, the motor 67, respective drive force transmission mechanisms, sheet feed solenoid 88, SB solenoid 161, and respective driven gears provided at the one-end sides of the respective shafts of the separation roller 34, feed rollers 35A, 35B, 35C, and 35D, sheet discharge roller 36, switchback roller 43, and guide flap 50 are stored in a gearbox 7 provided at a back apparatus side in the frame of the ADF 3. Here, the respective gears mentioned in the following are spur gears on whose outer circumference teeth parallel to the axis are formed unless particularly limited.

FIG. 7 to FIG. 11 show a drive force transmission mechanism 70 from the motor 67 to the separation roller 70. The drive force transmission mechanism 70 is a mechanism that, as a result of a clockwise (CW) rotation of the motor 67, transmits a feed-direction drive force to the separation roller 34 and terminates, as a result of switching from the CW rotation to a counterclockwise (CCW) rotation, the transmission of a drive force to the separation roller 34. The CW rotation and CCW rotation are opposing rotation directions of the motor 67, and correspond to forward rotation and backward rotation, respectively.

Figure 7:
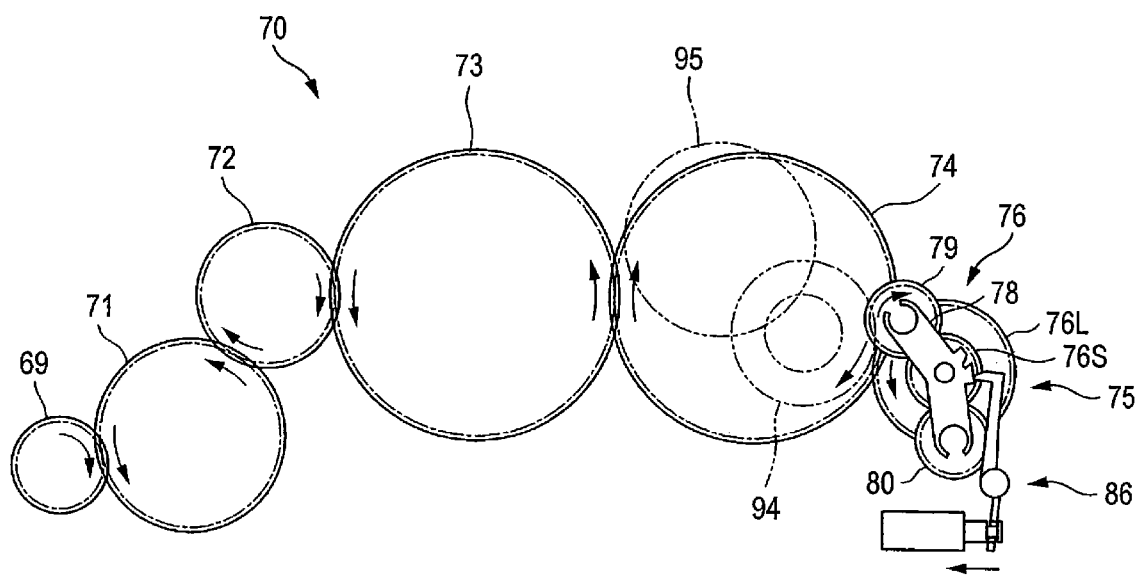
FIG. 7 is a view showing the structure of a drive force transmission mechanism.

As shown in FIG. 7, four transmission gears 71, 72, 73, and 74 are engaged in sequence with a drive gear 69 provided on a drive shaft of the motor 67, whereby a drive force is transmitted to a planetary gear unit 75. Here, the four transmission gears 71, 72, 73, and 74 are not particularly limited, and are appropriately provided according to the distance from the drive gear 69 to the planetary gear unit 75, so that the number and diameter of transmission gears can be changed. Upon receiving the CW rotation and CCW rotation of the motor 67, the transmission gears 71, 72, and 73 engaged in sequence are rotated in a given direction, and a drive force is transmitted so that the transmission gear 74 conducts a CCW rotation or a CW rotation.

Figure 9:
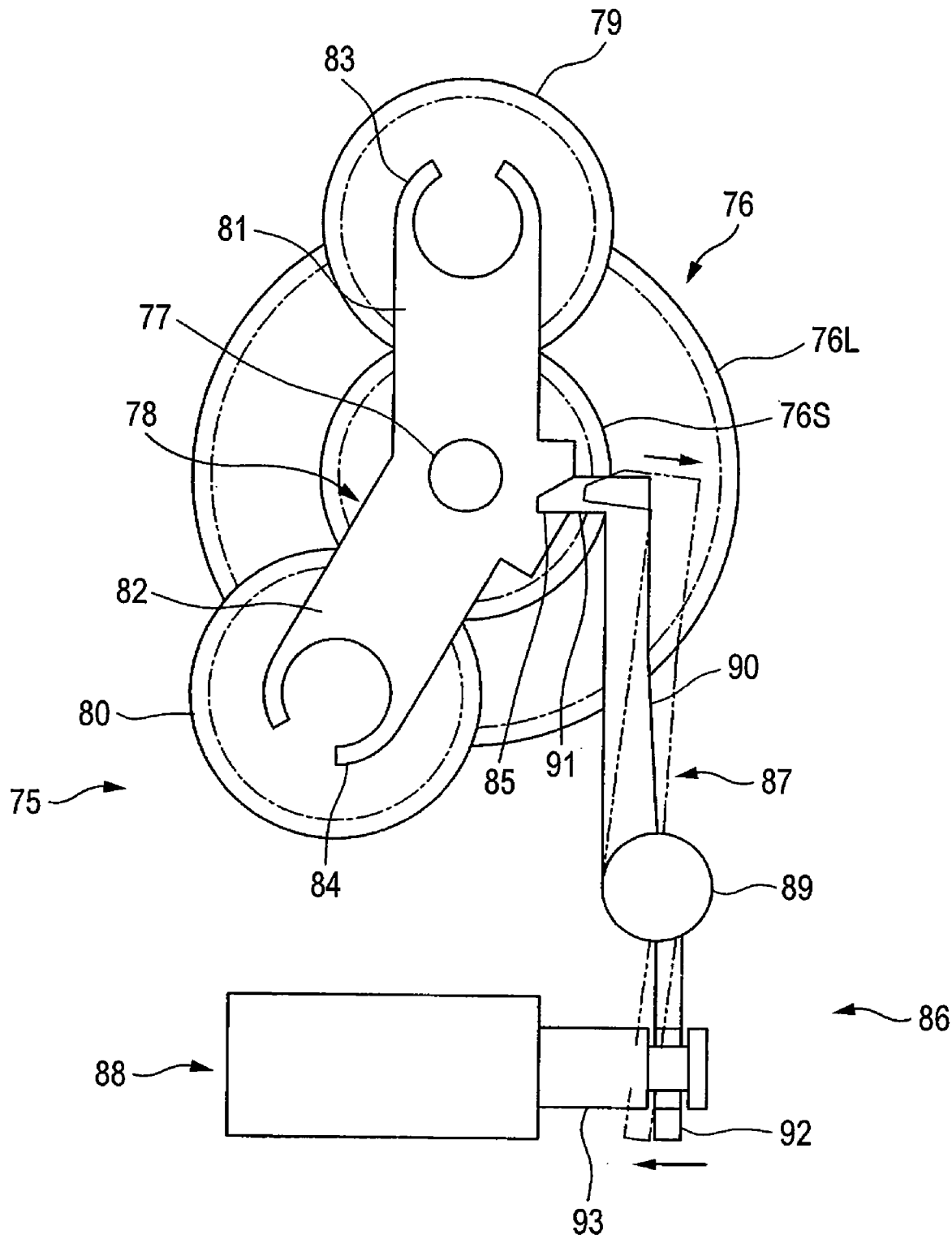
FIG. 9 is a view showing the structure of a planetary gear unit and a latching mechanism.

FIG. 9 shows the structure of a planetary gear unit 75. The planetary gear unit 75 is formed by freely rotatably providing a support arm 78 coaxially with a shaft 77 of a sun gear 77, and pivotally supporting two planetary gears 79 and 80 engaged with the sun gear 76 on the support arm 78. In the present aspect, there is provided the planetary gear unit 75 having two planetary gears 79 and 80, however, the number of planetary gears is not particularly limited, and the planetary gear unit 75 may have only one planetary gear.

The sun gear 76 is a two-stage gear for which a large-diameter gear 76L and a small-diameter gear 76S are formed coaxially and integrally. The support arm 78 is an arm from which shaft 77 arm portions 81 and 82 are extended in two radial directions and which pivotally supports the planetary gears 79 and 80 by bearing portions 83 and 84, respectively, formed at the leading ends of the respective arm portions 81 and 82. The planetary gears 79 and 80 pivotally supported on the support arm 78 are respectively engaged with the gear 76S of the sun gear 76. When the sun gear 76 rotates, the planetary gears 79 and 80 respectively engaged with the gear 76S rotate. In addition, upon receiving the rotation of the sun gear 76, the support arm 78 also rotates in the same direction. That is, when the sun gear 76 rotates, the planetary gears 79 and 80 revolve around the sun gear 76 while rotating respectively.

In the neighborhood of the shaft 77 of the support arm 78, a latching concavity 85 is formed. By the latching concavity 85 being latched on the latching mechanism 86, the support arm 78 is restrained at a given position irrespective of a rotation of the sun gear 76. A position of the support arm 78 being latched on the latching mechanism 86 is a disengaging position to be described later.

The latching mechanism 86 includes a latching member 87 and a sheet feed solenoid 88. The latching member 87 has an arm portion 90 extended in the radial direction toward the support arm 78 from a shaft 89, a latching claw 91 formed in a hook shape at the leading end of the arm portion 90, and a passive portion extended in the radial direction from the shaft 89. The latching claw 91 is engageable with the latching concavity 85 of the support arm 78, and is engaged and unengaged with respect to the latching concavity 85 by the arm portion 90 being turned about the shaft 89. The sheet feed solenoid 88 is a solenoid where, by being supplied (turned on) with power, an electromagnetic force acts to drive a shaft 93 linearly in a direction to sink in the body, and by a power cut (turned off), the electromagnetic force disappears to elastically restore the shaft 93 in a direction projecting from the body. This shaft 93 drive is transmitted to the passive portion 92, whereby the latching portion 87 is turned about the shaft 89 to reach a given position. With the sheet feed solenoid 88 off, as shown by a solid line in FIG. 9, the latching member 87 reaches a position where the latching claw 91 is engageable with the latching concavity 85 of the support arm 78. With the sheet feed solenoid 88 on, as shown by an alternating long and two short dashed line in FIG. 9, the latching member 87 reaches a position to disengage the latching claw 91 from the latching concavity 85.

As shown in FIG. 7, the transmission gear 74 is engaged with the gear 76L of the sun gear 76 of the planetary gear unit 75. As a result of a drive force being transmitted from the motor 67 and the transmission gear 74 rotating in a given direction, the sun gear 76 is rotated in a given direction. For example, as shown in FIG. 7, when the drive gear 69 CW rotates, the transmission gear 74 CW rotates, and the sun gear 76 CCW rotates. When the sheet feed solenoid 88 is on, the support arm 78 is freely rotatable, and thus the planetary gears 79 and 80 revolve by a CCW rotation. Here, it is sufficient for the sheet feed solenoid 88 to be turned on only when disengaging the latching claw 91 from the latching concavity 85, and even when the sheet feed solenoid 88 is turned off after the support arm 78 rotates from the disengaging position, the latching claw 91 never engages with the latching concavity 85.

Figure 8:
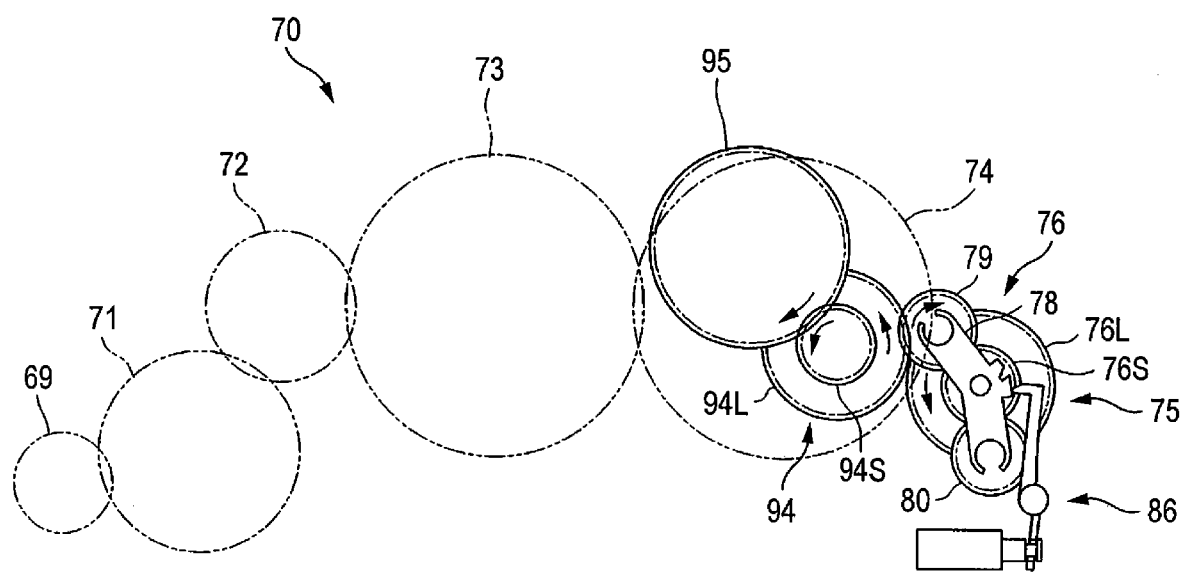
FIG. 8 is a view showing the structure of a drive force transmission mechanism.

As shown in FIG. 8, a transmission gear 94 is arranged adjacent to the planetary gear unit 75. The transmission gear 94 is engageable and disengageable with respect to the planetary gears 79 and 80 of the planetary gear unit 75. As shown in FIG. 8, when the planetary gears 79 and 80 revolve by a CCW rotation, the planetary gear 79 engages with the transmission gear 94, and the planetary gear 80 disengages from the transmission gear 94. The transmission gear 94 is a two-stage gear for which a large-diameter gear 94L and a small-diameter gear 94S are formed coaxially and integrally. With respect to the large-diameter gear 94L, the planetary gears 90 and 80 are engageable and disengageable. The small-diameter gear 94S is engaged with a driven gear 95 provided on the shaft 111 (see FIG. 12) that pivotally supports the separation roller 34. Here, the gear structure from the transmission gear 94 to the driven gear 95 is not particularly limited, and according to the distance from the transmission gear 94 to the driven gear 95, the number and diameter of transmission gears can be appropriately changed.

As a result of the planetary gear 79 which has revolved by a CCW rotation engaging with the transmission gear 94, revolution of the planetary gear 79 is restrained. Then, the planetary gear 79 rotates by a CW rotation as a result of being transmitted with a drive force from the sun gear 76. The transmission gear 94 CCW rotates as a result of receiving this, and the driven gear 95 CW rotates. As a result of the driven gear 95 CW rotating, the shaft 111 that pivotally supports the separation roller 34 is rotated in the sheet feed direction.

Figure 10:
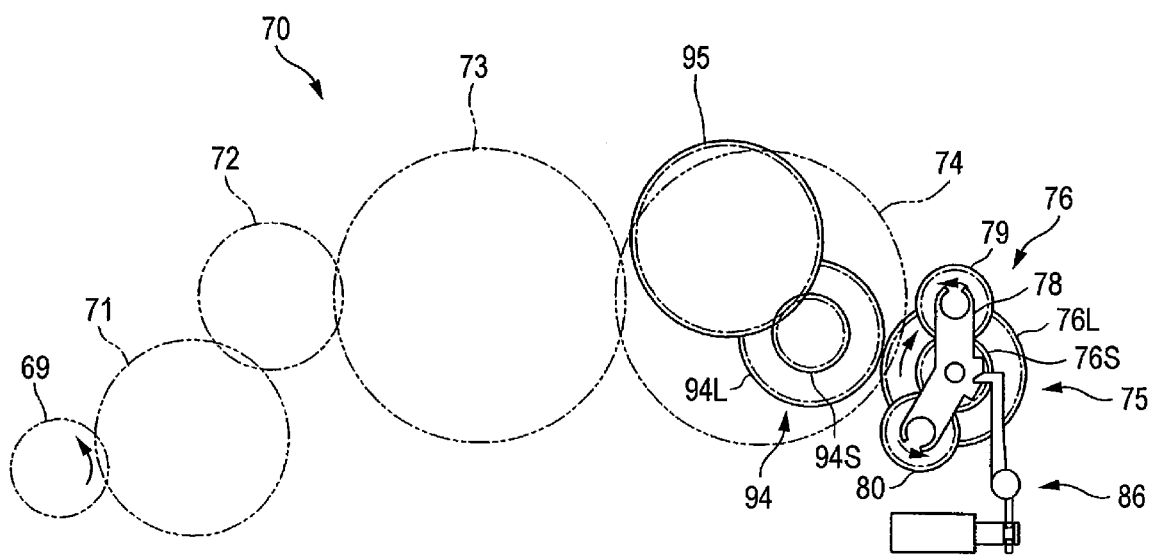
FIG. 10 is a view showing the structure of a drive force transmission mechanism.

As shown in FIG. 10, when the drive gear 69 is switched from a CW rotation to a CCW rotation, the transmission gear 74 CCW rotates, and the sun gear 76 CW rotates. As shown in FIG. 8, in a state where the planetary gear 79 is engaged with the transmission gear 94, even when the sheet feed solenoid 88 is off, the planetary gear 91 is never engaged with the latching concavity 85. Therefore, since the support arm 78 is freely rotatable, the planetary gears 79 and 80 revolve by a CW rotation. As a result of the support arm 78 rotating with the revolution of the planetary gears 79 and 80, the latching concavity 85 of the support arm 78 arrives at a position engageable with the latching claw 91. At that time, when the paper feed solenoid 88 is off, as shown in FIG. 10, the latching claw 91 is engaged with the latching concavity 85, so that the support arm 78 is restricted from rotation. In this condition, neither of the planetary gears 79 and 80 is engaged with the transmission gear 94. A position of the support arm 78 such that both of the planetary gears 79 and 80 are disengaged from the transmission gear 94 is called a disengaging position in the present specification. By the latching claw 91 being engaged with the latching concavity 85, the support arm 78 is latched so as not to be rotatable, and the support arm 78 is held at the disengaging position until the sheet feed solenoid 88 is turned on next time.

Figure 11:
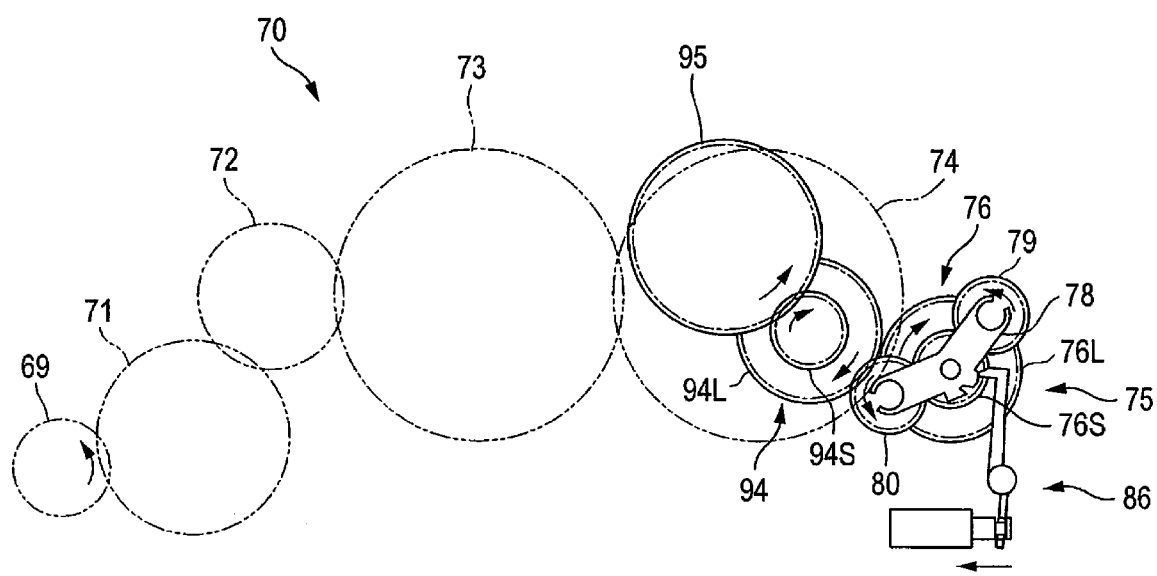
FIG. 11 is a view showing the structure of a drive force transmission mechanism.

As shown in FIG. 11, when the sheet feed solenoid 88 is turned on, based on a CW rotation of the sun gear 76, the planetary gears 79 and 80 revolve by a CW rotation. By the planetary gear 80 having revolved by a CW rotation engaging with the transmission gear 94, the planetary gear 80 is restrained from revolution. Then, the planetary gear 80 rotates by a CCW rotation as a result of being transmitted with a drive force from the sun gear 76. The transmission gear 94 CW rotates as a result of receiving this, and the driven gear 95 CCW rotates. As a result of the driven gear 95 CCW rotating, the shaft 111 that pivotally supports the separation roller 34 is rotated in a direction opposite the sheet feed direction.

Hereinafter, description will be given of the drive force transmission mechanism 110 from the shaft 111 that pivotally supports the separation roller 34 to the pickup roller 33. As shown in FIG. 2, the pickup roller 33 is pivotally supported on the leading end side of the arm 29 and is arranged in a manner spaced from the separation roller 34 at the opposite side in the sheet feed direction. As described above, the transmission force of the motor 67 is transmitted to the shaft 111, and the drive force is transmitted from the shaft 111 to the arm 29, pickup roller 33, and separation roller 34.

Figure 12:
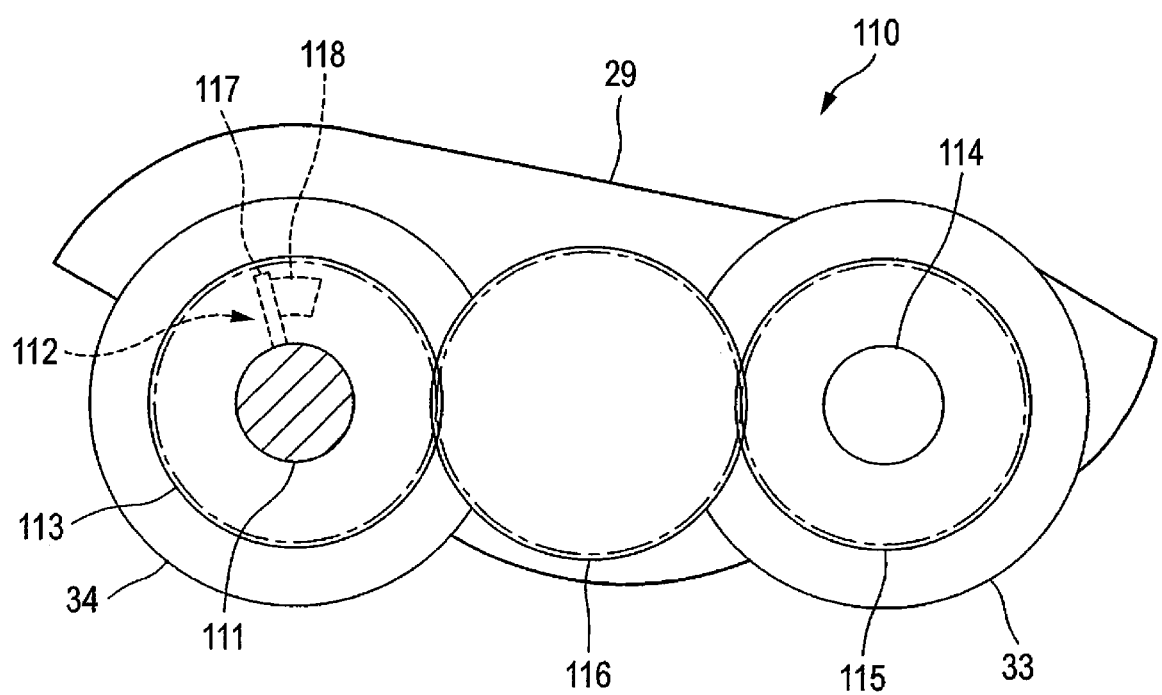
FIG. 12 is a view showing the structure of a drive force transmission mechanism.

FIG. 12 shows the drive force transmission mechanism 110 from the shaft 111 to the pickup roller 33. The drive force transmission mechanism 110 is composed of a one-round clutch 112 provided on the shaft 111, a gear 113 integrally formed on the separation roller 34, a gear 115 that is fixed to a shaft 114 of the pickup roller 33, and a transmission gear 116 that transmits a drive force from the gear 113 to the gear 115. The separation roller 34 is pivotally supported on the shaft 111 so as to be freely rotatable. Here, the one-round clutch 112 and gear 113 are separately provided on both axial sides of the separation roller 34, and in FIG. 12, the one-round clutch 112 is provided on the back side of the separation roller 34 in the figure sheet of FIG. 12, and the one-round clutch 112 is provided on the near side in the figure sheet of FIG. 12, so that the one-round clutch 112 located on the back side of the separation roller 34 is shown by a broken line.

The one-round clutch 112 is formed of a pin 117 provided in a projecting condition radially from the shaft 111 and a latching piece 118 provided in a projecting condition axially from the separation roller 34. The pin 117 is provided in a projecting condition in the radial direction of the shaft 111 at the side of the separation roller 34, and rotates with the rotation of the shaft 111. The latching piece 118 is projected axially from the side surface of the separation roller 34. The position of the latching piece 118 with respect to the radial direction of the separation roller 34 is within the range of a projecting length of the pin 117, and the pin 117 and latching piece 118 are engageable with each other. As shown in FIG. 12, as a result of the pin 177 being engaged with the latching piece 118, the rotation of the shaft 111 is transmitted to the separation roller 34 via the pin 117 and latching piece 118, whereby the separation roller 34 is rotated in the same direction as that of the shaft 111.

Since the separation roller 34 is freely rotatable with respect to the shaft 111, the separation roller 34 is rotatable in a direction to disengage the latching piece 118 from the pin 117. Then, when the separation roller 34 rotates almost one rotation around the shaft 111, the latching piece 118 again arrives at the position of the pin 117 and is engaged therewith. Thereby, it is possible for the separation roller 34 to slip only almost one rotation irrespective of a transmission of the drive force from the shaft 111.

Between the gear 113 provided on the separation roller 34 and the gear 115 fixed to the shaft 114 of the pickup roller 33, the transmission gear 116 is interposed. The transmission gear 116 is engaged with the gear 113 and gear 115. Since the gear 113 is integrated with the separation roller 34, this is rotated with the rotation of the separation roller 34. By receiving the rotation of the gear 113, the transmission gear 116 is rotated, and by receiving the rotation of the transmission gear 116, the gear 115 is rotated. Since the gear 115 is fixed to the shaft 114 of the pickup roller 33, the pickup roller 33 is rotated with the rotation of the gear 115. That is, the separation roller 34 and pickup roller 33 are always rotated in the same direction. By such a drive force transmission mechanism 110, the drive force is transmitted from the shaft 111 that pivotally supports the separation roller 34 to the separation roller 34 and pickup roller 33.

As shown in FIG. 12, the arm 29 has its base end side pivotally supported on the shaft 111 so as to be freely rotatable, and is transmitted with a drive force from the shaft 111 so as to be moved up and down. Between the shaft 111 and base end side of the arm 29, an unillustrated slip clutch is provided. By this slip clutch, a rotation of the shaft 111 is transmitted to the arm 29. The slip clutch is a clutch for which a clutch plate slips as a result of receiving a load greater than a given torque, so that a drive force transmission is cut. By the shaft 111 CW rotating, a turning force is transmitted to the arm 29 via the slip clutch, and the arm 29 turns in a direction to lower the pickup roller 33. On the other hand, when the shaft 111 CCW rotates, the arm 29 turns in a direction to raise the pickup roller 33. As shown in FIG. 2, when the arm 29 turns in the direction to lower the pickup roller 33, the pickup roller 33 contacts a guide surface of the document feed path 32 or a document on the sheet feed tray 30. Thereby, a load is produced against the turn of the of the arm 29 to slip the slip clutch, and the shaft 111 can further be rotated in a stand-still state of the arm 29. When the arm 29 turns in the direction to raise the pickup roller 33, the arm 29 contacts the frame of the ADF 3. Thereby, a load is produced against the turn of the arm 29 to slip the slip clutch, and the shaft 111 can further be rotated in a stand-still state of the arm 29. In this manner, the drive force is transmitted from the shaft 111 to the arm 29 via the slip clutch, and the arm is swung so as to lower or raise the pickup roller 33 with respect to the guide surface of the document feed path 32.

Figure 13:
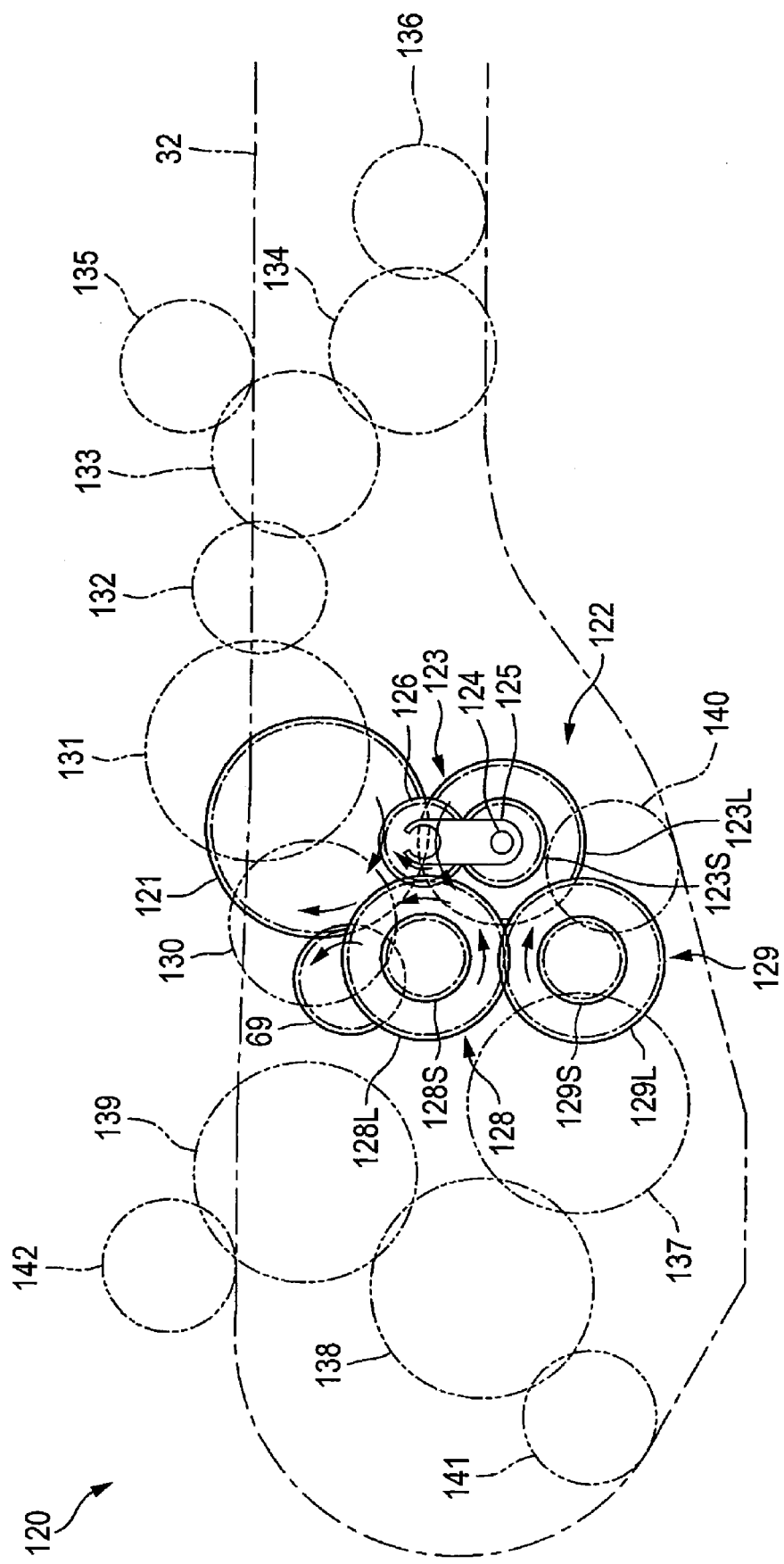
FIG. 13 is a view showing the structure of a drive force transmission mechanism.
Figure 14:
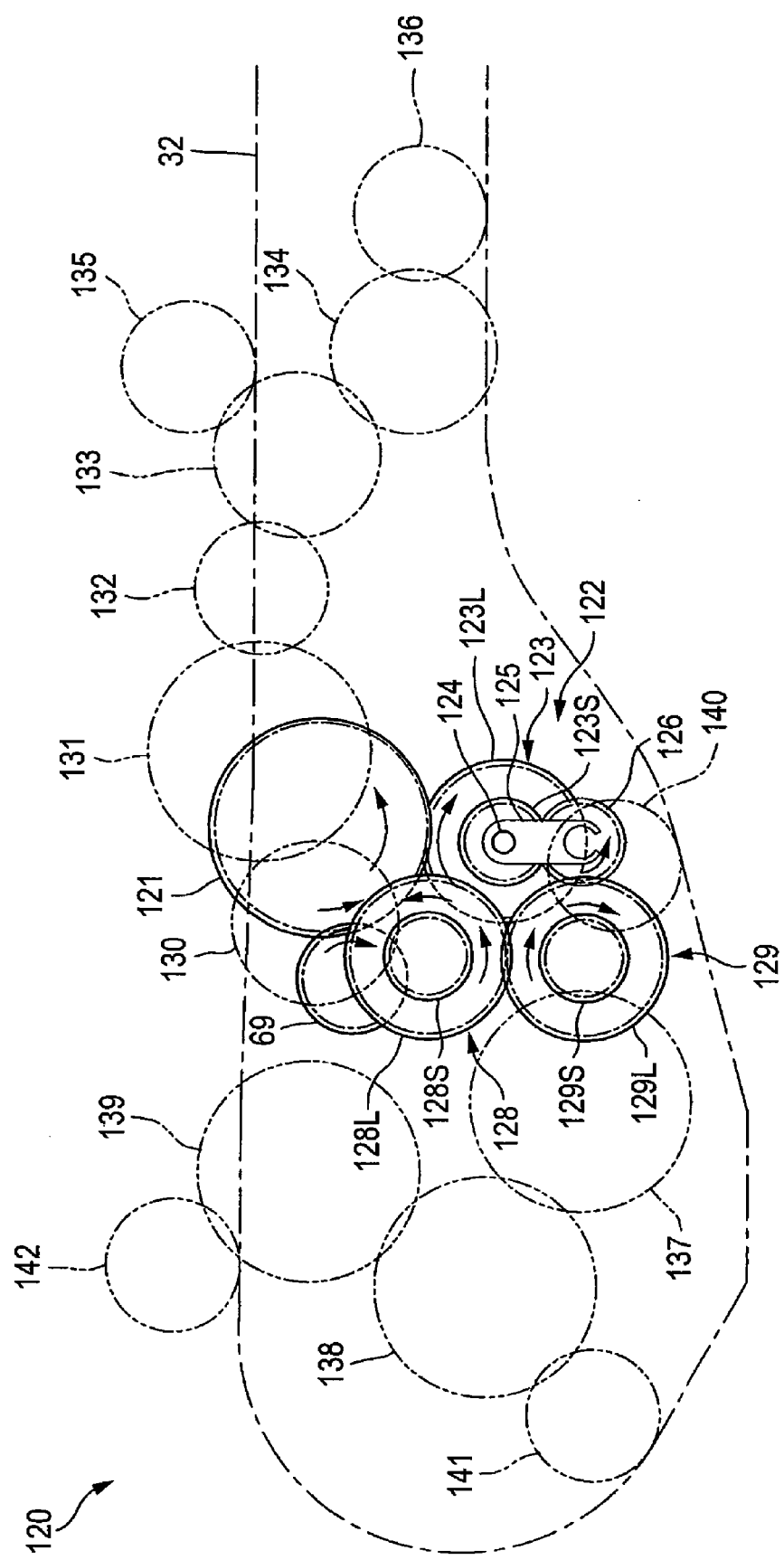
FIG. 14 is a view showing the structure of a drive force transmission mechanism.
Figure 15:
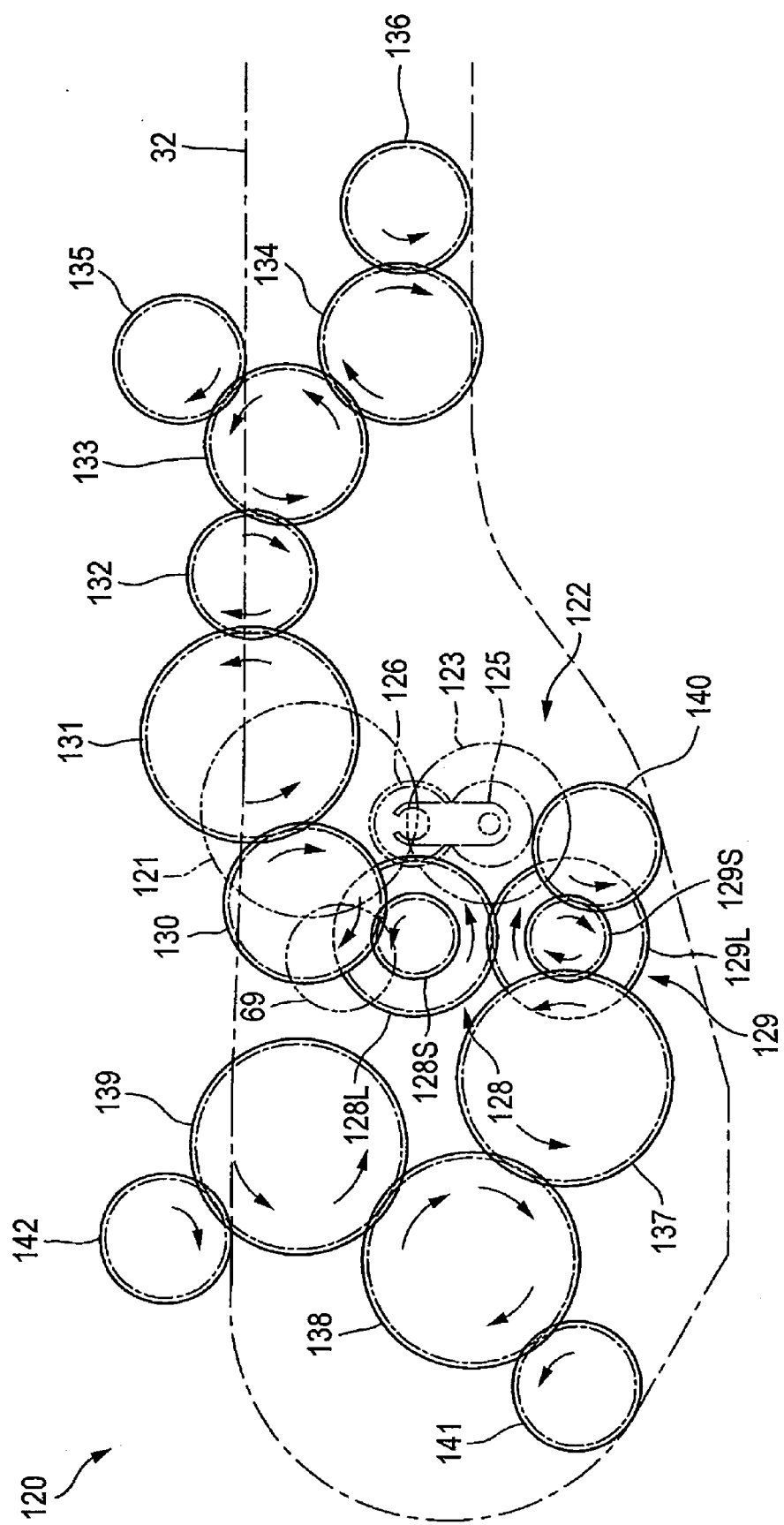
FIG. 15 is a view showing the structure of a drive force transmission mechanism.

FIG. 13 to FIG. 15 show the drive force transmission mechanism 120 from the motor 67 to the feed rollers 35A, 35B, 35C and 35D. This drive force transmission mechanism 120 and the drive force transmission mechanism 170 correspond to a drive force transmission unit of the present invention. The drive force transmission mechanism 120 is a mechanism that transmits a drive force in the feed direction, that is, from the upstream side to the downstream side of the document feed path 32, to the feed rollers 35A, 35B, 35C, and 35D irrespective of the rotation direction of the motor 67.

As shown in FIG. 13, a transmission gear 121 (corresponds to a first transmission gear of the present invention) is engaged with the drive gear 69 provided on the drive shaft of the motor 67, whereby a drive force is transmitted to a planetary gear unit 122. Here, the number of gears and the like from the drive gear 69 to the transmission gear 121 is not particularly limited, and the number and diameter of transmission gears can be changed according to the distance from the drive gear 69 to the planetary gear unit 122. Upon receiving the CW rotation and CCW rotation of the motor 67, a drive force is transmitted so that the transmission gear 121 conducts a CCW rotation or a CW rotation.

The planetary gear unit 122 is formed by freely rotatably providing a support arm 125 (corresponds to a rotation member of the present invention) coaxially with a shaft 124 of a sun gear 123, and pivotally supporting one planetary gear 126 engaged with the sun gear 123 on the support arm 125. In the present aspect, there is provided the planetary gear unit 122 having the one planetary gear 126, however, the number of planetary gears is not particularly limited, and similar to the planetary gear unit 75 described above, the planetary gear unit 122 may have two planetary gears.

The sun gear 123 is a two-stage gear for which a large-diameter gear 123L and a small-diameter gear 123S are formed coaxially and integrally. The planetary gear 126 pivotally supported on the support arm 125 is engaged with the gear 123S of the sun gear 76. When the sun gear 123 rotates, the planetary gear 126 engaged with the gear 123S rotates. In addition, upon receiving the rotation of the sun gear 123, the support arm 125 also rotates in the same direction. That is, when the sun gear 123 rotates, the planetary gear 126 revolves around the sun gear 123 while rotating.

The transmission gear 121 is engaged with the gear 123L of the sun gear 123 of the planetary gear unit 122. As a result of a drive force being transmitted from the motor 67 and the transmission gear 121 rotating in a given direction, the sun gear 123 is rotated in a given direction. For example, as shown in FIG. 13, when the drive gear 69 CCW rotates, the transmission gear 121 CW rotates, the sun gear 123 CCW rotates, and the planetary gear 126 revolves by a CCW rotation.

As shown in FIG. 13, a transmission gear 128 (corresponds to a second transmission gear of the present invention) and a transmission gear 129 (corresponds to a third transmission gear of the present invention) are arranged adjacent to the planetary gear unit 122. The transmission gear 128 is a two-stage gear for which a large-diameter gear 128L and a small-diameter gear 128S are formed coaxially and integrally. Similarly, the transmission gear 129 is a two-stage gear for which a large-diameter gear 129L and a small-diameter gear 129S are formed coaxially and integrally. The planetary gear 126 of the planetary gear unit 122 is engageable and disengageable with respect to the gear 128L of the transmission gear 128. Moreover, the planetary gear 126 is also engageable and disengageable with respect to the gear 129L of the transmission gear 129. Still moreover, the gear 128L and gear 129L are engaged with each other.

As shown in FIG. 13, as a result of the planetary gear 126 revolving by a CCW rotation, the planetary gear 126 is engaged with the gear 128L of the transmission gear 128. At this time, the planetary gear 126 is disengaged from the transmission gear 129. As a result of the planetary gear 126 having revolved by a CCW rotation engaging with the transmission gear 128, the planetary gear 126 is restrained from revolution. Then, the planetary gear 126 rotates by a CCW rotation as a result of being transmitted with a drive force from the sun gear 123. The transmission gear 128 CCW rotates as a result of receiving this force. Then, the transmission gear 129 engaged with the transmission gear 128 CW rotates.

As shown in FIG. 14, when the drive gear 69 CW rotates, the transmission gear 121 CCW rotates, the sun gear 123 CW rotates, and the planetary gear 126 revolves by a CW rotation. As a result of the planetary gear 126 revolving by a CW rotation, the planetary gear 126 is engaged with the gear 129L of the transmission gear 129. At this time, the planetary gear 126 is disengaged from the transmission gear 128. As a result of the planetary gear 126 having revolved by a CW rotation engaging with the transmission gear 129, the planetary gear 126 is restrained from revolution. Then, the planetary gear 126 rotates by a CCW rotation as a result of being transmitted with a drive force from the sun gear 123. The transmission gear 129 CW rotates as a result of receiving this force. The transmission gear 128 engaged with the transmission gear 129 CW rotates. In this manner, in either case where the drive gear 69 CW rotates or CCW rotates, a CCW rotation drive force is transmitted to the transmission gear 128, and a CCW rotation drive force is transmitted to the transmission gear 128, and a CW rotation drive force is transmitted to the transmission gear 129. In other words, irrespective of the rotation direction of the motor 67 connected to the drive gear 69, a drive force to rotate each gear in a given rotation direction is transmitted to the transmission gear 128 and transmission gear 129.

FIG. 15 shows a drive force transmission from the transmission gears 128 and 129 to the respective feed rollers 35A, 35B, 35C, and 35D and sheet discharge roller 36. Five transmission gears 130, 131, 132, 133, and 134 are engaged in sequence with the gear 128S of the transmission gear 128. The transmission gear 133 is engaged with a driven gear 135 provided on the shaft of the feed roller 35A, and the transmission gear 134 is engaged with a driven gear 136 provided on the shaft of the sheet discharge roller 36. Thereby, a drive force of the transmission gear 128 is transmitted to the feed roller 35A via the transmission gears 130, 131, 132, and 133 and driven gear 135. In addition, a drive force of the transmission gear 128 is transmitted to the sheet discharge roller 36 via the transmission gears 130, 131, 132, 133, and 134 and driven gear 136. Here, the transmission gears 130, 131, 132, 133, and 134 and driven gears 135 and 136 interposed from the transmission gear 128 to the feed roller 35A and sheet discharge roller 36 correspond to fourth transmission gears of the present invention.

As described above, the transmission gear 128 is CCW rotated irrespective of the rotation direction of the drive gear 69, and a drive force is transmitted in sequence from the transmission gear 128 to the five transmission gears 130, 131, 132, 133, and 134, and upon receiving this, the driven gear 135 CW rotates, and the driven gear 136 CCW rotates. As a result of the driven gear 125 CW rotating, the feed roller 35A is rotated in the feed direction. In addition, as a result of the driven gear 126 CCW rotating, the sheet discharge roller 36 is rotated in the feed direction.

Three transmission gears 137, 138, and 139 are engaged in sequence with the gear 129S of the transmission gear 129. And, the gear 129S is engaged with a driven gear 140 provided on the shaft of the feed roller 35D, the transmission gear 138 is engaged with a driven gear 141 provided on the shaft of the feed roller 35C, and the transmission gear 139 is engaged with a driven gear 142 provided on the shaft of the feed roller 35B. Thereby, a drive force of the transmission gear 129 is transmitted to the feed roller 35D via the driven gear 140. In addition, a drive force of the transmission gear 129 is transmitted to the feed roller 35C via the transmission gear 138 and driven gear 141. In addition, a drive force of the transmission gear 129 is transmitted to the feed roller 35B via the transmission gear 139 and driven gear 142. Here, the transmission gears 137, 138, and 139 and driven gears 140, 141, and 142 interposed from the transmission gear 129 to the feed rollers 35B, 35C, and 35D correspond to fourth transmission gears of the present invention.

As described above, the transmission gear 129 is CW rotated irrespective of the rotation direction of the drive gear 69, and a drive force is transmitted in sequence from the transmission gear 129 to the three transmission gears 137, 138, and 139. Upon receiving this force, the driven gears 140 and 141 CCW rotate, and the driven gear 142 CW rotates. As a result of the driven gears 140 and 141 CCW rotating, the feed rollers 35D and 35C are rotated in the feed direction. As a result of the driven gear 142 CW rotating, the feed roller 35B is rotated in the feed direction. In this manner, irrespective of the rotation direction of the drive gear 69, a drive force in the feed direction is transmitted to the respective feed rollers 35A, 35B, 35C, and 35D and sheet discharge roller 36. Here, the gear structure from the transmission gears 128 and 129 to the respective driven gears 135, 136, 140, 141, and 142 is not particularly limited, and according to the distance from the respective transmission gears to the respective driven gears, the number and diameter of transmission gears can be appropriately changed.

Figure 16:
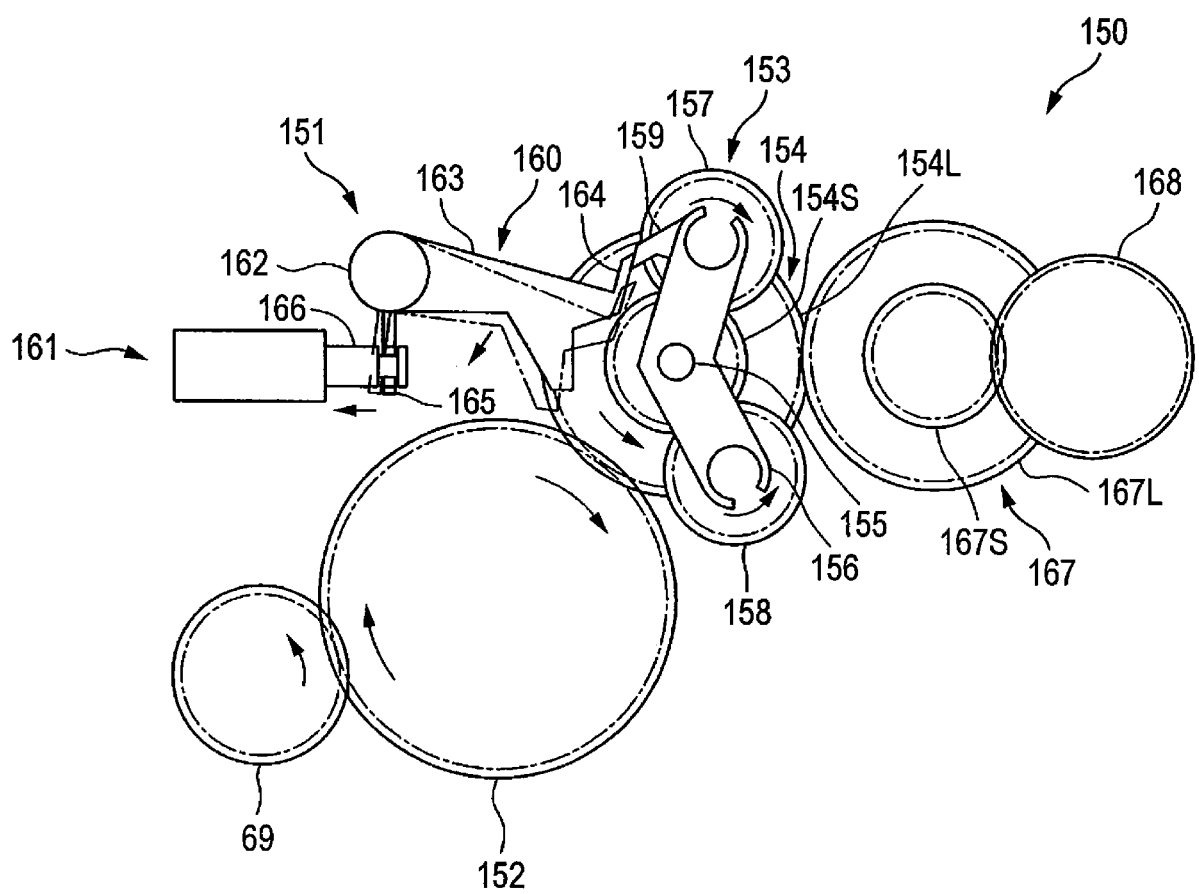
FIG. 16 is a view showing the structure of a drive force transmission mechanism.
Figure 17:
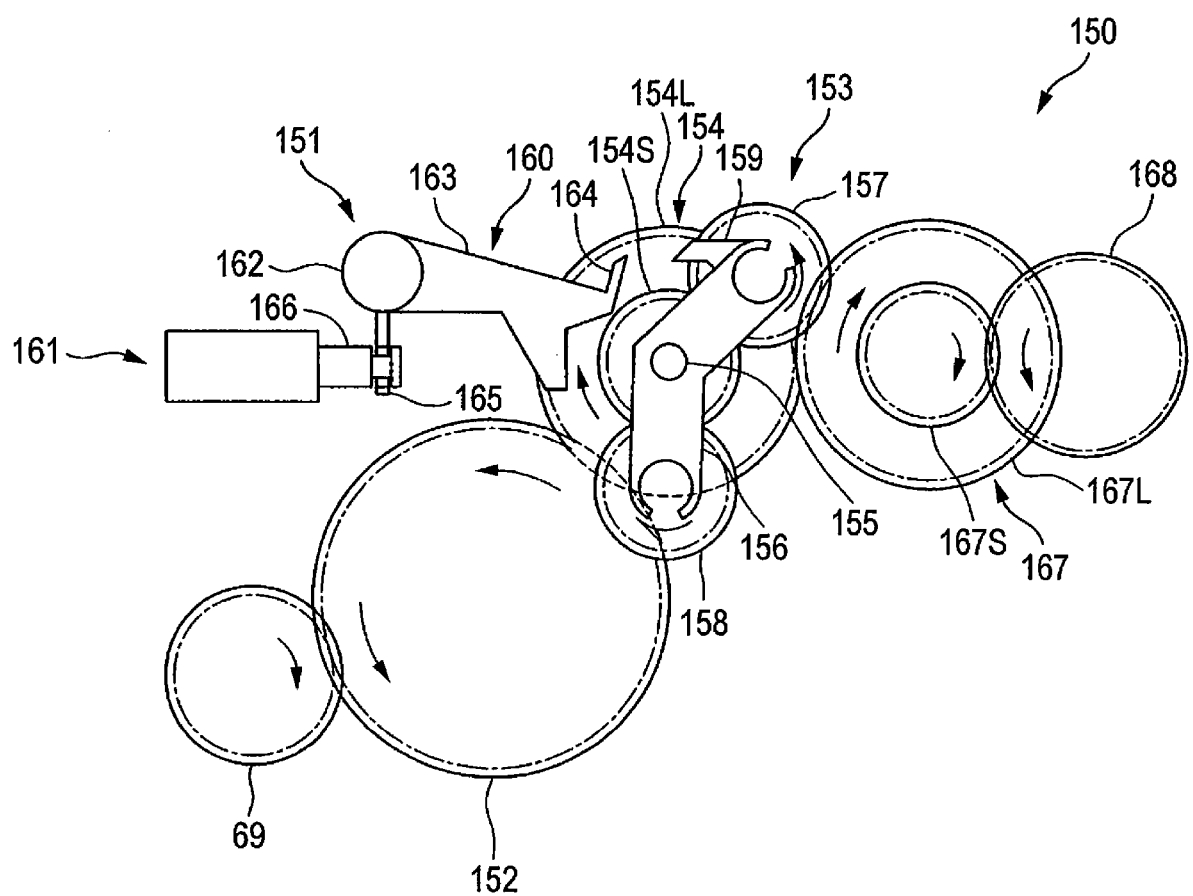
FIG. 17 is a view showing the structure of a drive force transmission mechanism.
Figure 18:
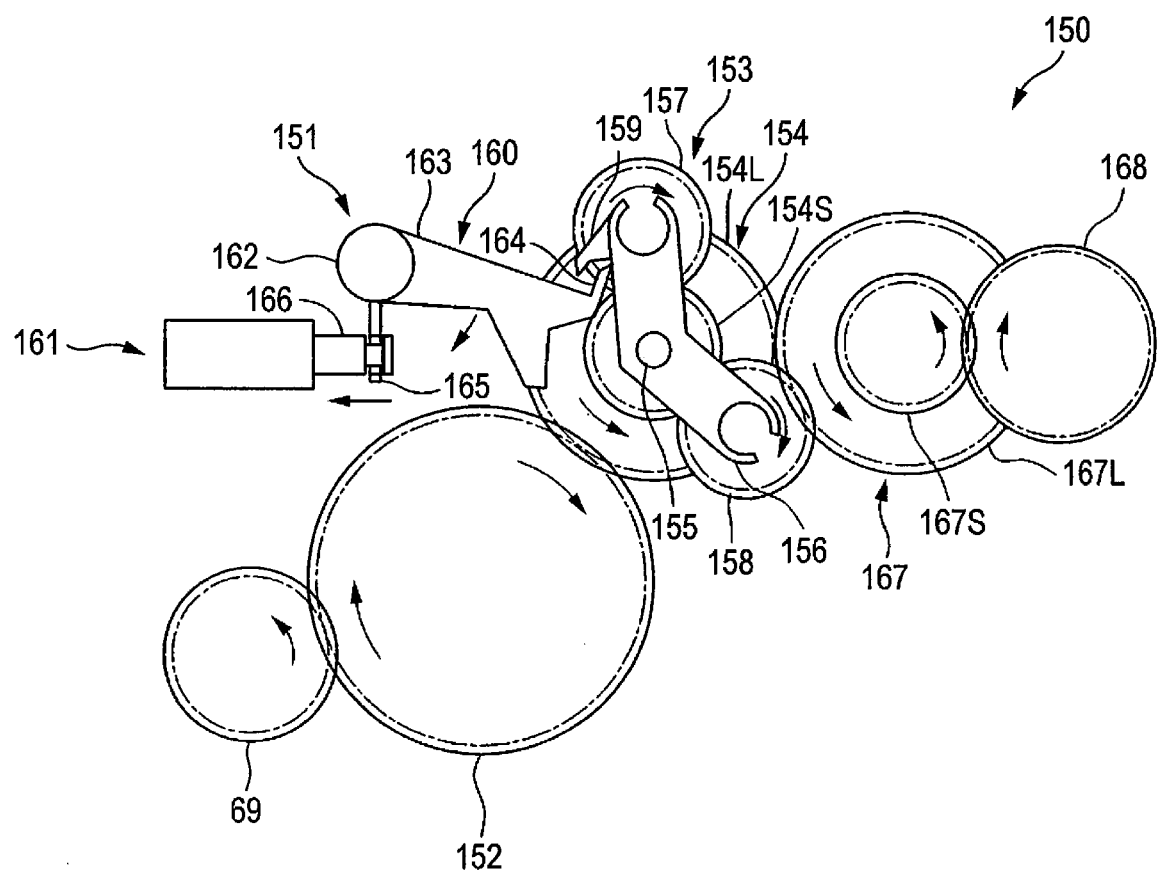
FIG. 18 is a view showing the structure of a drive force transmission mechanism.

FIG. 16 to FIG. 18 show a drive force transmission mechanism 150 and a drive force cutting mechanism 151 from the motor 67 to the switchback roller 43. The drive force transmission mechanism 150 transmits a drive force in a pulling-in direction or a returning direction to the switchback roller 43 based on the rotation direction of the motor 67. The drive force cutting mechanism 151 cuts a drive force transmission from the motor 67 to the switchback roller 43 when the rotation direction of the motor 67 changes from the returning direction of the switchback roller 43 to the pulling-in direction. Here, the pulling-in direction is a direction where a document is pulled-in from the crossing position 40 of the upper portion 32A of the document feed path 32 to the terminal end 41 side of the bidirectional feed path 39, and the returning direction is a direction where a document is returned from the terminal end 41 side of the bidirectional feed path 39 to the document feed path 32.

As shown in FIG. 16, a transmission gear 152 is engaged with the drive gear 69 provided on the drive shaft of the motor 67, whereby a drive force is transmitted to a planetary gear unit 153. Here, the structure from the drive gear 69 to the transmission gear 152 is not particularly limited, and the number and diameter of transmission gears can be changed according to the distance from the drive gear 69 to the planetary gear unit 153. Upon receiving the CW rotation and CCW rotation of the motor 67, a drive force is transmitted so that the transmission gear 152 conducts a CCW rotation or a CW rotation.

The planetary gear unit 153 is formed by freely rotatably providing a support arm 156 coaxially with a shaft 155 of a sun gear 154, and pivotally supporting two planetary gears 157 and 158 respectively engaged with the sun gear 154 on the support arm 156. In the present aspect, there is provided the planetary gear unit 153 having the two planetary gears 157 and 158, however, similar to the planetary gear unit 122 described above, the planetary gear unit 153 may have only one planetary gear.

The sun gear 154 is a two-stage gear for which a large-diameter gear 154L and a small-diameter gear 154S are formed coaxially and integrally. The support arm 156 is freely rotatably provided on the shaft 155 to pivotally support the planetary gears 157 and 158, respectively. The planetary gears 157 and 158 pivotally supported on the support arm 156 respectively engage with the gear 154S of the sun gear 154. When the sun gear 154 rotates, the planetary gears 157 and 158 respectively engaged with the gear 154S rotate. In addition, upon receiving a rotation of the sun gear 154, the support arm 156 also rotates in the same direction. That is, when the sun gear 154 rotates, the planetary gears 157 and 158 revolve around the sun gear 154 while rotating respectively.

In the neighborhood of the leading end where the support arm 156 pivotally supports the planetary gear 157, a latching projection 159 is formed. By the latching projection 159 being latched on the drive force cutting mechanism 151, the support arm 156 that CCW rotates with respect to the shaft 155 of the sun gear 154 is restrained at a given position. As shown in FIG. 16, a position of the support arm 156 being latched on the drive force cutting mechanism 151 is a disengaging position to be described later.

The drive force cutting mechanism 151 includes a latching member 160 and a switchback solenoid 161. The latching member 160 has an arm portion 163 extended in the radial direction toward the support arm 156 from a shaft 162, a latching claw 164 formed in a hook shape at the leading end of the arm portion 163, and a passive portion 165 extended in the radial direction from the shaft 162. The latching claw 164 is engageable with the latching projection 159 of the support arm 156, and is engaged and unengaged with respect to the latching projection 159 by the arm portion 163 being turned about the shaft 162. The passive portion 165 is connected to a shaft 166 of the switchback solenoid 161. The switchback solenoid 161 is a solenoid where, by being supplied (turned on) with power, an electromagnetic force acts to drive the shaft 166 linearly in a direction to sink in the body and, by a power cut (turned off), the electromagnetic force disappears to linearly elastically restore the shaft 166 in a direction projecting from the body. This shaft 166 drive is transmitted to the passive portion 165, whereby the latching portion 160 is turned about the shaft 162 to reach a given position.

With the switchback solenoid 161 off, as shown by a solid line in FIG. 16, the latching member 160 reaches a position where the latching claw 164 is engageable with the latching projection 159 of the support arm 156. The latching member 160 is turnable clockwise from this engaging position, is energized by a spring or the like, and thus maintains the engaging position unless it receives an external force. The engaging projection 159 rotates with the rotation of the support arm 156, and the rotation direction is nearly the radial direction of the latching member 160 in an engaging position.

Therefore, even if the rotational force of the support arm 156 is transmitted to the latching member 160 via the latching projection 159, the latching member 160 never rotates from then position against the charging force of a spring or the like. With the switchback solenoid 161 on, as shown by an alternate long and two short dashed line in FIG. 16, the latching member 160 reaches a position to disengage the latching claw 164 from the latching projection 159.

As shown in FIG. 16, the transmission gear 152 is engaged with the gear 154L of the sun gear 154 of the planetary gear unit 153. As a result of a drive force being transmitted from the motor 67 and the transmission gear 152 rotating in a given direction, the sun gear 154 is rotated in a given direction. For example, as shown in FIG. 16, when the drive gear 69 CCW rotates, the transmission gear 152 CW rotates, and the sun gear 154 CCW rotates. Upon receiving this, the planetary gears 157 and 158 revolve by a CCW rotation. As a result of the support arm 156 rotating with the revolution of the planetary gears 157 and 158, the latching projection 159 of the support arm 156 arrives at a position engageable with the latching claw 164. At that time, when the switchback solenoid 161 is off, as shown in FIG. 16, the latching claw 164 is engaged with the latching projection 159, so that the support arm 156 is restricted from rotation. In this condition, neither of the planetary gears 157 and 158 is engaged with the transmission gear 167. A position of the support arm 156 such that both of the planetary gears 157 and 158 are disengaged from the transmission gear 167 is called a disengaging position in the present specification. By the latching claw 164 being engaged with the latching projection 159, the support arm 156 is restricted from CCW rotation, and the support arm 156 is held at the disengaging position until the switchback solenoid 161 is turned on next time.

As shown in FIG. 16, a transmission gear 167 is arranged at a position adjacent to the planetary gear unit 153. The transmission gear 167 is engageable and disengageable with respect to the planetary gears 157 and 158 of the planetary gear unit 153. The transmission gear 167 is a two-stage gear for which a large-diameter gear 167L and a small-diameter gear 167S are formed coaxially and integrally. With respect to the large-diameter gear 167L, the planetary gears 157 and 158 are engageable and disengageable. The small-diameter gear 167S is engaged with a driven gear 168 provided on the shaft of the switchback roller 43. Here, the gear structure from the transmission gear 167 to the driven gear 168 is not particularly limited, and according to the distance from the transmission gear 167 to the driven gear 168, the number and diameter of transmission gears can be appropriately changed.

As shown in FIG. 17, when the drive gear 69 CW rotates, the transmission gear 152 CCW rotates, and the sun gear 154 CW rotates. Upon receiving this force, the planetary gears 157 and 158 revolve by a CW rotation. The support arm 156 rotates with the revolution of the planetary gears 157 and 158. When the support arm 156 CW rotates, the latching projection 159 is disengaged from the latching claw 164. Therefore, even when the switchback solenoid 161 is off, it is possible for the support arm 159 to CW rotate. As a result of the planetary gears 157 and 158 revolving by a CW rotation, the planetary gear 157 engages with the transmission gear 167.

As a result of the planetary gear 157 having revolved by a CW rotation engaging with the transmission gear 167, revolution of the planetary gear 157 is restrained. Then, the planetary gear 157 rotates by a CCW rotation as a result of being transmitted with a drive force from the sun gear 154. The transmission gear 167 CW rotates as a result of receiving this, and the driven gear 168 CCW rotates. As a result of the driven gear 168 CCW rotating, the switchback roller 43 is rotated in the returning direction.

From the state shown in FIG. 16, when the switchback solenoid 161 is turned on, the shaft 166 is sunk into the body. Thereby, the latching member 160 is turned to disengage the latching claw 164 from the latching projection 159. Therefore, it becomes possible for the support arm 156 to CCW rotate, and the planetary gears 157 and 158 revolve by a CCW rotation. As shown in FIG. 18, the planetary gear 158 having revolved by a CCW rotation engaging with the transmission gear 167, revolution of the planetary gear 158 is restrained. Then, the planetary gear 158 rotates by a CW rotation as a result of being transmitted with a drive force from the sun gear 154. The transmission gear 167 CCW rotates as a result of receiving this force, and the driven gear 168 CW rotates. As a result of the driven gear 168 CW rotating, the switchback roller 43 is rotated in the pulling-in direction. Here, it is sufficient for the switchback solenoid 161 to be turned on only when disengaging the latching claw 164 from the latching projection 159, and even when the switchback solenoid 161 is turned off after the support arm 156 CCW rotates from the disengaging position, the latching claw 164 never engages with the latching projection 159.

As a result of the rotation of the drive gear 67 being switched from a CCW rotation to a CW rotation, the support arm 156 can CW rotate from the state shown in FIG. 18 where the planetary gear 158 and transmission gear 167 are engaged with each other. As a result of the support arm 156 CW rotating, the planetary gear 157 and transmission gear 167 reach the state shown in FIG. 17 where these are engaged with each other. Then, as a result of the rotation of the drive gear 67 being switched from a CW rotation to a CCW rotation, the support arm 156 can CCW rotate from the state shown in FIG. 17 and reach a disengaging position where the latching claw 164 and latching projection 159 are engaged with each other as shown in FIG. 16.

Figure 19:
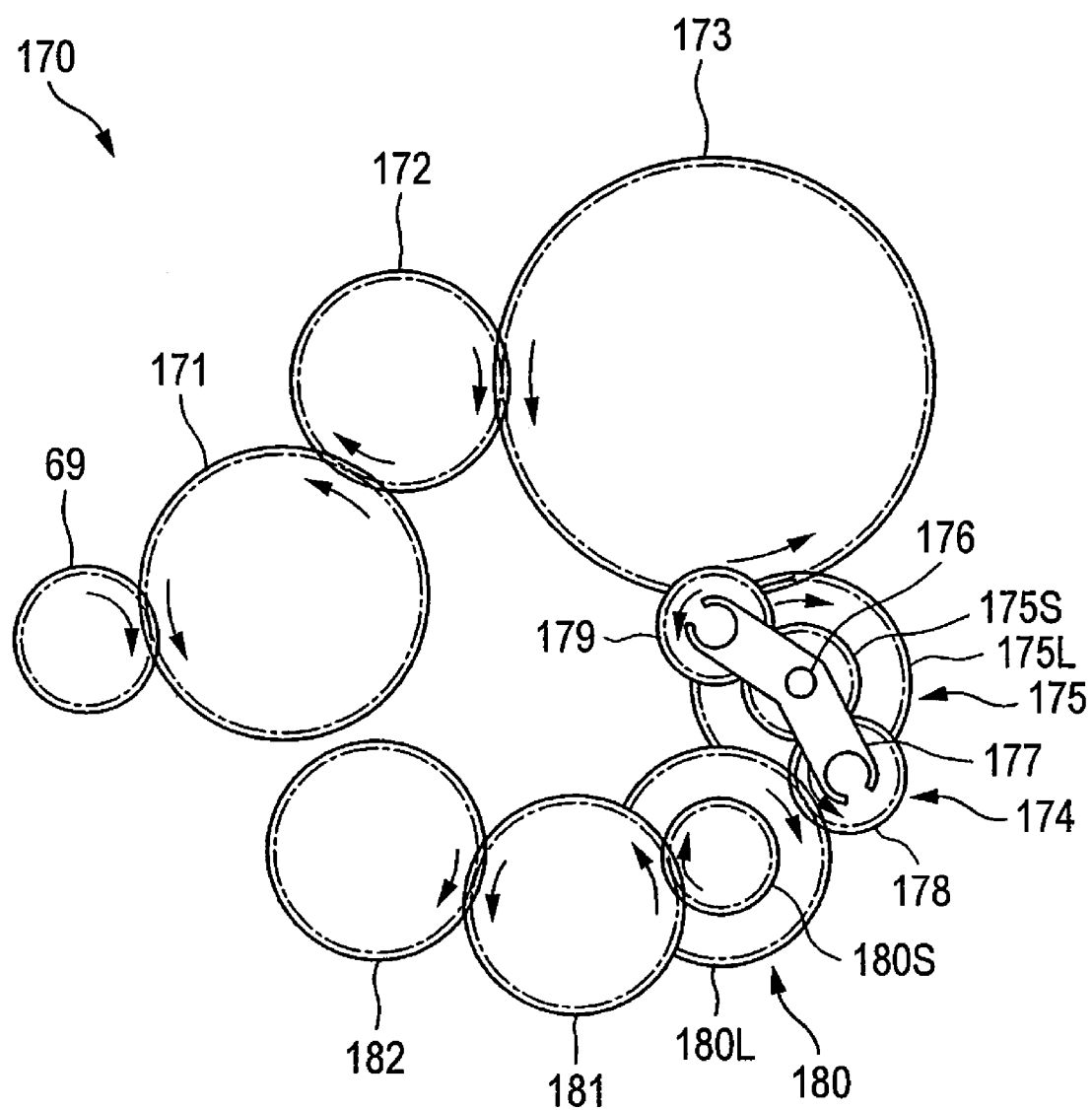
FIG. 19 is a view showing the structure of a drive force transmission mechanism.
Figure 20:
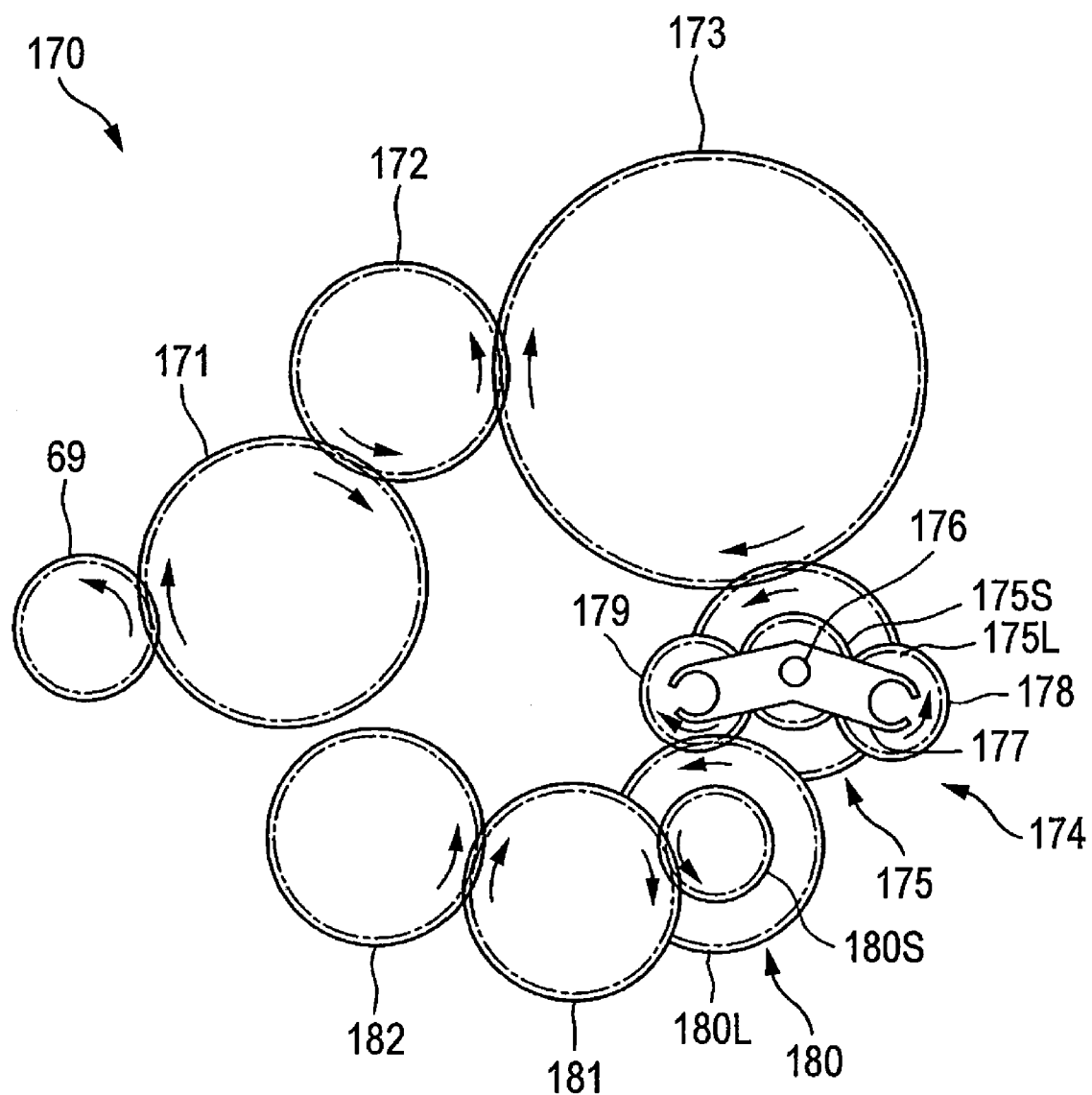
FIG. 20 is a view showing the structure of a drive force transmission mechanism.

FIG. 19 and FIG. 20 show the drive force transmission mechanism 170 from the motor 67 to the guide flap 50. This drive force transmission mechanism 107 along with the aforementioned drive force transmission mechanism 120 constitutes a drive force transmission unit of the present invention. The drive force transmission mechanism 170 is a mechanism that changes the position of the guide flap 50 to a first guiding position or a second guiding position based on the rotation direction of the motor 67.

As shown in FIG. 19, transmission gears 171, 172, and 173 are engaged in sequence with the driven gear 69 provided on the drive shaft of the motor 67, whereby a drive force is transmitted from the transmission gear 173 to a planetary gear unit 174. Here, the number of gears and the like from the drive gear 69 to the transmission gear 173 is not particularly limited, and the number and diameter of transmission gears can be changed according to the distance from the drive gear 69 to the planetary gear unit 174. Upon receiving the CW rotation and CCW rotation of the motor 67, a drive force is transmitted so that the transmission gear 173 conducts a CCW rotation or a CW rotation.

The planetary gear unit 174 is formed by freely rotatably providing a support arm 177 coaxially with a shaft 176 of a sun gear 175, and pivotally supporting two planetary gears 178 and 179 respectively engaged with the sun gear 175. In the present aspect, there is provided the planetary gear unit 174 having the two planetary gears 178 and 179, however, the number of planetary gears is not particularly limited, and the planetary gear unit 174 may have only one planetary gear.

The sun gear 175 is a two-stage gear for which a large-diameter gear 175L and a small-diameter gear 175S are formed coaxially and integrally. The planetary gears 178 and 179 pivotally supported on the support arm 177 are respectively engaged with the gear 175S of the sun gear 175. When the sun gear 175 rotates, the planetary gears 178 and 179 respectively engaged with the gear 175S rotates. In addition, upon receiving the rotation of the sun gear 175, the support arm 177 also rotates in the same direction. That is, when the sun gear 175 rotates, the planetary gears 178 and 179 revolve around the sun gear 175 while rotating respectively.

The transmission gear 173 is engaged with the sun gear 175 of the planetary gear unit 174. As a result of a drive force being transmitted from the motor 67 and the transmission gear 173 rotating in a given direction, the sun gear 175 is rotated in a given direction. For example, as shown in FIG. 19, when the drive gear 69 CW rotates, the transmission gear 173 CCW rotates, the sun gear 175 CW rotates, and the planetary gears 178 and 189 revolve by a CW rotation.

As shown in FIG. 19, a transmission gear 180 and a transmission gear 181 are arranged adjacent to the planetary gear unit 174. The transmission gear 180 is a two-stage gear for which a large-diameter gear 180L and a small-diameter gear 180S are formed coaxially and integrally. The planetary gears 178 and 179 of the planetary gear unit 174 are engageable and disengageable with respect to the gear 180L of the transmission gear 180. Moreover, the gear 180S of the transmission gear 180 and transmission gear 181 are engaged with each other, and the transmission gear 181 is engaged with a driven gear 182 provided on the shaft of the guide flap 50.

As shown in FIG. 19, as a result of the planetary gears 178 and 179 revolving by a CW rotation, the planetary gear 178 is engaged with the gear 180L of the transmission gear 180. On the other hand, the planetary gear 179 is disengaged from the transmission gear 180. As a result of the planetary gear 178 having revolved by a CW rotation engaging with the transmission gear 180, the planetary gears 178 and 189 are restrained from revolution. Then, the planetary gear 178 rotates by a CCW rotation as a result of being transmitted with a drive force from the sun gear 175. The transmission gear 180 CW rotates as a result of receiving this force. The transmission gear 181 engaged with the transmission gear 180 CCW rotates, and the driven gear 182 engaged with the transmission gear 181 CW rotates. As a result of the driven gear 182 CW rotating, the guide flap 50 is rotated so as to swing upward, and reaches the first guiding position.

As shown in FIG. 20, when the drive gear 69 CCW rotates, the transmission gear 173 CW rotates, the sun gear 175 CCW rotates, and the planetary gears 178 and 179 revolve by a CCW rotation. As a result of the planetary gears 178 and 179 revolving by a CCW rotation, the planetary gear 179 is engaged with the gear 180L of the transmission gear 180. On the other hand, the planetary gear 178 is disengaged from the transmission gear 180. As a result of the planetary gear 179 having revolved by a CCW rotation engaging with the transmission gear 180, the planetary gears 178 and 179 are restrained from revolution. Then, the planetary gear 179 rotates by a CW rotation as a result of being transmitted with a drive force from the sun gear 175. The transmission gear 180 CW rotates as a result of receiving this force. The transmission gear 181 engaged with the transmission gear 180 CW rotates, and the driven gear 182 engaged with the transmission gear 181 CCW rotates. As a result of the driven gear 182 CCW rotating, the guide flap 50 is rotated so as to swing downward, and reaches the second guiding position.

Here, although not shown in the figures, provided is a slip clutch between the shaft on which the driven gear 182 is provided and a guide flap 50. By this slip clutch, a rotation of the shaft is transmitted to the guide flap 50. The slip clutch is a clutch for which a clutch plate slips as a result of receiving a load greater than a given torque, so that a drive force transmission is cut. As shown in FIG. 4, the guide flap 50 is swung between the first guiding position and second guiding position, and is restricted so as not to be turned beyond the respective positions by contacting the guide member. Therefore, after the guide flap 50 reaches the first guiding position or the second guiding position, the slip clutch slips as a result of the guide flap 50 being restricted from rotation, and in a standstill state of the guide flap 50 at the first guiding position or the second guiding position, the shaft on which the driven gear 182 is provided can further be rotated. Moreover, the gear structure from the transmission gear 180 to the driven gear 182 is not particularly limited, and according to the distance from the transmission gear 180 to the driven gear 182, the number and diameter of transmission gears can be appropriately changed.

Now, description will be given below of the image scanning operation to be executed by the present image reading apparatus 1. The image reading apparatus 1 can not only be used as an FBS but also can use the ADF 3. However, use of the image reading apparatus 1 as an FBS does not particularly relate to the present invention and thus a detailed description thereof is omitted here. When using the ADF 3, it is considered that the document cover 4 is closed with respect to the document placement base member 2. The opening and closing of the document cover 4 can be detected by sensors disposed on the document placement base member 2, and when the document cover 4 is closed, the ADF 3 can be used. A document Gn to be scanned is placed on the sheet feed tray 30. The document Gn is placed on the sheet feed tray 30 in a so called face-up manner that the scanning side (first side) of the document Gn faces upward. Also, the number of documents Gn may be one sheet or two or more sheets. For example, when scanning the images of two or more sheets of documents Gn having the same size, the documents Gn are placed on the sheet feed tray 30 in such a manner that the first side of the first document G1 faces upward, that is, the documents Gn are superimposed on top of one another in a so called face-up manner.

When a scan start instruction is input to the image reading apparatus 1, the motor 67 is driven, so that the pickup roller 33, separation roller 34, feed rollers 35A, 35B, 35C, and 35D, sheet discharge roller 36, and switchback roller 43 are driven and rotated at their respective given timings. Also, the arm 29 is lowered down to thereby bring the pickup roller 33 into pressure contact with the document G1 placed on the sheet feed tray 30. Then, the documents Gn are separated one by one from the remaining documents and are fed to the document feed path 32, starting from the document G1 that is placed at the highest position and receives directly the rotation forces of the pickup roller 33 and separation roller 34. The thus fed document Gn is guided by the document feed path 32 and is fed to the scan point, where the images of the document Gn are scanned by the image read unit 22 standing by below the scan point. The document Gn, the images of which have been scanned, is discharged to the sheet discharge tray 31. In such an image scanning operation, the feed path of the document Gn when the images of one side of the document Gn are scanned is different from that when the images of both sides of the document Gn are scanned. Whether the images of one side of the document Gn are scanned or the images of both sides of the document Gn are scanned is judged according to a one side scanning mode (corresponds to a first feed mode of the present invention) or a double-sided scanning mode (corresponds to a second feed mode of the present invention) which have been previously set before the scan start instruction is input. The inputted one side scanning mode or double-sided scanning mode is stored as feed mode information in the RAM 63 of the control part 60. Here, when the one side scanning mode is set, the image reading apparatus 1 is operated so as to feed the document through a feed path according to the one side scanning mode, whereas when the double-sided scanning mode is set, the image reading apparatus 1 is operated so as to feed the document through a feed path according to the double-sided scanning mode.

Figure 21:
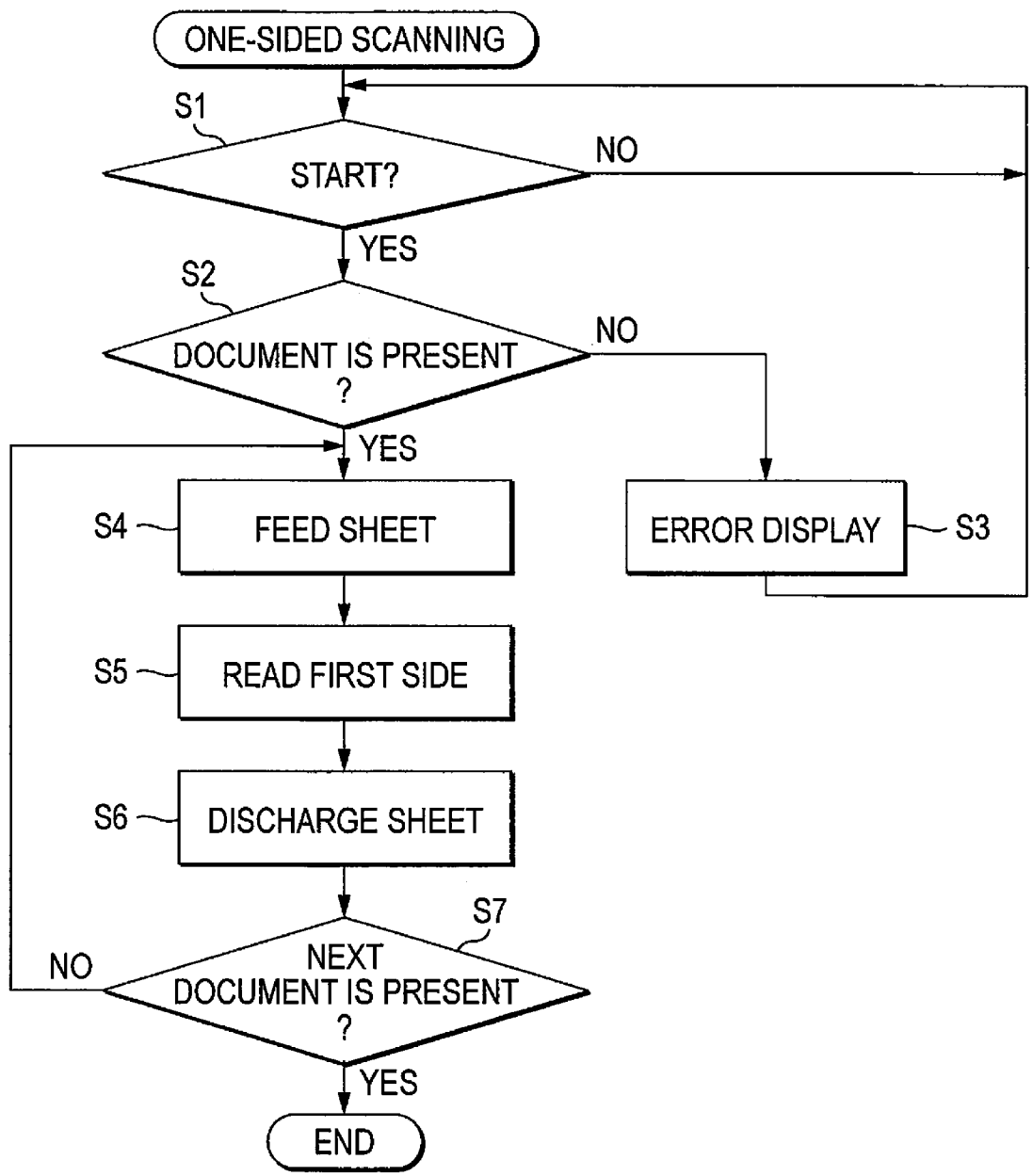
FIG. 21 is a flowchart for explaining operations in a one-sided scanning mode.
Figure 22:
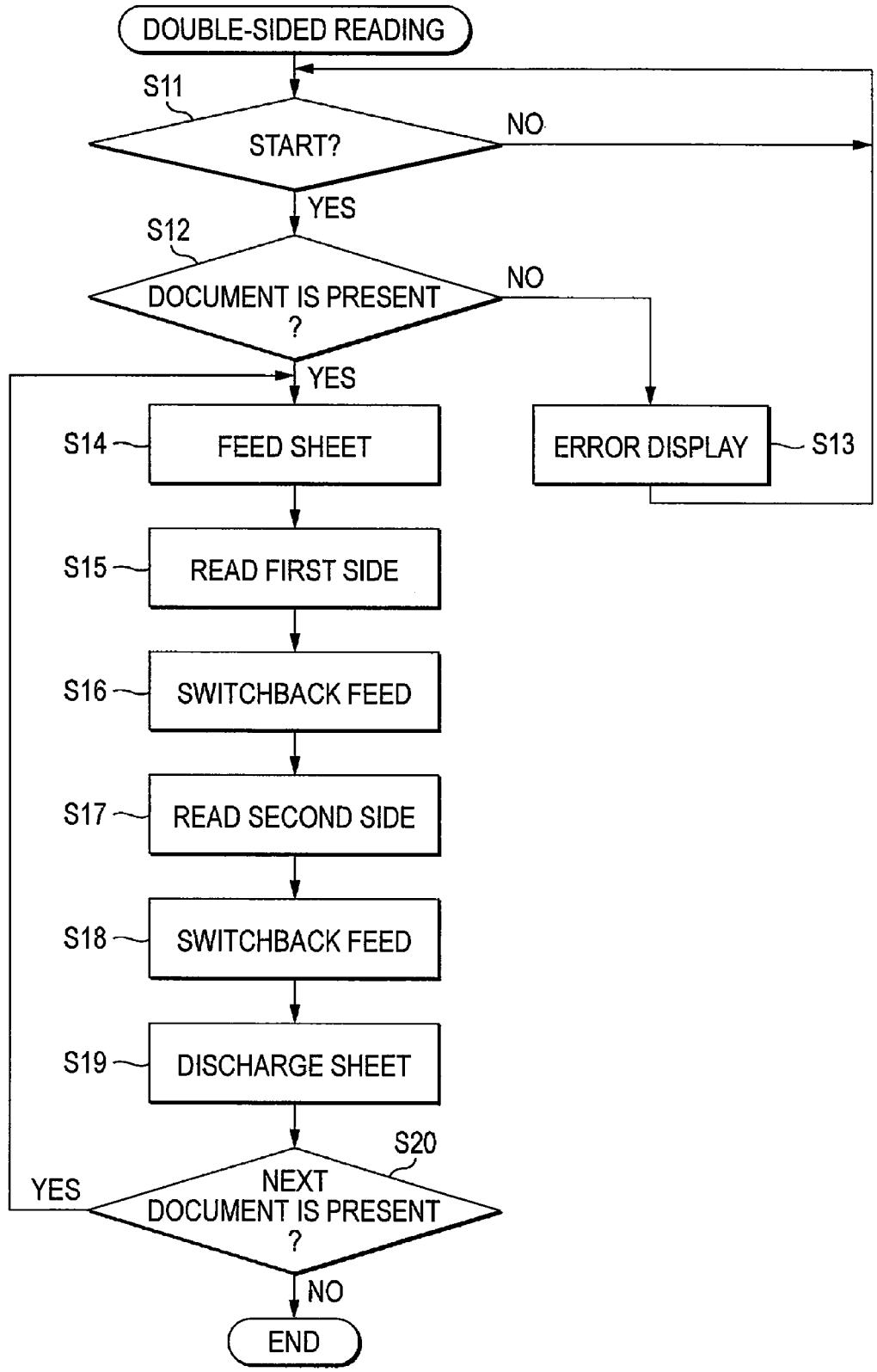
FIG. 22 is a flowchart for explaining operations in a double-sided scanning mode.
Figure 23:
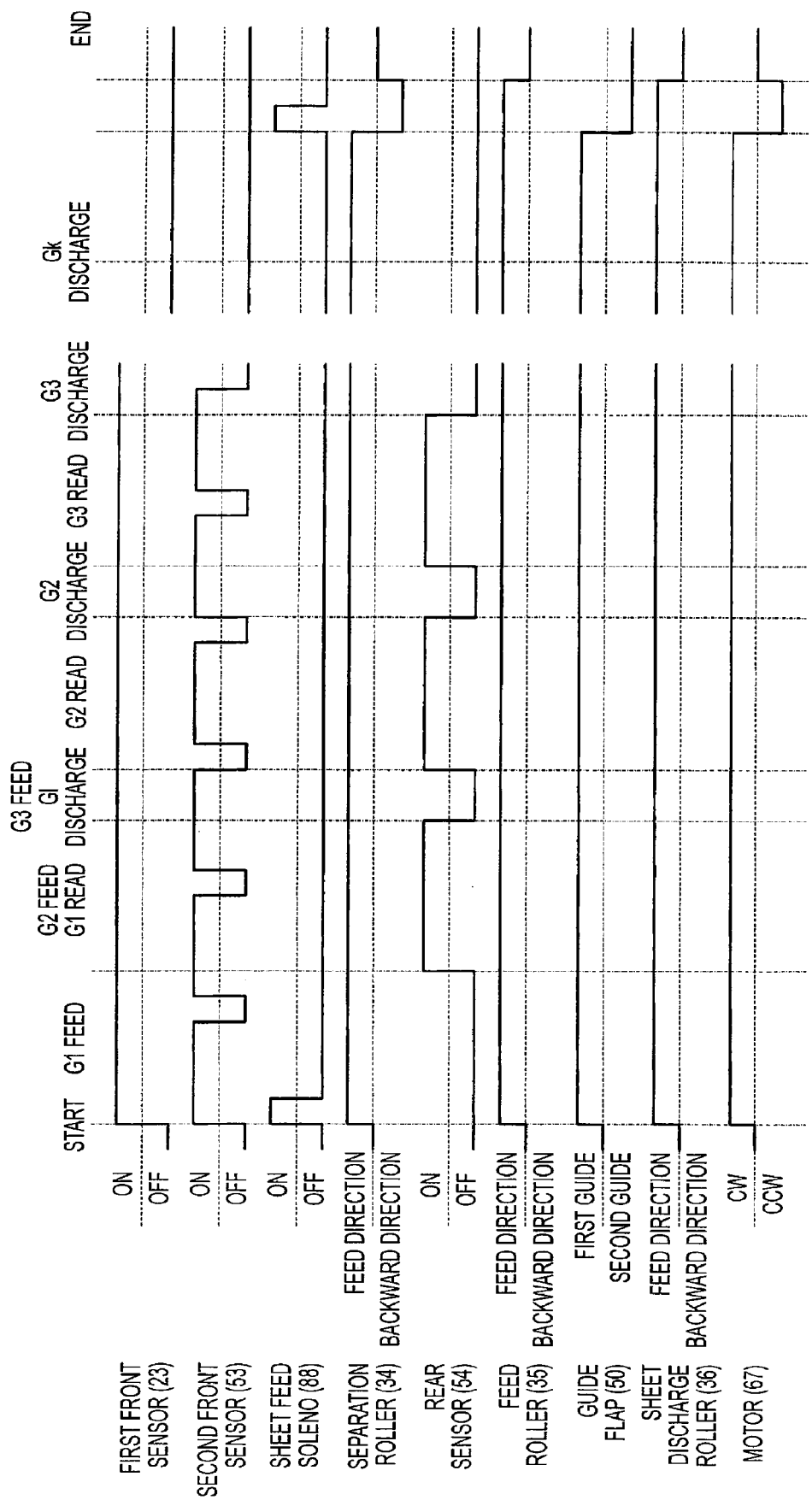
FIG. 23 is a timing chart of respective components in a one-sided scanning mode.
Figure 24:
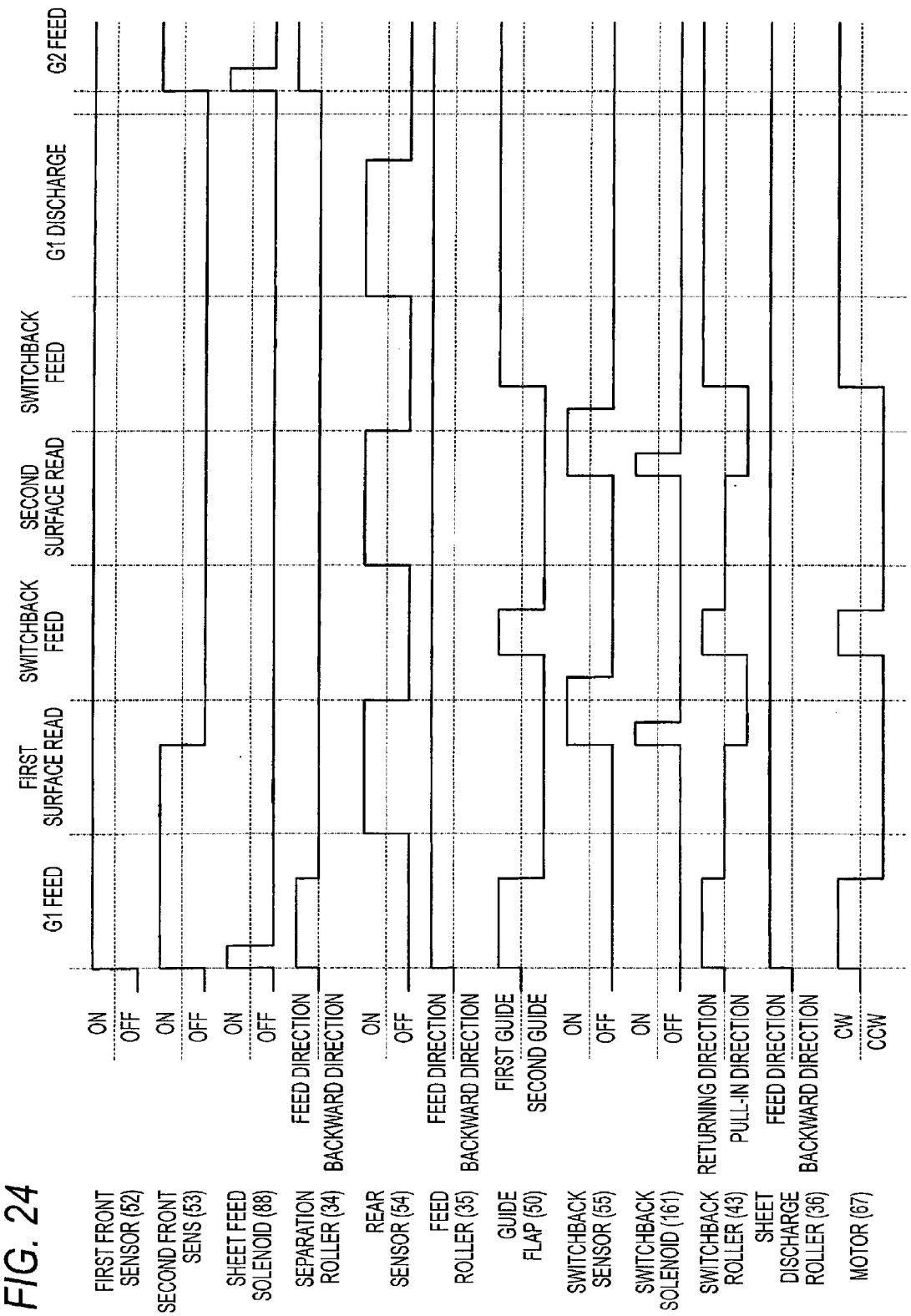
FIG. 24 is a timing chart of respective components in a double-sided scanning mode.

FIG. 21 is a flowchart for explaining operations of the image reading apparatus 1 in a one-sided scanning mode. FIG. 22 is a flowchart for explaining operations of the image reading apparatus 1 in a double-sided scanning mode. Also, FIG. 23 is a timing chart of respective components in a sinplex scanning mode. FIG. 24 is a timing chart of respective components in a double-sided scanning mode. Also, FIG. 25 to FIG. 30 are respectively typical views showing the feeding state of the document Gn in a simplex scanning mode. FIG. 31 to FIG. 37 are respectively typical views showing the feeding state of the document Gn in a double-sided scanning mode. In the drawings, a surface shown by "1" in the document Gn is a first side that is scanned first in the double-sided scanning operation, whereas a surface shown by "2" is a second side to be scanned later, and the first and second sides are completely opposite to each other.

Figure 25:
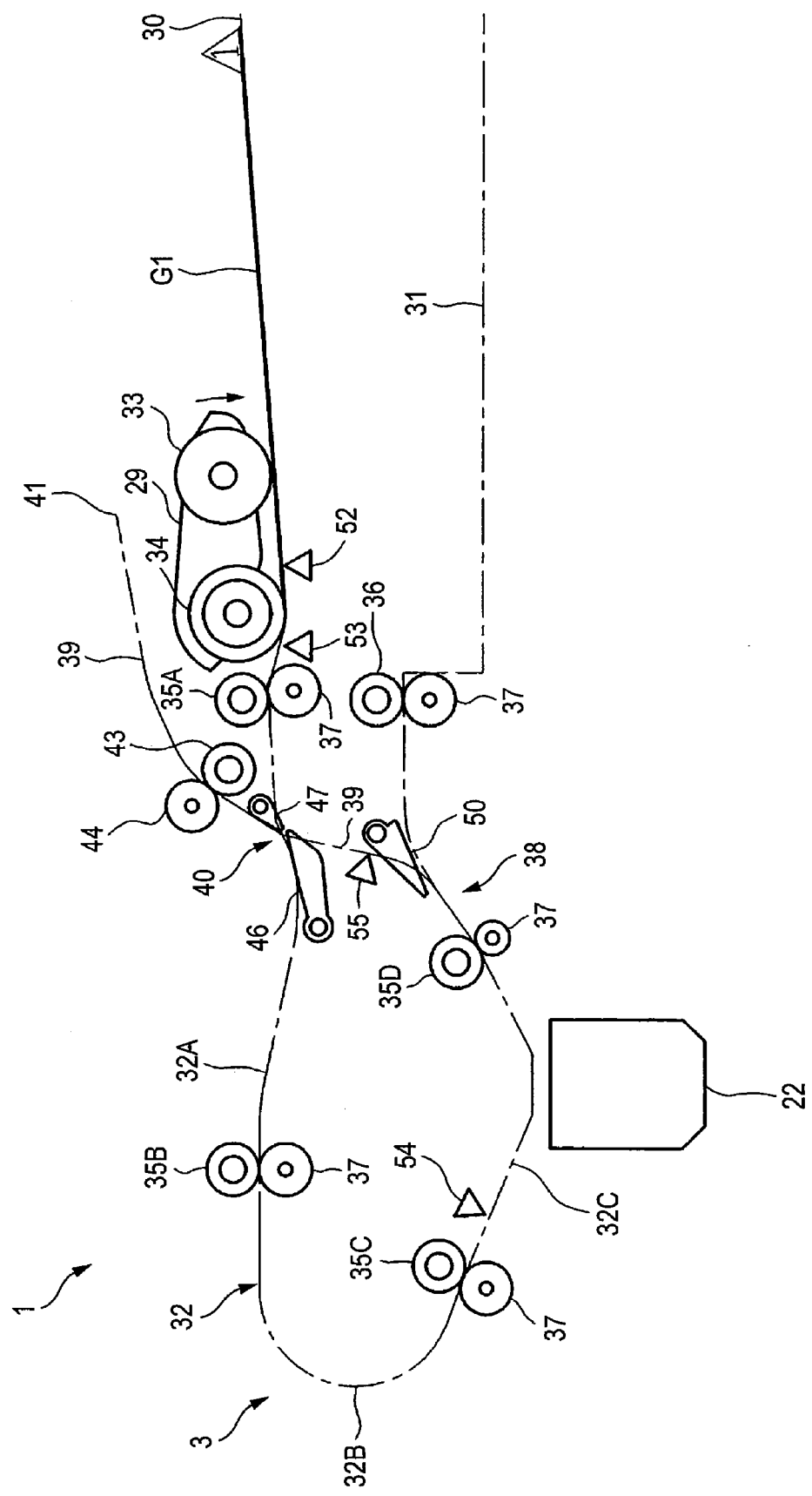
FIG. 25 is a typical view showing image scanning operations in a one-sided scanning mode.

Before the one side scanning starts, as shown in FIG. 25, the guide flap 50 is held at a position which allows the feed path in the connecting position 38 to be continuous from the scan point side of the document feed path 32 to the sheet discharge tray 31 side. The guide flap 46 is held at a position which allows the feed path in the crossing position 40 to be continuous from the sheet feed tray 30 side of the document feed path 32 to the scan point side. The guide flap 47 is held at a position which allows the feed path in the crossing position 40 to be continuous from the terminal end 41 side of the bidirectional feed path 39 to the scan point side of the document feed path 32.

When a scan start instruction is input to the image reading apparatus 1 (S1 (Y)), whether the document Gn has been placed on the sheet feed tray 30 is detected by the first front sensor 52 (S2). When it is judged that the document Gn has not been placed on the sheet feed tray 30 (S2 (N)), the control part 60 makes an error display "no document" on the display portion of the image reading apparatus 1 (S3). When the document Gn has been placed on the sheet feed tray 30, the control part 60 drives the motor 67 by a CW rotation. In the present aspect, description is given on the assumption that the motor 67 is CW rotated at the start of scanning, however, whether to CW rotate or CCW rotate the motor 67 at the start of scanning is optional, and the rotation direction of the motor 67 is a relative concept.

The control part 60 not only drives the motor 67 by a CW rotation but also turns on the sheet feed solenoid 88. Therefore, as shown in FIG. 7 and FIG. 8, for the planetary gear unit 75 of the drive force transmission mechanism 70, the latch by the latching mechanism 86 is released, and the planetary gear unit 75 revolves the planetary gears 79 and 80 by a CCW rotation based on rotation of the sun gear 76 to transmit a drive force to the transmission gear 94. Thereby, the driven gear 95 is CW rotated. As a result of the driven gear 95 CW rotating, the drive force is transmitted to the arm 29 to lower down the arm 29. This brings the pickup roller 33 into pressure contact with the document G1 placed on the sheet feed tray 30. In addition, the CW rotation of the driven gear 95 is transmitted to the pickup roller 33 and separation roller 34 by the drive force transmission mechanism 110, and the pickup roller 33 and separation roller 34 rotate in the sheet feed direction, whereby the document G1 is sent into the document feed path 32. When a plurality of documents Gn are placed on the sheet feed tray 30, there is a possibility that, as a document G1 existing at the highest position is fed, a document G2 just below the document G1 can be fed together with the document G1. However, the document G2 is stopped by the separation pad provided at the opposite position of the separation roller 34. Thus, the document G1 is fed (S4).

In the document feed path 32, a drive force from the motor 67 is transmitted to the feed rollers 35A, 35B, 35C, and 35D and sheet discharge roller 36, whereby these respective rollers are rotated so as to feed the document Gn from the upstream side of the document feed path 32 to the downstream side thereof, that is, in the feed direction. The document G1 fed from the sheet feed tray 30 to the document feed path 32 is nipped between the feed roller 35A and pinch roller 37 and thus the rotation force of these rollers is transmitted to the document G1, whereby the document G1 is fed to the crossing position 40 along the document feed path 32. When the document G1 is fed to the document feed path 32, the second front sensor 53 is turned on.

Figure 26:
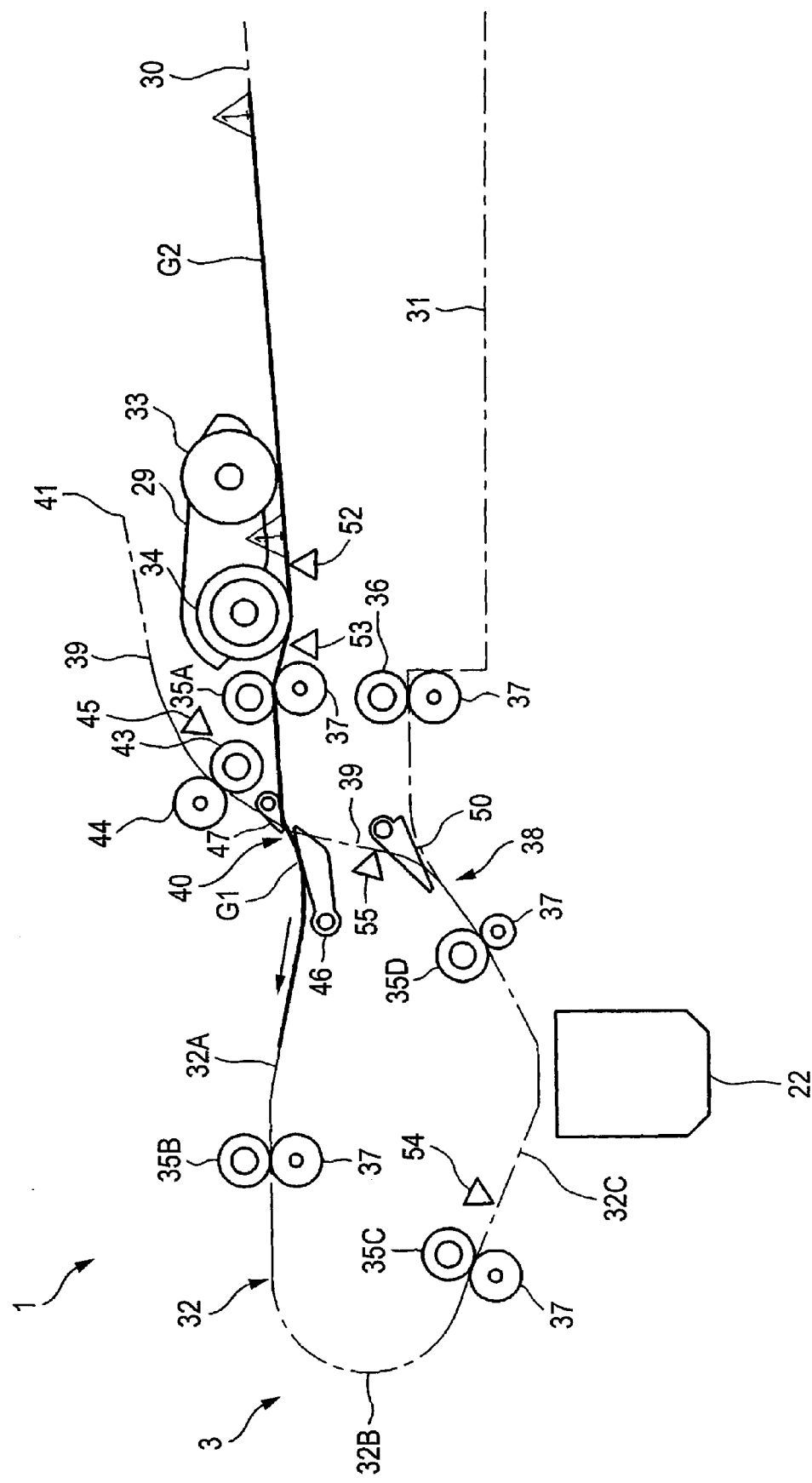
FIG. 26 is a typical view showing image scanning operations in a one-sided scanning mode.

Since the guide flap 47 closes the feed path from the sheet feed tray 30 side of the document feed path 32 to the crossing position 40, the document G1 fed to the crossing position 40 is contacted with the guide flap 47. As shown in FIG. 26, the guide flap 47 is rotated from the fifth guiding position to the sixth guiding position in such a manner that it is pushed aside by the document G1 being fed along the document feed path 32. As a result, not only is the feed path from the sheet feed tray 30 side of the document feed path 32 to the scan point side allowed to be continuous, but also the feed path to the terminal end 41 side of the bidirectional feed path 39 is closed. Also, the feed path to the connecting position 38 side of the bidirectional feed path 39 is closed by the guide flap 46. Therefore, the document G1 having arrived at the crossing position 40 from the sheet feed tray 30 side of the document feed path 32 is guided by the guide flaps 46 and 47 and is thereby fed to the scan point side of the document feed path 32 without advancing in either direction of the bidirectional feed path 39.

Figure 27:
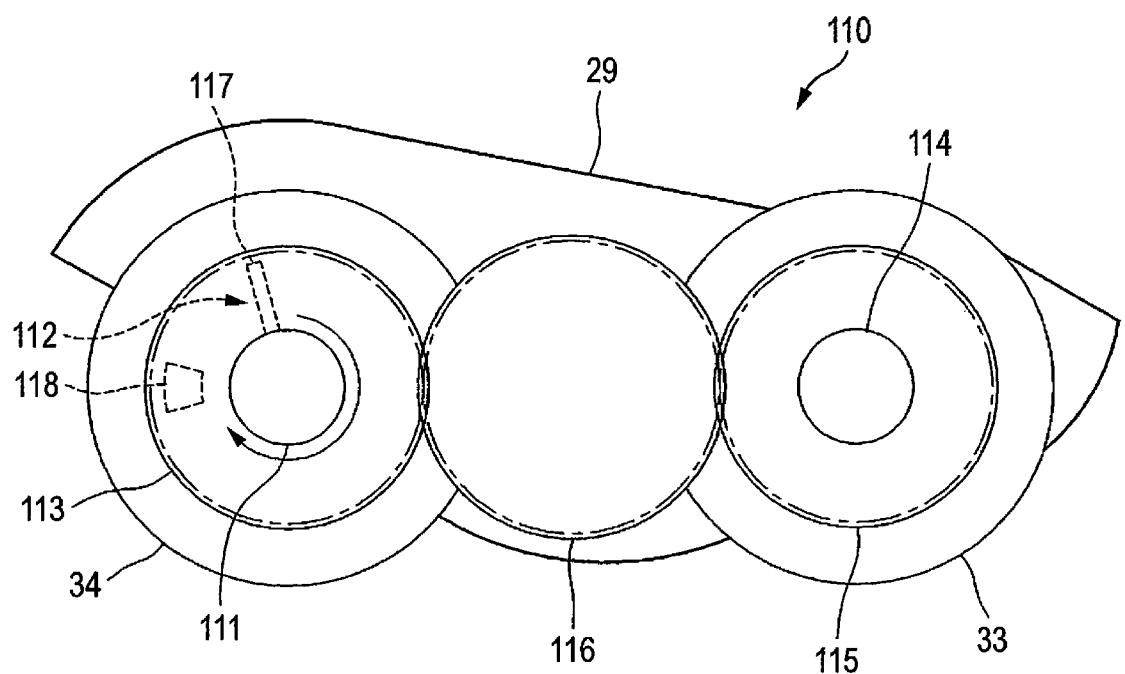
FIG. 27 is a view showing a slip state of a separation roller.

The peripheral speed of the respective feed rollers 35A, 35B, 35C, and 35D and sheet discharge roller 36 that rotate as a result of being transmitted with a drive force by the drive force transmission mechanism 120 from the motor 67 is set so as to be faster than the peripheral speed of the separation roller 34 that rotates as a result of being transmitted with a drive force by the drive force transmission mechanisms 70 and 110 from the motor 67. The document G1 having been fed to the document feed path 32 from the sheet feed tray 30 is fed while being nipped between the feed roller 35A and pinch roller 37 in pressure contact with the separation roller 34. As shown in FIG. 12, the separation roller 34 is allowed by the one round clutch 112 to slip almost one round in the feed direction. Therefore, as shown in FIG. 27, the separation roller 34 that is in pressure contact with the document G1 rotates in a following manner due to the document G1 fed at a given speed by the feed roller 35A and slips so as to advance in the feed direction further than the shaft 111.

Figure 28:
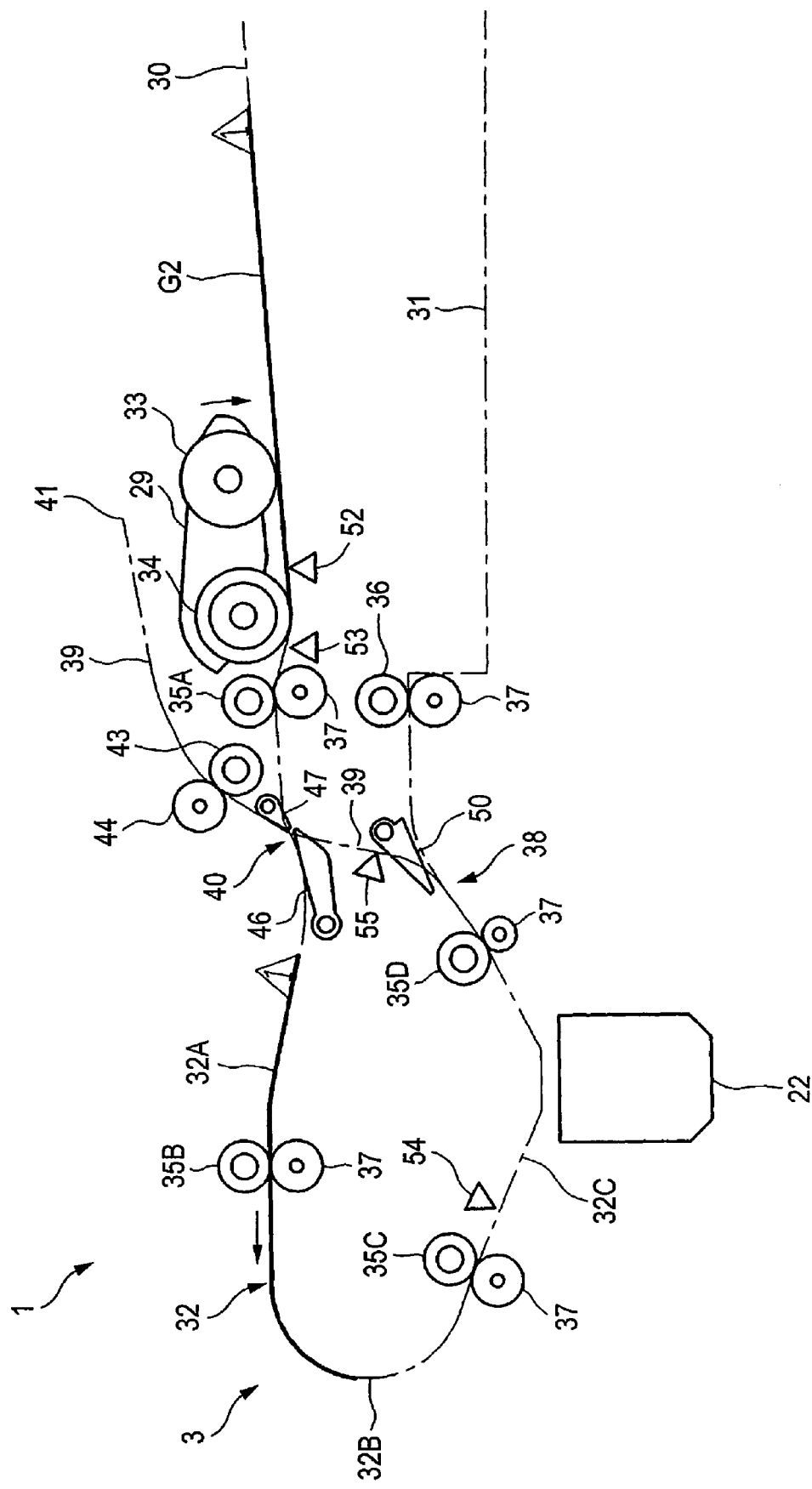
FIG. 28 is a typical view showing image scanning operations in a one-sided scanning mode.
Figure 29:
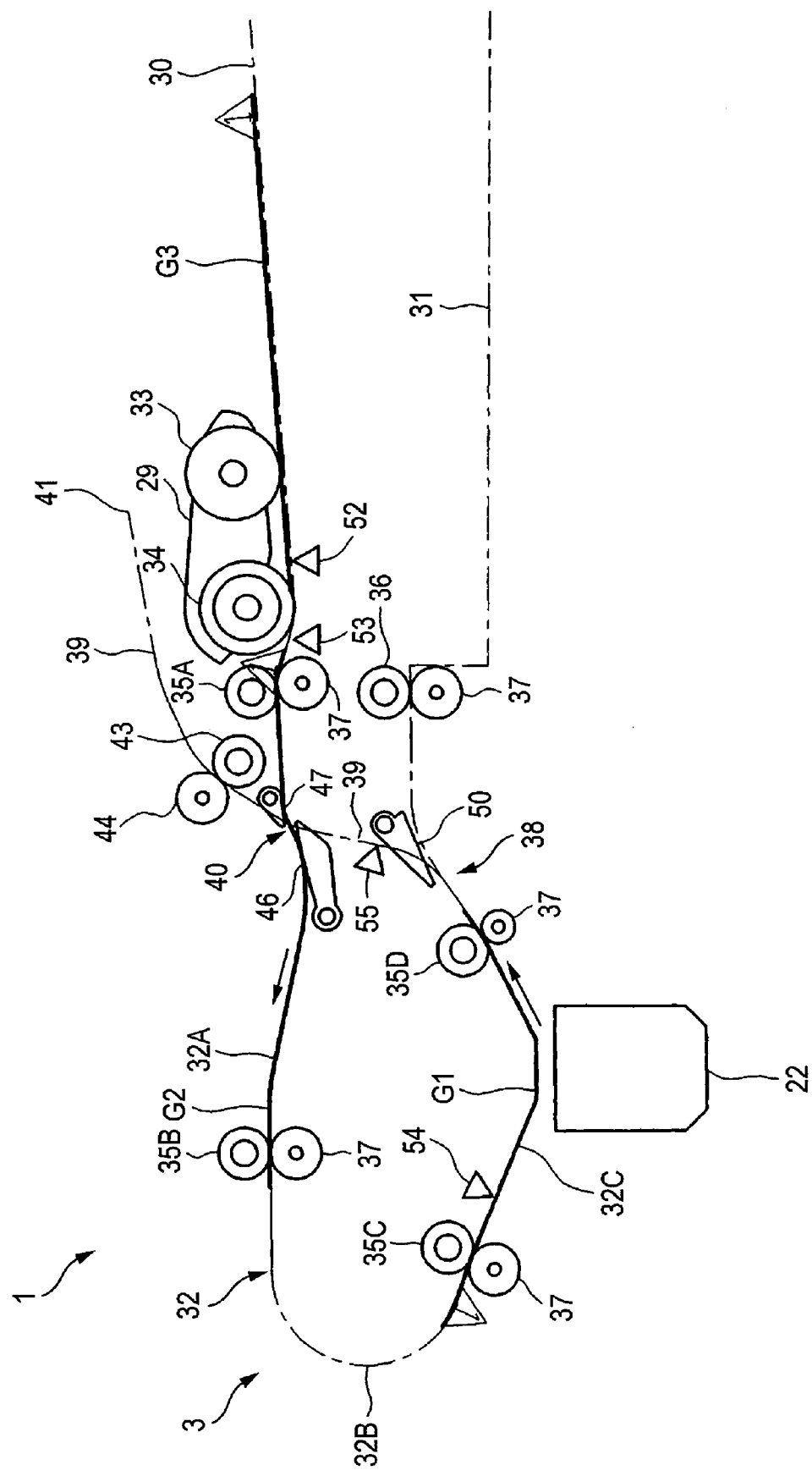
FIG. 29 is a typical view showing image scanning operations in a one-sided scanning mode.

As shown in FIG. 28, as a result of the first document G1 being completely fed to the document feed path 32 from the sheet feed tray 30, the document G1 separates from the separation roller 34. As a result, slip of the separation roller 34 that has rotated in a following manner due to the document G1 stops. As shown in FIG. 27, due to a slip of the separation roller 34, the latching piece 118 of the separation roller 34 has advanced in the feed direction with respect to the pin 117 of the shaft 111. Although a drive force has been transmitted to the shaft 111 from the motor 67, the separation roller 34 does not rotate until the pin 117 rotates to a position to engage with the latching piece 118. Therefore, the second document G2 being in pressure contact with the separation roller 34 is not fed to the document feed path 32 until the separation roller 34 rotates. On the other hand, the document G1 that has been fed to the document feed path 32 is fed to the document feed path 32 by a rotation of the feed rollers 35A and 35B. Thereby, as shown in FIG. 28, a given space is formed in the feed direction between the first document G1 and second document G2. Then, when the shaft 111 rotates until the pin 117 engages with the latching piece 118, the rotation of the shaft 111 is transmitted by the pin 117 and latching piece 118 to thereby rotate the separation roller 34 in the feed direction. Thereby, as shown in FIG. 29, the second document G2 is fed to the document feed path 32. In this manner, without driving the sheet feed solenoid 88 for the respective documents Gn, the respective documents Gn can be fed to the document feed path 32 at given spaces continuously and speedily. The second front sensor 53 is turned off, as shown in FIG. 28, as a result of the trailing end of the document G1 passing through, and then is turned on, as shown in FIG. 29, a result of the leading end of the document G2 passing through.

As shown in FIG. 29, the document G1 is fed so as to reverse downward along a curve portion 32B of the document feed path 32, while the linear sensor 54 detects the feed-direction leading end of the document G1 and is thereby turned on. Since the feed-direction leading end of the document G1 arrives at the scan point after an elapse of a given time since it is detected by the rear sensor 54, when the feed-direction leading end of the document G1 arrives at the scan point, the control part 60 operates the image read unit 22 to conduct image scanning of the document G1 (S5). The document G1 passes through the scan point in such a manner that the first side is opposed to the image read unit 22, and images on the first side of the document G1 are scanned by the image read unit 22. The rear sensor 54 is turned off when it detects the feed-direction trailing end of the document G1. The control part 60 ends image scanning of the document G1 by the image read unit 22 after an elapse of a given time since the rear sensor 64 is turned off.

Figure 30:
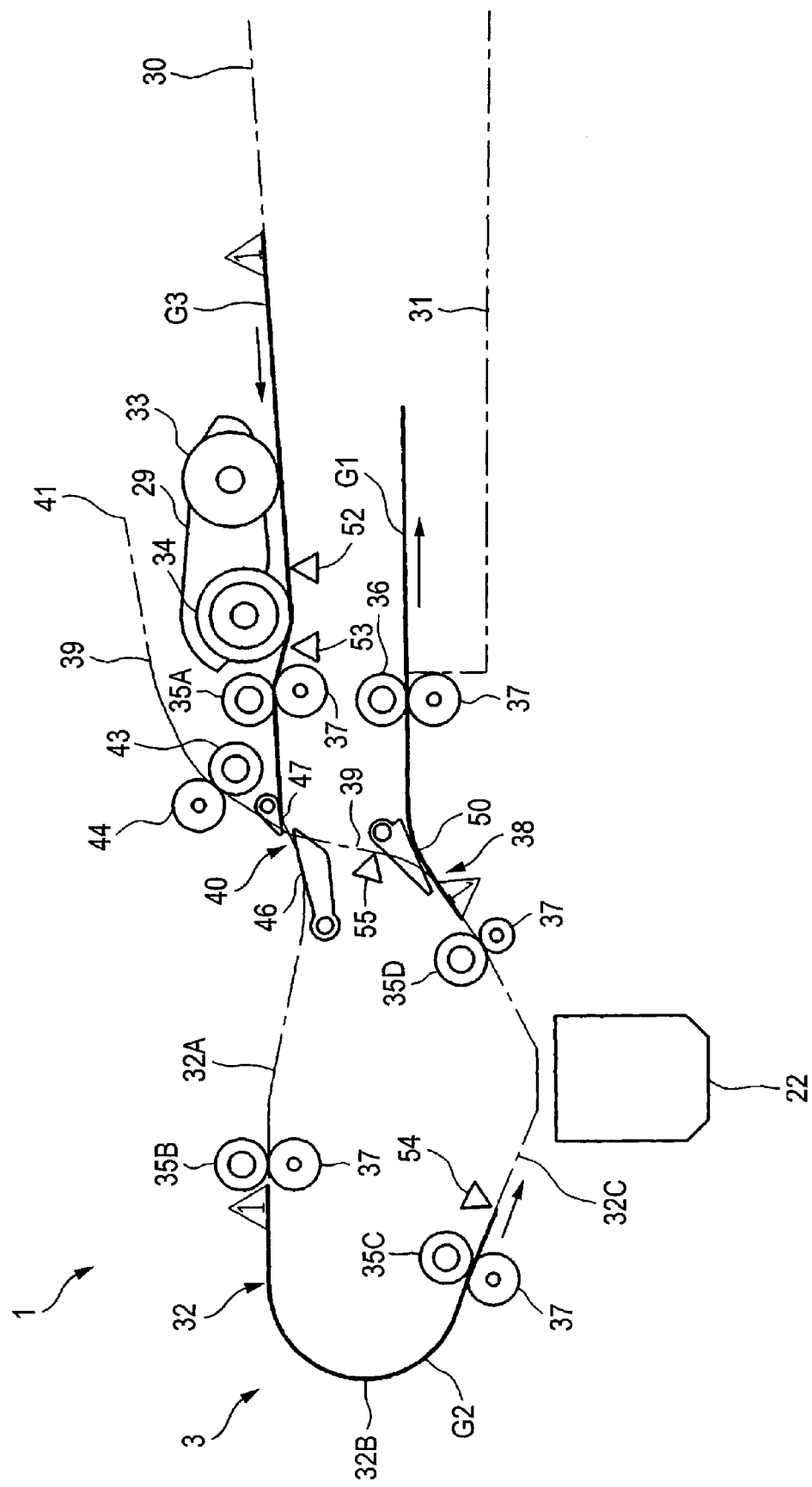
FIG. 30 is a typical view showing image scanning operations in a one-sided scanning mode.

Since the motor 67 CW rotates, as shown in FIG. 30, the glide flap 50 maintains the first guiding position. The guide flap 50 guides, at the connecting position 38, the document G1 toward the sheet discharge tray 31 side of the document feed path 32. The sheet discharge roller 36 and pinch roller 37 nip the document G1 and discharge it through the document feed path 32 to the sheet discharge tray 31 (S6). In addition, when the rear sensor 54 is turned on upon detecting the feed-direction leading end of the second document G2 (S7 (Y)), the next document G2 is fed (S4), and the document control part 60 operates the image read unit 22 after an elapse of a given time to conduct image scanning of the document G2. In addition, as a result of the separation roller 34 that has stopped for a given time after being slipped by the document G2 rotating, a third document G3 is fed to the document feed path 32. By repeating these operations, the ADF 3 feeds the documents G1, G2, G3, . . . on the sheet feed tray 30 in sequence to the document feed path 32, the image read unit 22 conducts image scanning of the respective documents G1, G2, G3, . . . , and the documents G1, G2, G3, . . . after scanning are discharged in sequence to the sheet discharge tray 31.

As shown in FIG. 23, after discharging the last document Gk placed on the sheet feed tray 30 from the document feed path 32, the control part 60 not only switches the rotation of the motor 67 from a CW rotation to a CCW rotation but also turns on the sheet feed solenoid 88. Whether the document Gk placed on the sheet feed tray 30 is the last document is judged based on whether the first front sensor 52 is off when the second front sensor 53 is turned off upon detecting the trailing end of the document Gk. It is judged, if the first front sensor 52 is off, that the document Gk is the last document placed on the sheet feed tray 30. If the first front sensor 52 is on, it is judged that a next document exists on the sheet feed tray 30. As a result of the rotation of the motor 67 being switched from a CW rotation to a CCW rotation and the sheet feed solenoid 88 being turned on, as shown in FIG. 11, a drive force is transmitted from the planetary gear unit 75, and the driven gear 95 CCW rotates and the shaft 111 rotates in a direction opposite the feed direction. This rotation of the shaft 111 is transmitted to the arm 29, and thus the arm 29 rises and the sheet feed roller 33 separates from the guide surface of the document feed path 32. This allows inserting the document Gn for which image scanning is conducted the next time beyond the downside of the sheet feed roller 33 until it contacts the separation roller 34. Thereafter, the control part 60 stops the motor 67 to end image scanning in the one side scanning mode.

Now, description will be given below of the double-sided scanning operation. Before the document Gn is fed, as shown in FIG. 25 with regard to a description of the simplex scanning mode, the guide flap 50 is held at a position which allows the feed path in the first guiding position, that is, at the connecting position 38, to be continuous from the scan point side of the document feed path 32 to the sheet discharge tray 31 side. The guide flap 46 is held at a position which allows the feed path in the third guiding position, that is, the crossing position 40, to be continuous from the sheet feed tray 30 side of the document feed path 32 to the scan point side. The guide flap 47 is held at a position which allows the feed path in the fifth guiding position, that is, the crossing position 40, to be continuous from the terminal end 41 side of the bidirectional feed path 39 to the scan point side of the document feed path 32.

When a scan start instruction is input to the image reading apparatus 1 (S1), whether the document Gn has been placed on the sheet feed tray 30 is detected by the first front sensor 52 (S2). When it is judged that the document Gn has not been placed on the sheet feed tray 30 (S2 (N)), the control part 60 makes an error display "no document" on the display portion of the image reading apparatus 1 (S3). When the document Gn has been placed on the sheet feed tray 30 (S2 (Y)), the control part 60 drives the motor 67 by a CW rotation. A CW rotation instruction to the motor 67 is stored in the RAM 63 as rotation direction information.

The control part 60 not only drives the motor 67 by a CW rotation but also turns on the sheet feed solenoid 88. Therefore, as shown in FIG. 7 and FIG. 8, for the planetary gear unit 75 of the drive force transmission mechanism 70, the latch by the latching mechanism 86 is released, and the planetary gear unit 75 revolves the planetary gears 79 and 80 by a CCW rotation based on rotation of the sun gear 76 to transmit a drive force to the transmission gear 94. Thereby, the driven gear 95 is CW rotated. As a result of the driven gear 95 CW rotating, the drive force is transmitted to the arm 29 to lower down the arm 29. This brings the pickup roller 33 into pressure contact with the document G1 placed on the sheet feed tray 30. In addition, the CW rotation of the driven gear 95 is transmitted to the pickup roller 33 and separation roller 34 by the drive force transmission mechanism 110, and the pickup roller 33 and separation roller 34 rotate in the sheet feed direction, whereby the document G1 is sent into the document feed path 32. When a plurality of documents Gn are placed on the sheet feed tray 30, there is a possibility that, as a document G1 existing at the highest position is fed, a document G2 just below the document G1 can be fed together with the document G1. However, the document G2 is stopped by the separation pad provided at the opposite position of the separation roller 34. Thus, the document G1 is fed to the document feed path 32 (S14).

In the document feed path 32, a drive force from the motor 67 is transmitted to the feed rollers 35A, 35B, 35C, and 35D and sheet discharge roller 36, whereby these respective rollers are rotated so as to feed the document Gn from the upstream side of the document feed path 32 to the downstream side thereof, that is, in the feed direction. The document G1 fed from the sheet feed tray 30 to the document feed path 32 is nipped between the feed roller 35A and pinch roller 37 and thus the rotation force of these rollers is transmitted to the document G1, whereby the document G1 is fed to the crossing position 40 along the document feed path 32. When the document G1 is fed to the document feed path 32, the second front sensor 53 is turned on.

Since the guide flap 47 closes the feed path from the sheet feed tray 30 side of the document feed path 32 to the crossing position 40, the document G1 fed to the crossing position 40 is contacted with the guide flap 47. As shown in FIG. 26 with regard to a description of the one side scanning mode, the guide flap 47 is rotated from the fifth guiding position to the sixth guiding position in such a manner that it is pushed aside by the document G1 being fed along the document feed path 32. As a result, not only is the feed path from the sheet feed tray 30 side of the document feed path 32 to the scan point side allowed to be continuous, but also the feed path to the terminal end 41 side of the bidirectional feed path 39 is closed. Also, the feed path to the connecting position 38 side of the bidirectional feed path 39 is closed by the guide flap 46. Therefore, the document G1 having arrived at the crossing position 40 from the sheet feed tray 30 side of the document feed path 32 is guided by the guide flaps 46 and 47 and is thereby fed to the scan point side of the document feed path 32 without advancing in either direction of the bidirectional feed path 39.

As described with regard to the simplex scanning mode, since the peripheral speed of the respective feed rollers 35A, 35B, 35C, and 35D and sheet discharge roller 36 is set so as to be faster than the peripheral speed of the separation roller 34, by the document G1 being fed while being nipped between the feed roller 35A and pinch roller 37 in pressure contact with the separation roller 34, the separation roller 34 slips, whereby a given space is formed in the feed direction between the first document G1 and second document G2. The control part 60 switches the rotation of the motor 67 from a CW rotation to a CCW rotation at a timing when the document G2 is fed, that is, before the separation roller 34 rotates again.

In order to switch the rotation of the motor 67 from a CW rotation to a CCW rotation, the CPU 61 of the control part 60 outputs a stop instruction to the motor 67 and then outputs a CCW rotation instruction. Along with a CW rotation instruction that has already been outputted, a history of the stop instruction and CCW rotation instruction is stored in the RAM 63 as rotation direction information. The control part 60 can judge a timing to switch the rotation of the motor 67 based on the elapsed time counted after the second front sensor 53 is turned on upon detecting the leading end of the document G1 or after the second front sensor 53 is turned off upon detecting the trailing end of the document G1, the rotation amount of the motor 67, or the like. Here, the switching from a CW rotation to a CCW rotation is carried out before the feed-direction leading end of the document G1 arrives at the scan point, that is, before image scanning is conducted for the document G1 by the image read unit 22 at the scan point.

When the rotation of the motor 67 is switched from a CW rotation to a CCW rotation, as shown in FIG. 10, the support arm 78 of the planetary gear unit 75 is latched by the latching mechanism 86 and is held at the disengaging position. Thereby, a drive force transmission to the driven gear 95 is cut, and the shaft 111 that pivotally supports the separation roller 34 stops.

Figure 31:
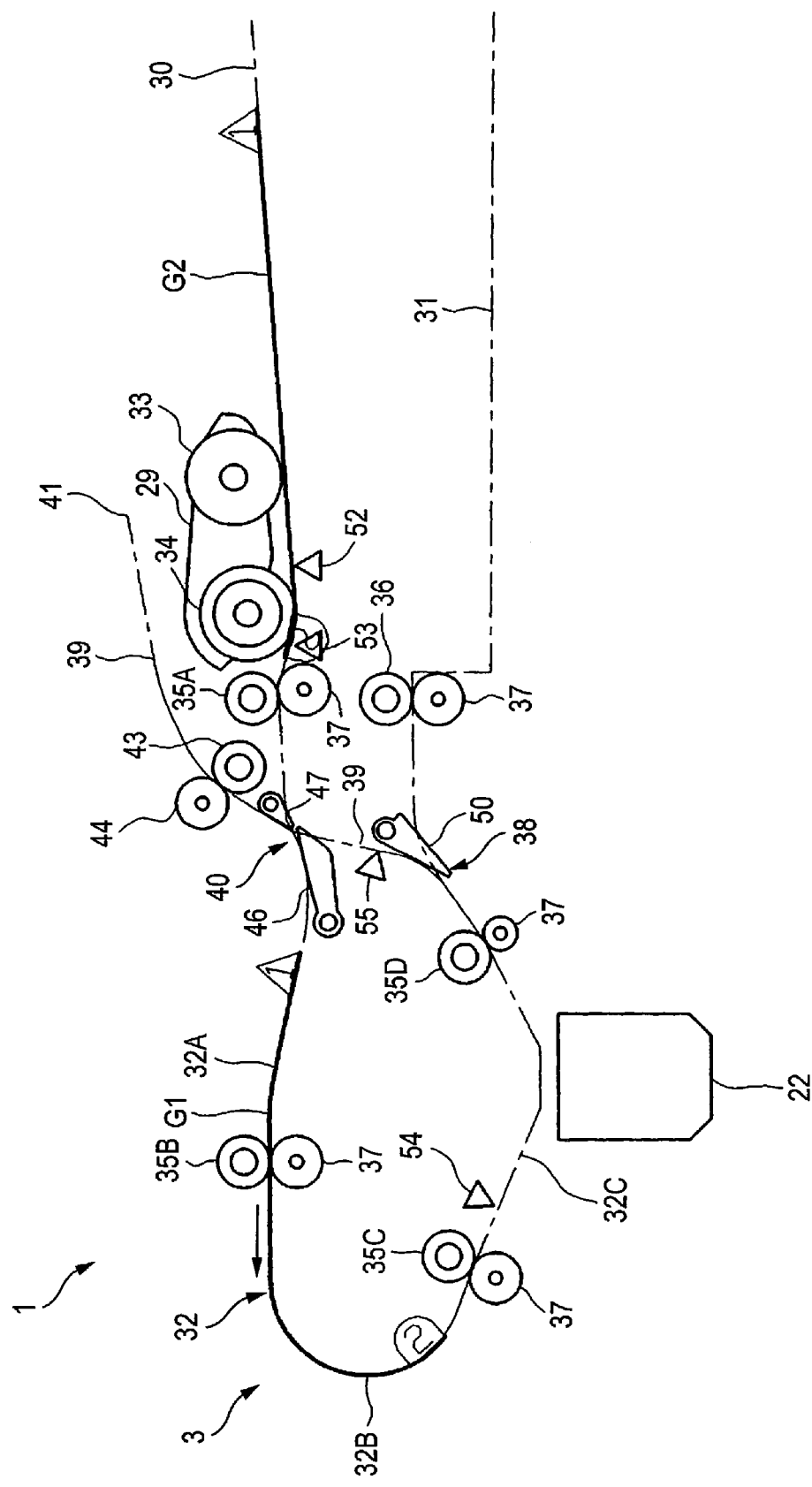
FIG. 31 is a typical view showing image scanning operations in a double-sided scanning mode.

On the other hand, the drive force transmission mechanism 120 transmits, as shown in FIG. 13 to FIG. 15, in either case where the motor 67 CW rotates or CCW rotates, a feed-direction drive force to the respective transfer rollers 35A, 35B, 35C, and 35D and sheet discharge roller 36. Therefore, as shown in FIG. 31, even after the rotation of the motor 67 is switched, the document G1 is fed by the feed roller 35B etc., along the document feed path 32 toward the scan point. When the rotation of the motor 67 is switched, the above-mentioned stop instruction is outputted so that the motor 67 is temporarily stopped. Thereafter, even immediately after a CCW rotation instruction is outputted and a CCW rotation of the motor 67 is begun, a gear loss (drive loss) occurs such that no drive force of the motor 67 is transmitted to the respective transfer rollers 35A, 35B, 35C, and 35D and sheet discharge roller 36 until the planetary gear 126 engages with the transmission gear 129 after disengaging from the transmission gear 128. During this time, the motor 67 substantially slips. Due to this gear loss, the document G1 is temporarily stopped in the document feed path 32. When the document G1 is stopped during image scanning, this causes degradation in image quality, however, since image scanning has not yet been begun at this timing, no problem occurs due to the above-mentioned gear loss.

With regard to the drive force transmission mechanism 150, as a result of the rotation of the motor 67 being switched from a CW rotation to a CCW rotation, the drive force cutting mechanism 151 holds the planetary gear unit 153 at the disengaging position to cut a drive force transmission to the driven gear 168. Thereby, the switchback roller 43 is stopped. The drive force transmission mechanism 170 changes the position of the guide flap 50 to the second guiding position as a result of the rotation of the motor 67 being switched from a CW rotation to a CCW rotation. As a result of the trailing end of the document G1 passing through the crossing position 40, the guide flap 47 returns from the sixth guiding position to the fifth guiding position.

Figure 32:
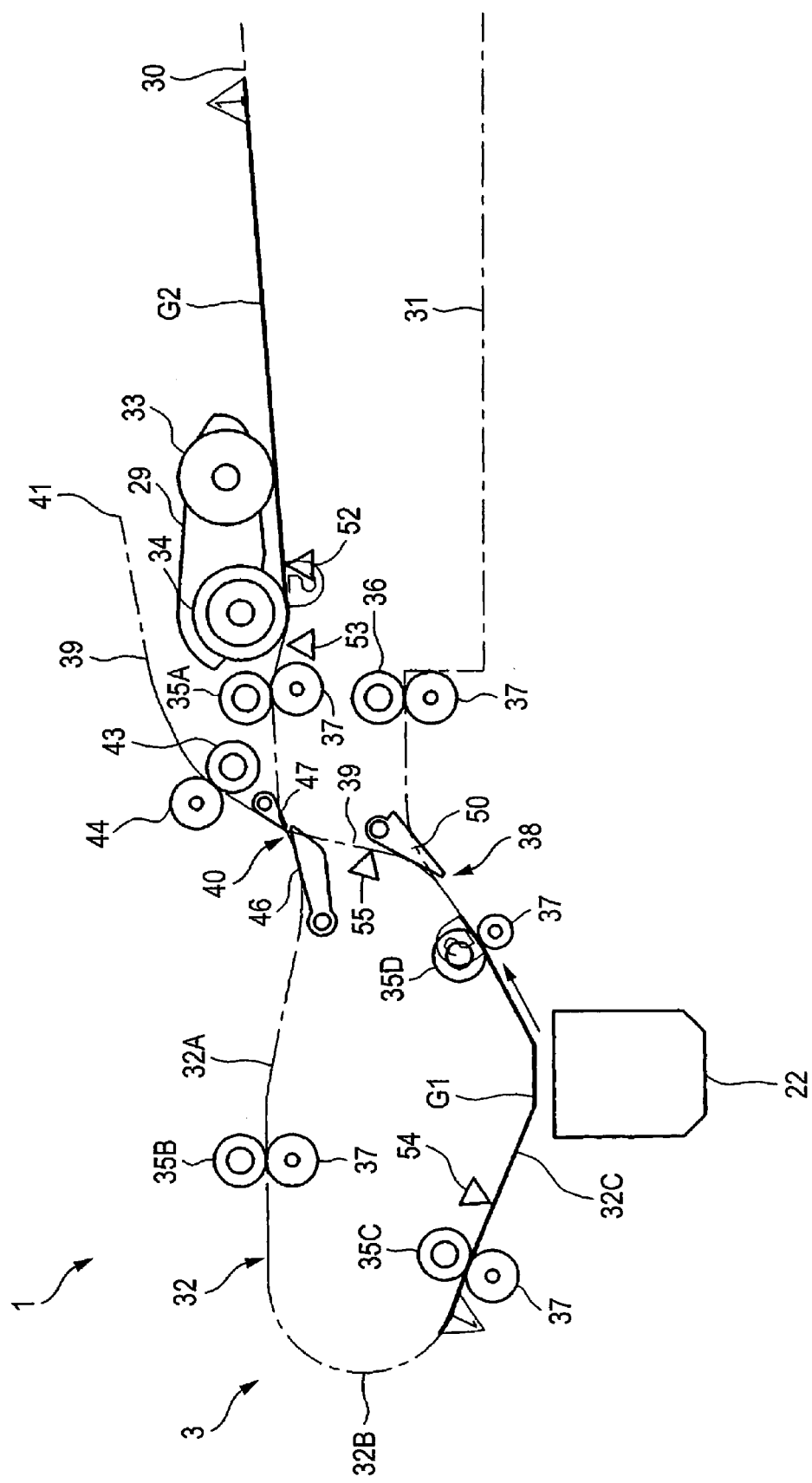
FIG. 32 is a typical view showing image scanning operations in a double-sided scanning mode.

As shown in FIG. 32, the document G1 is fed so as to reverse downward along a curve portion 32B of the document feed path 32, while the linear sensor 54 detects the feed-direction leading end of the document G1 and is thereby turned on. An on/off history of the rear sensor 54 is stored in the RAM 63 of the control part 60 as scanning state information. Since the feed-direction leading end of the document G1 arrives at the scan point after an elapse of a given time since it is detected by the rear sensor 54, when the feed-direction leading end of the document G1 arrives at the scan point, the control part 60 operates the image read unit 22 to conduct image scanning of the document G1 (S5). The document G1 passes through the scan point in such a manner that the first side is opposed to the image read unit 22, and images on the first side of the document G1 are scanned by the image read unit 22. At this time, the control part 60 operates the image read unit 22 continuously until the feed-direction trailing end of the document G1 passes through the scan point. When the document G1 is further fed and the feed-direction trailing end of the document G1 passes through the rear sensor 54, the rear sensor 54 detects the feed-direction trailing end of the document G1 and is thereby turned off. The control part 60 judges that the feed-direction trailing end has passed through the scan point and ends image scanning of the first side of the document G1 by the image read unit 22 after an elapse of a given time since the rear sensor 64 is turned off.

Image data of the first side of the document G1 scanned by the image read unit 22 is stored in a given area of the RAM 63. The control part 60 not only writes the image data in the RAM 63 but also writes a variable indicating that image scanning of the first side has ended and image data has been stored into a given area of the RAM 63. This variable is a variable indicating "end of scanning of the first side" or "end of scanning of the second side" and is used as scanning state information.

Figure 33:
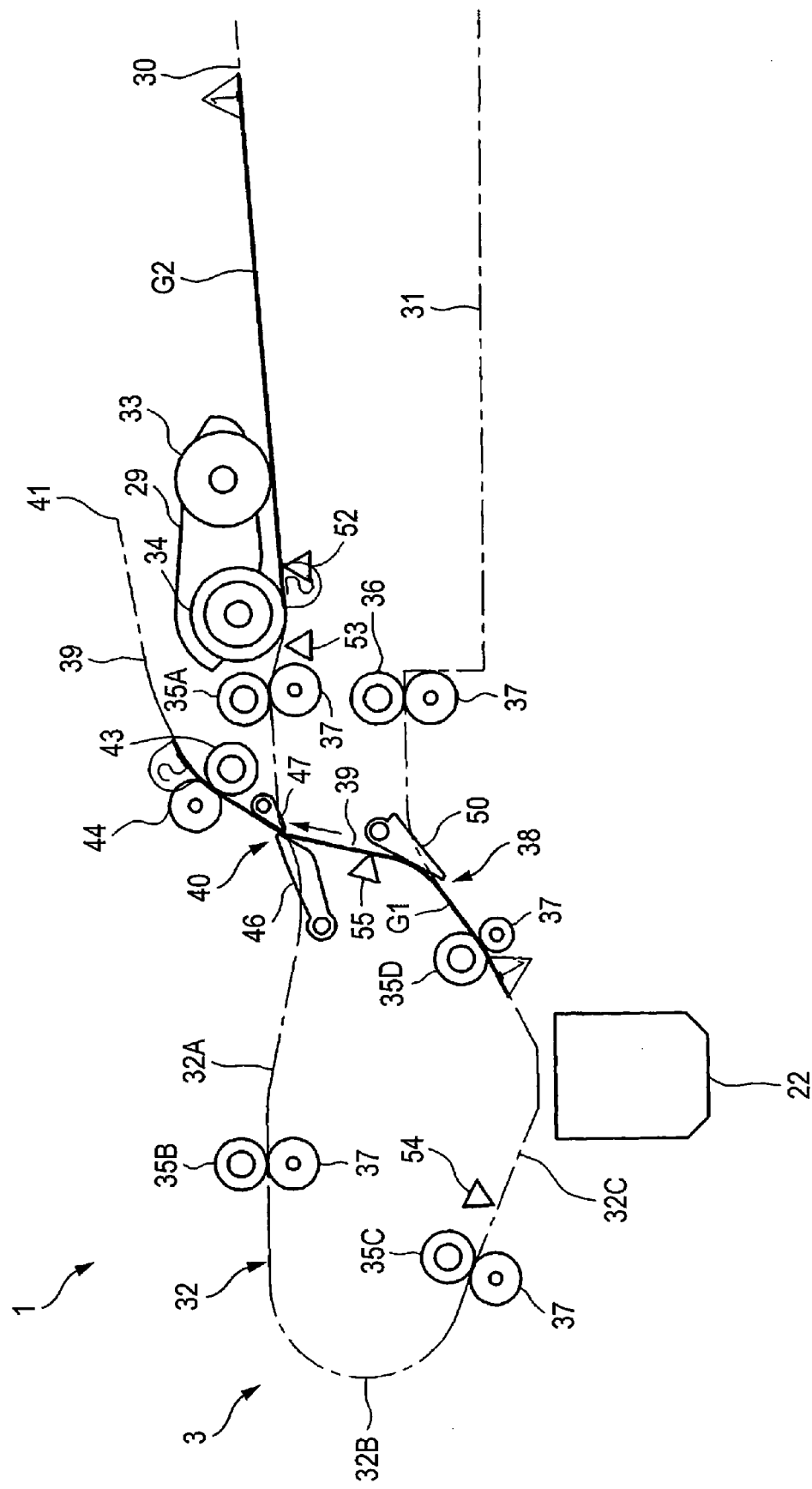
FIG. 33 is a typical view showing image scanning operations in a double-sided scanning mode.

As shown in FIG. 33, the feed-direction leading end of the document G1, the first side of which has been scanned, is guided by the guide flap 50 to advance along the connecting position 38 from the document feed path 32 to the bidirectional feed path 39. The switchback sensor 55 detects the feed-direction leading end of the document G1 which has entered the bidirectional feed path 39, and is thereby turned on. An on/off history of the switchback sensor 55 is stored in the RAM 63 of the control part 60 as scanning state information. Based on turning on of the switchback sensor 55, the control part 60 turns on the switchback solenoid 161. Thereby, when the document G1 is pulled into the bidirectional feed path 39, latching of the support arm 156 of the planetary gear unit 153 is released, as shown in FIG. 18, the planetary gear unit 153 to which a CCW rotation drive force has been transmitted from the motor 67 transmits the CCW rotation drive force to the driven gear 168, and the switchback roller 43 rotates in the pull-in direction.

Since the guide flap 46 closes the feed path from the bidirectional feed path 39 to the crossing position 40, the feed-direction leading end of the document G1 having entered the bidirectional feed path 39 is contacted with the guide flap 46 when it arrives at the crossing position 40. The guide flap 46, as shown in FIG. 33, is rotated in such a manner that it pushes up the switchback flap 39 onto the feed-direction leading end of the document G1 to be fed, so that the guide flap 46 changes its position. As a result, the feed path from the connecting position 38 side of the bidirectional feed path 39 to the terminal end 41 side of the bidirectional feed path 39 is allowed to be continuous, and at the same time, the feed path to the scan point side of the document feed path 32 is closed. Also, the feed path to the sheet feed tray 30 side of the document feed path 32 is closed by the guide flap 47. Therefore, the feed-direction leading end of the document G1, which has arrived at the crossing position 40 from the connecting position 38 side of the bidirectional feed path 39, is guided by the guide flaps 46 and 47 and is fed to the bidirectional feed path 39 without advancing to the document feed path 32. The feed-direction leading end of the document G1 is nipped between the switchback roller 43 and its associated pinch roller 44, and is fed to the terminal end 41 side of the bidirectional feed path 39 due to the pull-in-direction rotation of the switchback roller 43.

Figure 34:
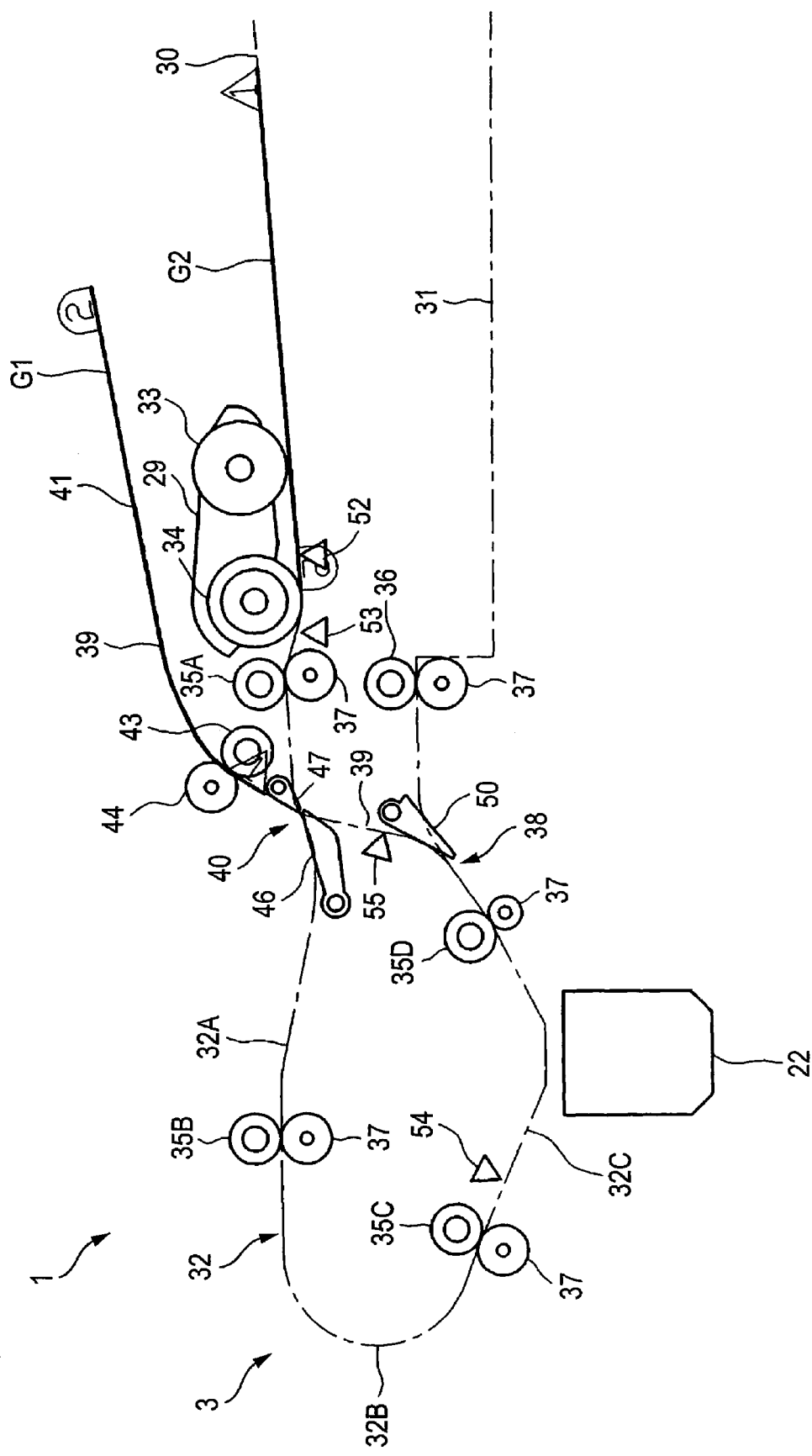
FIG. 34 is a typical view showing image scanning operations in a double-sided scanning mode.

As shown in FIG. 34, after the feed-direction trailing end of the document G1 has completely entered the terminal end 41 side beyond the crossing position 40 of the bidirectional feed path 39, the control part 60 switches the rotation of the motor 67 from a CCW rotation to a CW rotation. In order to switch the rotation of the motor 67 from a CCW rotation to a CW rotation, the CPU 61 of the control part 60 outputs a CW rotation instruction after outputting a stop instruction to the motor 67. The stop instruction and CW rotation instruction are stored together with an instruction already outputted for driving the motor 67 in the RAM 63 as rotation-direction information.

The switchback sensor 55 detects the trailing end of the document G1 being fed along the bidirectional feed path 39 and is thereby turned off. After passage of a given time, the trailing end of the document G1 passes through the crossing position 40. Therefore, the control part 60 judges, from the detect signal of the switchback sensor 55 as well as from the counted feed distance or feed time by the feed roller 35D and switchback roller 43, that the feed-direction trailing end of the document G1 has completely entered the terminal end 41 side beyond the crossing position 40 of the bidirectional feed path 39. The document G1 nipped between the switchback roller 43 and pinch roller 44 and projected from the terminal end 41 is returned to the crossing position 40.

When a part of the document G1 projects outside the ADF 3 from the terminal end 41 of the bidirectional feed path 39, the projected part of the document G1 is supported by the document support portion 42. In addition, as a result of the document G1 passing through the crossing position 40 and parting away from the guide flap 46, the guide flap 46 turns downward and returns to the third guiding position.

As a result of the motor 67 being switched from a CCW rotation to a CW rotation, the planetary gear unit 153 of the drive force transmission mechanism 150, as shown in FIG. 17, CW rotates the support arm 156 and transmits a drive force of the motor 67 to the driven gear 168, so that the driven gear 168 CCW rotates. Upon receiving this force, the document G1 is switchback-fed so as to return to the crossing position 40 along the bidirectional feed path 39 (S16).

The drive force transmission mechanism 120 transmits, as shown in FIG. 13 to FIG. 15, in either case where the motor 67 CW rotates or CCW rotates, a feed-direction drive force to the respective transfer rollers 35A, 35B, 35C, and 35D and sheet discharge roller 36. Therefore, even after the rotation of the motor 67 is switched, the respective transfer rollers 35A, 35B, 35C, and 35D and sheet discharge roller 36 rotate in the feed direction. When the motor 67 is switched from a CCW rotation to a CW rotation, a gear loss occurs such that no drive force of the motor 67 is transmitted to the respective transfer rollers 35A, 35B, 35C, and 35D and sheet discharge roller 36 until the planetary gear 126 engages with the transmission gear 128 after disengaging from the transmission gear 129.

With regard to the drive force transmission mechanism 70, when the rotation of the motor 67 is switched from a CW rotation to a CCW rotation, the latching mechanism 86 holds the planetary gear unit 75 at the disengaging position to cut a drive force transmission to the driven gear 95. Thereafter, since the sheet feed solenoid 88 has not been operated, the planetary gear unit 75 is retained even when the motor 67 is switched to a CW rotation. The drive force transmission mechanism 170 changes the position of the guide flap 50 to the first guiding position as a result of the rotation of the motor 67 being switched from a CCW rotation to a CW rotation.

Figure 35:
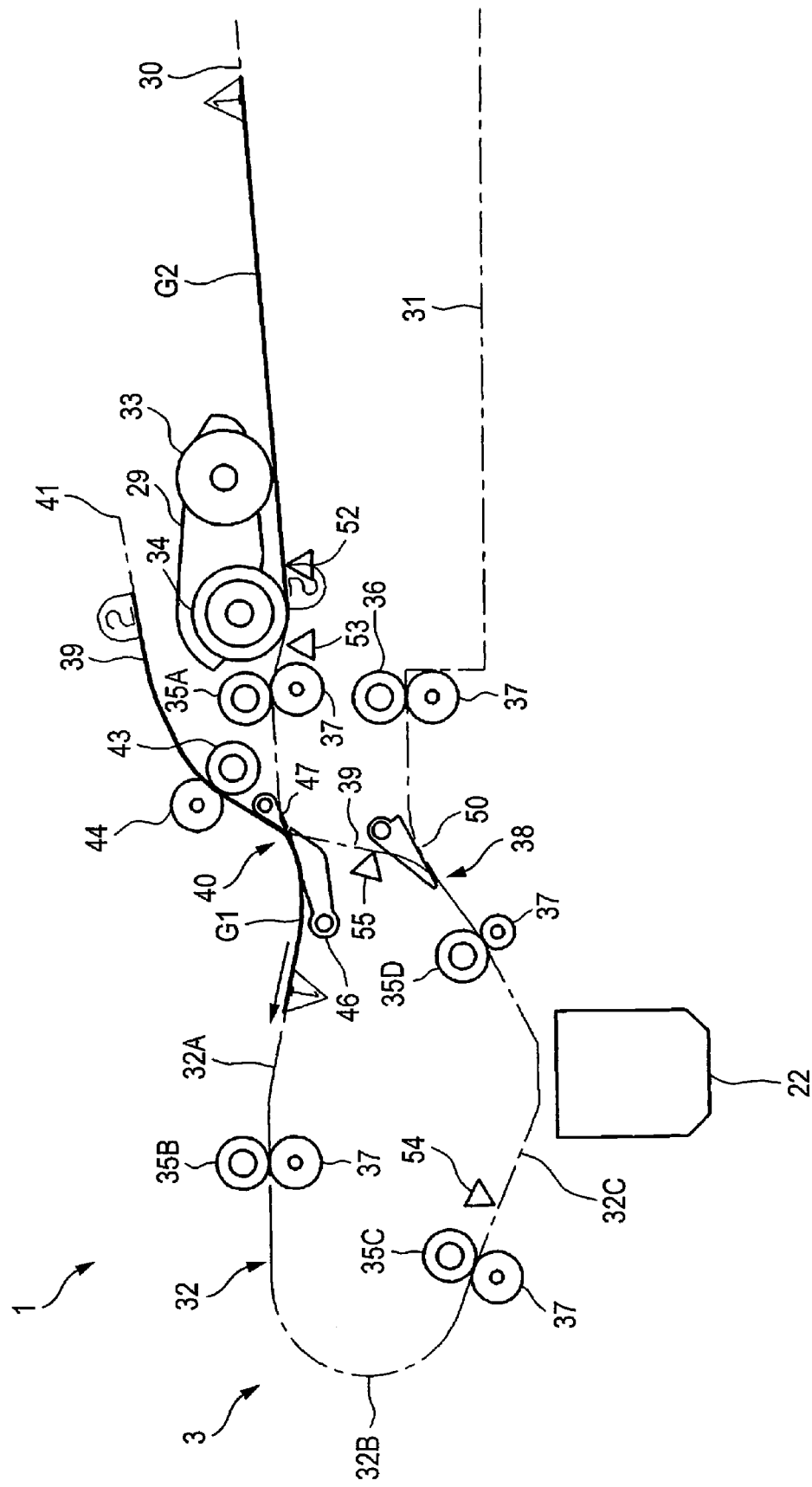
FIG. 35 is a typical view showing image scanning operations in a double-sided scanning mode.

As shown in FIG. 35, the document G1 returned from the bidirectional feed path 39 is contacted with the guide flap 46 in the third guiding position at the crossing position 40. The guide flap 46 is restricted so as not to turn downward from the third guiding position. Therefore, not only is the feed path from the terminal end 41 side of the bidirectional feed path 39 to the scan point side of the document feed path 32 allowed to be continuous, but also the feed path extending from the terminal end 41 side of the bidirectional feed path 39 to the connecting position 38 side of the bidirectional feed path 39 is closed. Also, the guide flap 47 closes the feed path to the sheet feed tray 30 side of the document feed path 32. Therefore, the document G1 is guided by the guide flaps 46 and 47 and is fed to the scan point side of the document feed path 32 from the terminal end 41 side of the bidirectional feed path 39 without advancing to the connecting position 38 side of the bidirectional feed path 39 or the sheet feed tray 30 side of the document feed path 32. As a result of the document G1 being returned from the bidirectional feed path 39 to the upstream side of the document feed path 32, the document G1 is fed again along the document feed path 32 with the leading and trailing ends thereof reversed from the state when the document G1 was fed along the document feed path 32 for the first time. In this manner, the document G1 is switchback-fed. Then, the document G1 is fed along the document feed path 32 in such a manner that the second side is opposed to the scan point.

Figure 36:
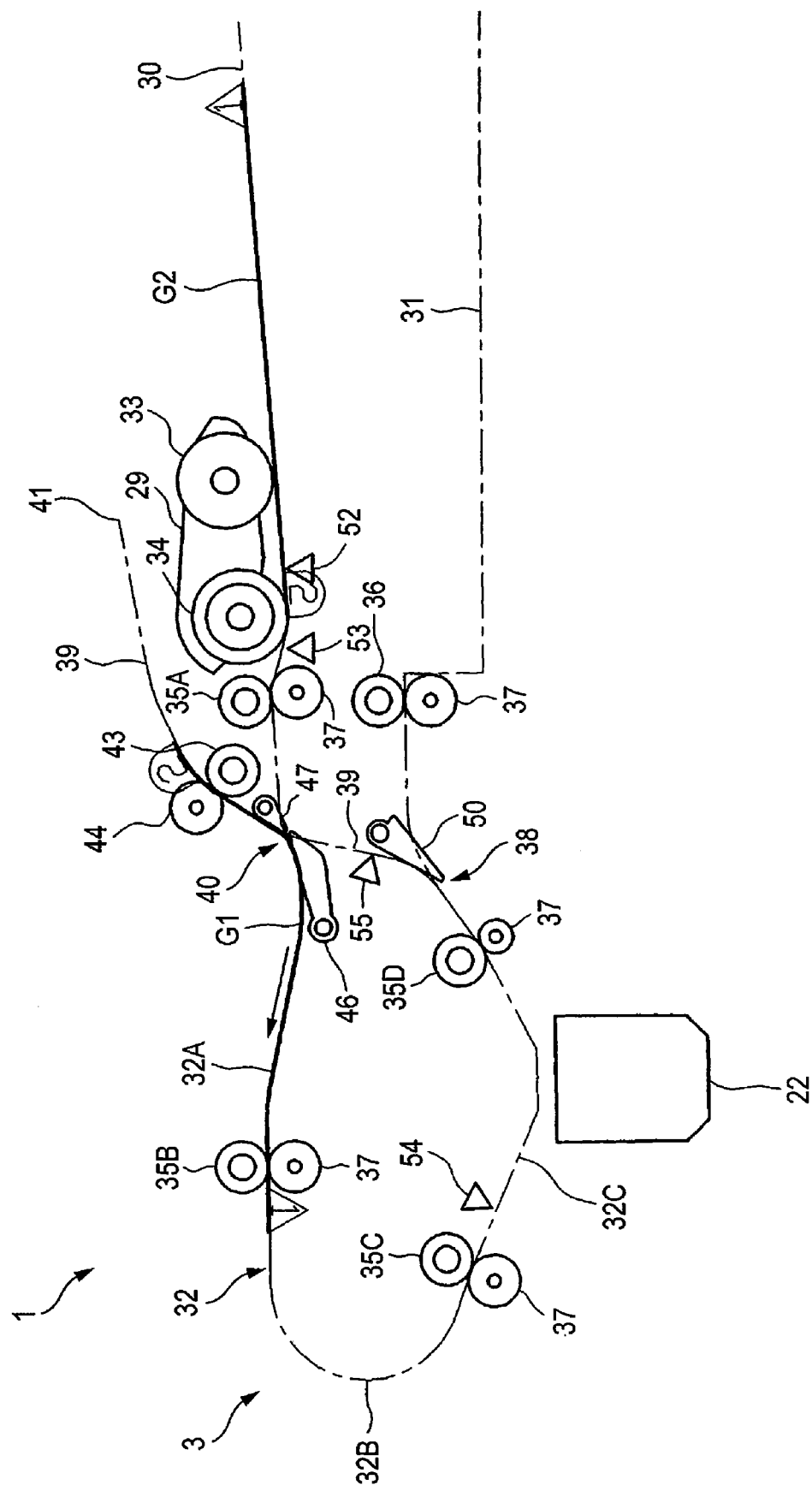
FIG. 36 is a typical view showing image scanning operations in a double-sided scanning mode.

As shown in FIG. 36, when the feed-direction leading end of the document G1 arrives at a given position on the upstream side of the scan point of the document feed path 32, the control part 60 switches the rotation of the motor 67 from a CW rotation to a CCW rotation. At this time, a stop instruction and a CCW rotation instruction outputted from the CPU 61 of the control part 60 are also stored in the RAM 63 as scanning state information. Since the drive force transmission mechanism 120 transmits a feed-direction drive force to the respective feed rollers 35A, 35B, 35C, and 35D and sheet discharge roller 36 irrespective of the rotation direction of the motor 67 although the drive force transmission is temporarily interrupted by the above-mentioned gear loss at the time of switching in the rotation direction of the motor 67, the document G1 is fed along the document feed path 32 by the feed roller 35B etc., toward the scan point even after the rotation of the motor 67 is switched.

With respect to the drive force transmission mechanism 150, when the rotation of the motor 67 is switched from a CW rotation to a CCW rotation, the support arm 156 of the planetary gear unit 153 CCW rotates, and is latched on the drive force cutting mechanism 151 to reach the disengaging position. Thereby, the drive force transmission from the planetary gear unit 153 to the driven gear 168 is cut, and the switchback roller 43 is stopped. Therefore, as shown in FIG. 36, even when the rotation of the motor 67 is switched in a state where the feed-direction leading end side of the document G1 is nipped between the feed roller 35B and pinch roller 37 and the feed-direction trailing end side of the document G1 is nipped between the switchback roller 43 and pinch roller 44, the switchback roller 43 never rotates in the pull-in direction. The switchback roller 43 for which the drive force transmission from the motor 67 has been cut rotates in a following manner in the returning direction due to the document G1 to be fed by a rotation of the feed roller 35B.

With regard to the drive force transmission mechanism 70, since the sheet feed solenoid 88 has not been operated after the latching mechanism 86 held the planetary gear unit 75 at the disengaging position, the planetary gear unit 75 is held at the disengaging position even when the motor 67 is switched to a CCW rotation. The drive-force transmission mechanism 170 changes the guide flap 50 to the second guiding position as a result of the rotation of the motor 67 being switched from a CW rotation to a CCW rotation.

Figure 37:
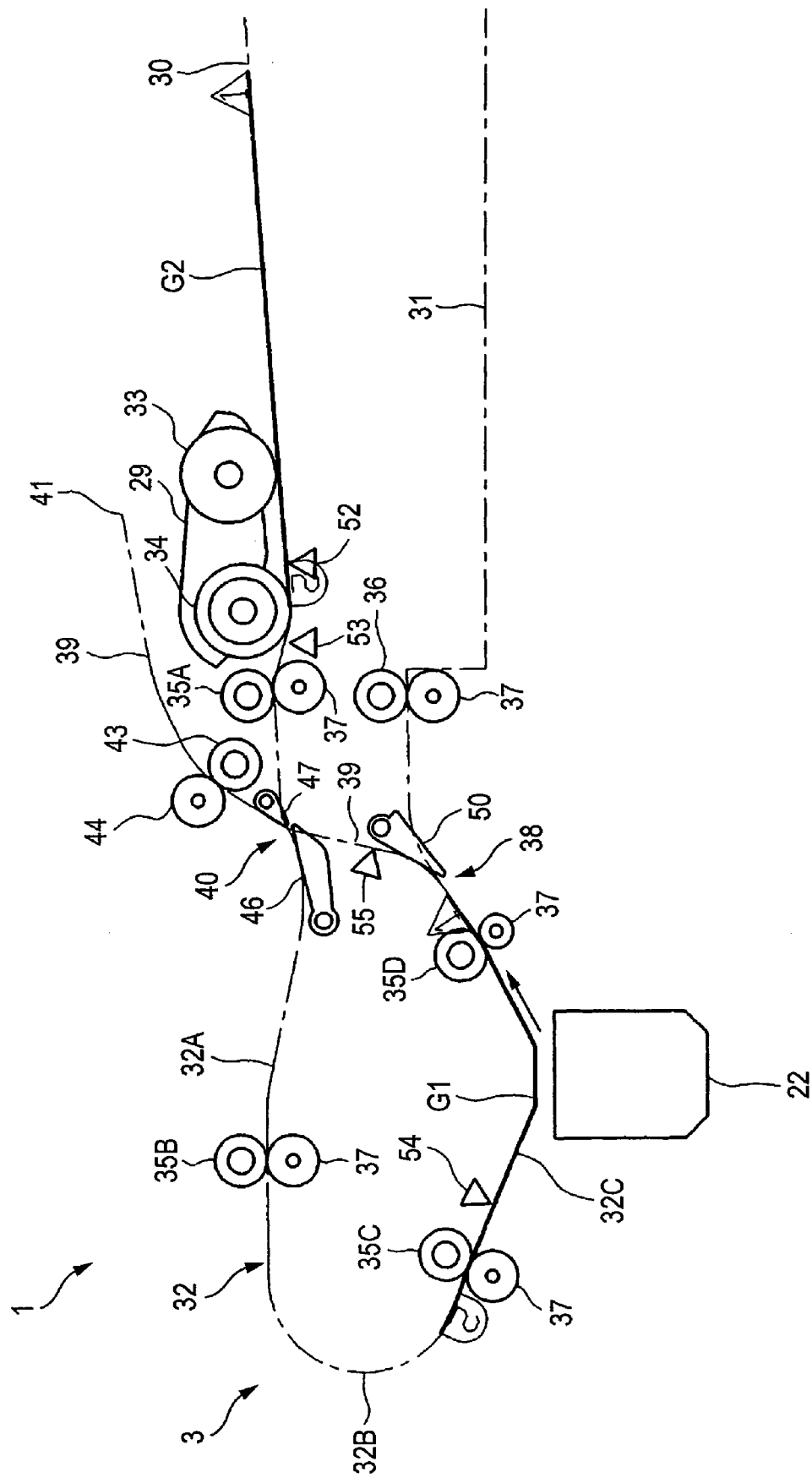
FIG. 37 is a typical view showing image scanning operations in a double-sided scanning mode.

When the feed-direction leading end of the document G1 is detected by the rear sensor 54 and the feed-direction leading end arrives at the scan point, as shown in FIG. 37, the control part 60 causes the image read unit 22 to conduct image scanning of the second side of the document G1 (S17). The feed-direction leading end of the document G1, the second side of which has been scanned, is guided by the guide flap 50 to advance along the connecting position 38 from the document feed path 32 to the bidirectional feed path 39. When the feed-direction trailing end of the document G1 is detected by the rear sensor 54 and the feed-direction trailing end arrives at the scan point, the control part 60 ends the image scanning of the second side of the document G1 by the image read unit 22. Image data of the second side of the document G1 scanned by the image read unit 22 is stored in a given area of the RAM 63. The control part 60 not only writes the image data in the RAM 63 but also writes a variable indicating that image scanning of the second side has ended and image data has been stored into a given area of the RAM 63.

When the switchback sensor 55 detects the feed-direction leading end of the document G1 which has entered the bidirectional feed path 39 and is thereby turned on, the control part 60 turns on the switchback solenoid 161. Thereby, when the document G1 is pulled into the bidirectional feed path 39, latching of the support arm 156 of the planetary gear unit 153 by the drive force cutting mechanism 151 is released, as shown in FIG. 18, the planetary gear unit 153 to which a CCW rotation drive force has been transmitted from the motor 67 transmits the CCW rotation drive force to the driven gear 168, and the switchback roller 43 rotates in the pull-in direction.

The feed-direction leading end of the document G1 which has arrived at the crossing position 40 pushes up, in the same manner as in FIG. 33, the guide flap 46 to change the position from the third guiding position to the fourth guiding position, and enters the terminal end 41 side of the bidirectional feed path 39 beyond the crossing position 40. Then, in the same manner as in FIG. 34, after the feed-direction trailing end of the document G1 has completely entered the terminal end 41 side beyond the crossing position 40 of the bidirectional feed path 39, the control part 60 switches the rotation of the motor 67 from a CCW rotation to a CW rotation to rotate the switchback roller 43 in the returning direction and thereby return the document G1 to the crossing position 40. At this time, a stop instruction and a CCW rotation instruction outputted from the CPU 61 of the control part 60 are also stored in the RAM 63 as scanning state information. In the same manner as in FIG. 35, the document G1 returned from the bidirectional feed path 39 is guided by the guide flaps 46 and 47 and is fed to the scan point side of the document feed path 32 from the terminal end 41 side of the bidirectional feed path 39. Thereby, the document G1 is fed again along the document feed path 32 with the leading and trailing ends thereof reversed again, that is, in the state fed along the document feed path 32 for the first time (S18).

Since the drive force transmission mechanism 120 transmits a feed-direction drive force to the respective feed rollers 35A, 35B, 35C, and 35D and sheet discharge roller 36 irrespective of the rotation direction of the motor 67 although the drive force transmission is temporarily interrupted by the above-mentioned gear loss at the time of switching in the rotation direction of the motor 67, the respective feed rollers 35A, 35B, 35C, and 35D and sheet discharge roller 36 rotate in the feed direction. The drive force transmission mechanism 70 is in a state where the latching mechanism 86 holds the planetary gear unit 75 in the disengaging position, and thereby cuts a drive force transmission to the driven gear 95. The drive force transmission mechanism 170 changes the position of the guide flap 50 to the first guiding position as a result of the rotation of the motor 67 being switched from a CCW rotation to a CW rotation.

Thereafter, the document G1 passes through the scan point in such a manner that the first side is opposed, is guided by the guide flap 50 along the connecting position 38 toward the sheet discharge tray 31 side, and is discharged by the sheet discharge roller 36 in such a manner that the first side faces downward (S19). When the next document G2 is set on the sheet feed tray 30 (S20 (Y)), that is, when the first front sensor 52 is on, the control part 60 turns on the sheet feed solenoid 88, releases latching of the support arm 78 of the planetary gear unit 75 by the latching mechanism 86, and causes the drive force transmission mechanism 70 to transmit a drive force to the driven gear 95, so as to rotate the separation roller 34 in the feed direction. Thereby, the document G2 on the sheet feed tray 30 is fed to the document feed path 32, and image scanning of both sides of the document G2 is conducted in the same manner as described above.

Similar to the one side scanning mode, after discharging the last document Gk placed on the sheet feed tray 30 from the document feed path 32 to the sheet discharge tray 31, the control part 60 not only switches the rotation of the motor 67 from a CW rotation to a CCW rotation but also turns on the sheet feed solenoid 88. Thereby, as shown in FIG. 11, a drive force is transmitted from the planetary gear unit 75, and the driven gear 95 CCW rotates and the shaft 111 rotates in a direction opposite the feed direction. This rotation of the shaft 111 is transmitted to the arm 29, and thus the arm 29 rises and the sheet feed roller 33 separates from the guide surface of the document feed path 32. This returns the image reading apparatus 1 to an initial state that allows inserting the document Gn for which image scanning is conducted next time beyond the downside of the sheet feed roller 33 until it contacts the separation roller 34. Thereafter, the control part 60 stops the motor 67 to end image scanning in the double-sided scanning mode.

In the present aspect, description has been given of the double-sided scanning operation by the image reading apparatus 1, assuming that each document is discharged to the sheet discharge tray 31 in a state where the order of a plurality of documents Gn placed on the sheet feed tray 30 is maintained. However, when it is not necessary to match the order of the documents Gn placed on the sheet feed tray 30 to the order of the documents Gn discharged to the sheet discharge tray 31, after the documents Gn are fed with their respective second sides facing the scan point, without moving the documents Gn back to the bidirectional feed path 39 again, the documents Gn may be fed along the connecting position 38 to the sheet discharge tray 31 side to thereby discharge the documents Gn to the sheet discharge tray 31. Thereby, although the order of the documents Gn in the sheet discharge tray 31 is not maintained, the last bidirectional feeding can be saved, thereby being able to shorten the time necessary for double-sided scanning of the documents Gn.

Figure 38:
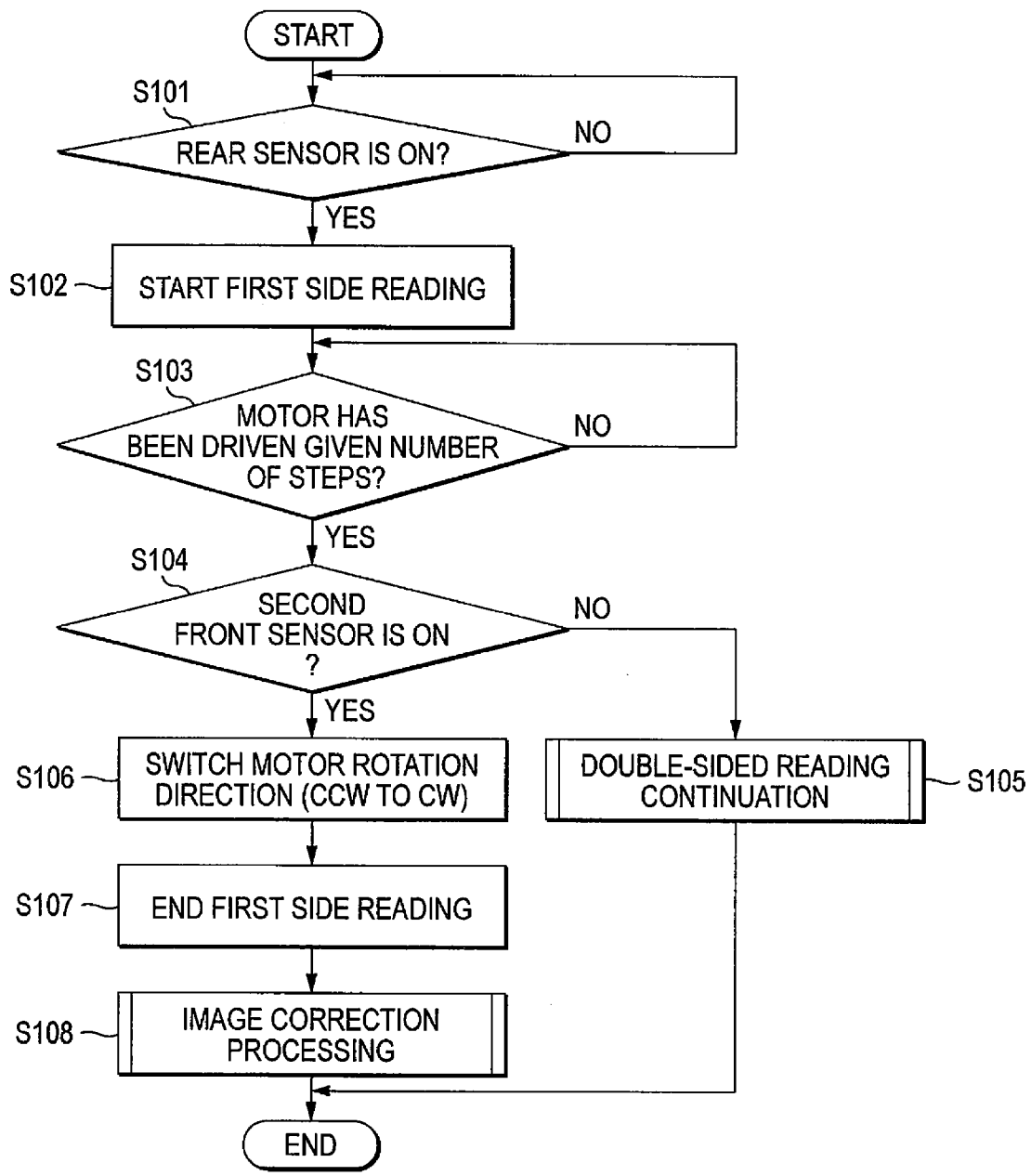
FIG. 38 is a flowchart for explaining an example of procedures of a method for judging whether the document is a document of which both sides can be scanned.
Figure 39:
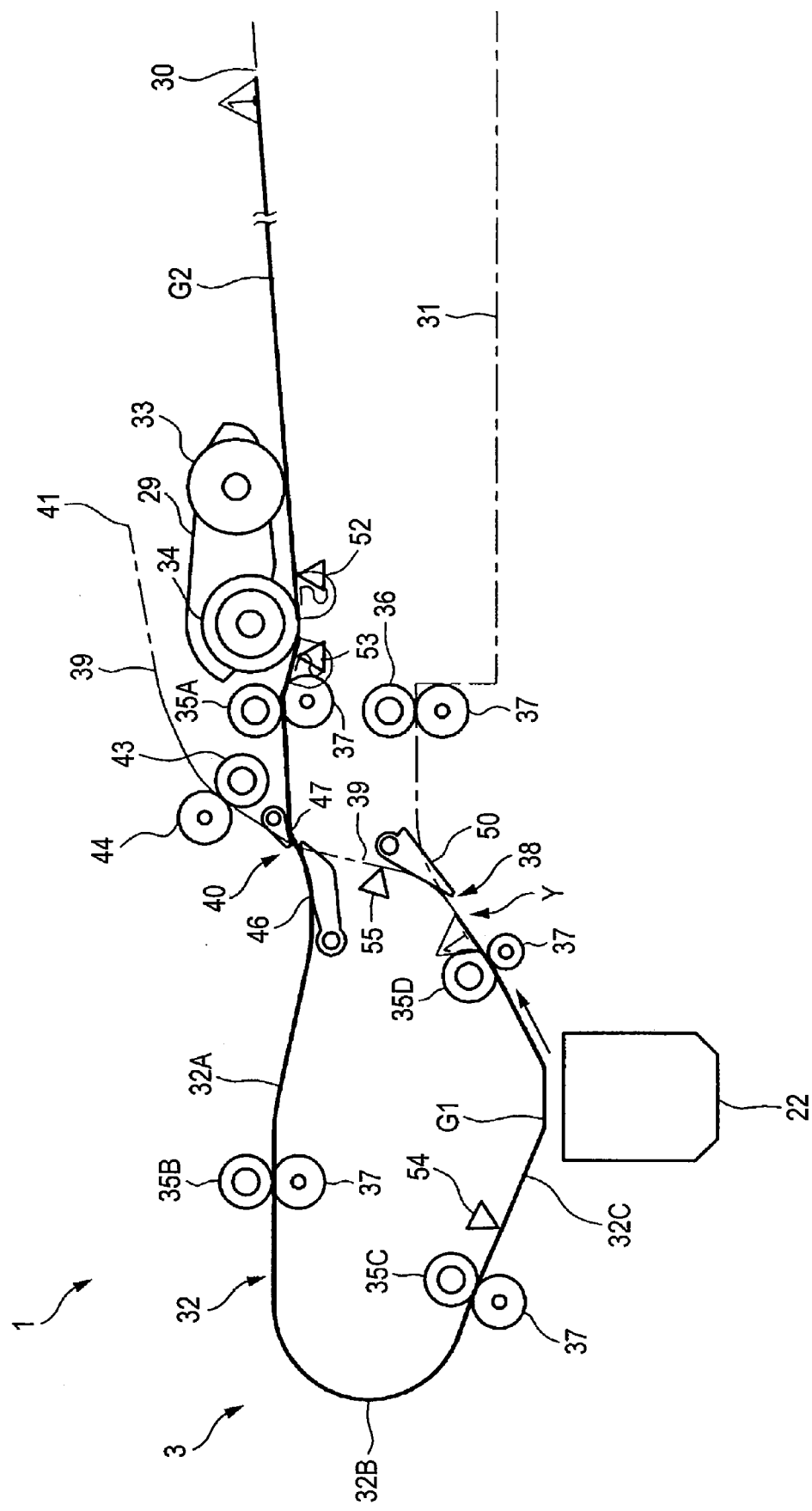
FIG. 39 is a typical view showing a condition to detect a feed-direction length of a document.
Figure 40:
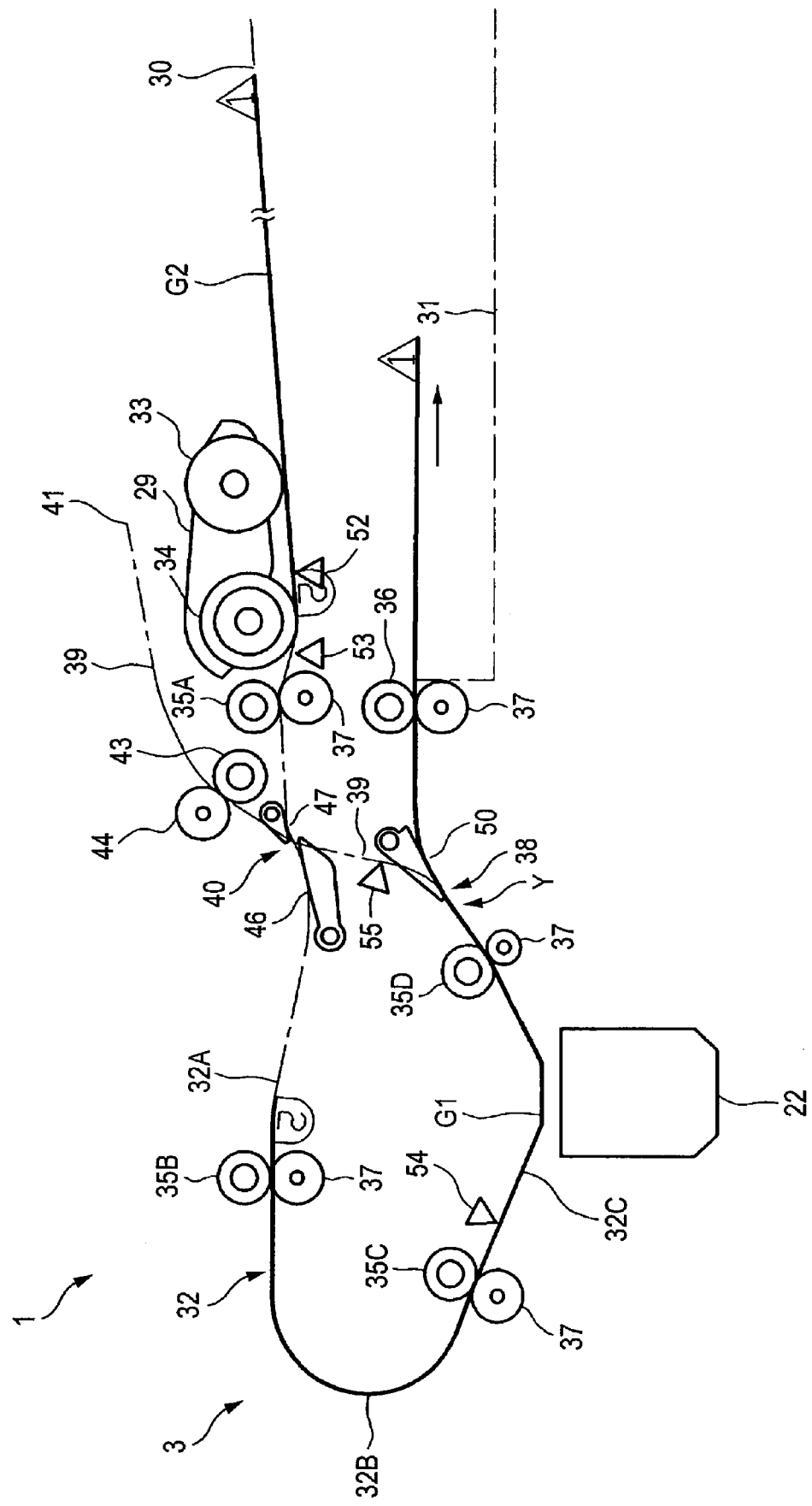
FIG. 40 is a typical view showing a discharging condition of the document of which both sides cannot be scanned.

In such double-sided scanning, the control part 60 judges whether the document Gn fed from the sheet feed tray 30 is a document both sides of which can be scanned. Hereinafter, an example of the judging method will be described with reference to FIG. 38 to FIG. 40. Here, FIG. 38 is a flowchart for explaining an example of procedures of a method for judging whether the document is a document both sides of which can be scanned. In addition, FIG. 39 is a typical view showing a condition to detect a feed-direction length of the document G1, and FIG. 40 is a typical view showing a discharging condition of the document G1 both sides of which cannot be scanned.

As described above, the feed-direction leading end of the document G1 fed from the sheet feed tray 30 to the document feed path 32 is detected by the rear sensor 54. The control part 60 monitors on/off of the rear sensor 54 to judge whether the rear sensor 54 has changed from off to on (S110).

When it is judged by the control part 60 that the rear sensor 54 is on (S101 (Y)), thereafter, at the point in time where the feed direction leading-end of the document G1 has arrived at the scan point, the control part 60 operates the image read unit 22 to start image scanning of the first side of the document G1 (S102). As described above, when the feed-direction leading end of the document G1 is detected by the rear sensor 54 to turn on the rear sensor 54, and then, the motor 67 is driven a given number of steps, the feed-direction leading end of the document G1 arrives at the scan point. At this time, as a result of the control part 60 outputting a scan instruction to the image read unit 22, image scanning of the first side of the document G1 is begun.

Moreover, in the double-sided scanning mode, as described above, the document G1 is fed from the sheet feed tray 30 to the document feed path 32 be means of the motor 67 driven by a CW rotation. On the other hand, when the first side of the document G1 is scanned, the rotation direction of the motor 67 has been switched from a CW rotation to a CCW rotation. The drive force transmission mechanism 170 has changed the position of the guide flap 50 to the second guiding position. That is, the guide flap 50 has been switched so as to guide the document G1 to the bidirectional feed path 39 side.

The document G1 that passes through the scan point is fed toward the connecting position 38 while images are being scanned by the image read unit 22. In the process of feeding of the document, it is judged whether the motor 67 has been driven a given number of steps C1 (S103). Here, the number of steps C1 is the amount of rotation of the motor 67 equivalent to a distance from the scan point to a given position Y upstream in the feed direction of the connecting position 38. Such a number of steps C1 has been stored in advance in the RAM 63 as threshold information. As described above, the control part 60, according to the amount of rotation of the motor 67 after the rear sensor 54 detects the feed-direction leading end of the document G1 and is thereby turned on, can judge whether the feed-direction leading end of the document G1 has arrived at the scan point. Similarly, the control part 60, according to whether the motor 67 has been driven the number of steps after feed-direction leading end arrived at the scan point, can judge that the feed-direction leading end of the document G1 has arrived at the given position Y.

As described above, the distance from the second front sensor 53 to the connecting position 38 of the document feed path 32 is longer than the feed-direction length of a document both sides of which can be scanned by the image reading apparatus 1. Therefore, in order that the distance from the second front sensor 53 to the given position Y can be made equivalent to the feed-direction length of a maximum-size document both sides of which can be scanned by the image reading apparatus 1, the given position Y can be set arbitrarily upstream in the feed direction of the connecting position 38 and downstream in the feed direction of the scan point. For example, when a maximum-size document both sides of which can be scanned by the image reading apparatus 1 has an A4 size in longitudinal feeding, the distance from the second front sensor 53 to the given position Y is 297 mm, and for a legal size in longitudinal feeding, the distance is set for 355 mm. In this manner, the given position Y can be set to the size of the maximum document both sides of which can be scanned.

The maximum size of a document both sides of which can be scanned by the image reading apparatus 1 can be determined by a loop-shaped feed distance extending from the crossing position 40 of the document feed path 32 through the scan point, connecting position 38 and bidirectional feed path 39 to the crossing position 40. Supposing that a document Gn having a feed-direction length longer than the loop-shaped feed distance advances from the connecting position 38 of the document feed path 32 into the bidirectional feed path 39 and then arrives at the crossing position 40, there is a possibility that, the feed-direction leading end side of the document Gn may be contacted with the feed-direction trailing end side of the document Gn to thereby cause a problem such as a jam or damage to the document Gn in the crossing position 40. Therefore, a document having a feed-direction length shorter than the above-described loop-shaped feed distance is considered as a document which can be fed for double-sided scanning by the ADF 3.

In the present aspect, a judgment as to whether the document G1 being delivered is a document that can be delivered for double-sided scanning by the ADF 3 is, when it is judged that the motor 67 has been driven the predetermined number of steps C1 (S103 (Y)), made by judging whether the second front sensor 53 is in an on state (S104). Such a judgment is made based on an on/off signal of the second front sensor 53 to be inputted to the control part 60. When the motor 67 is driven the number of steps C1 mentioned above, this means that the feed-direction leading end of the document G1 has arrived at the position Y as shown in FIG. 39. At this time, as shown in FIG. 39, when the document G1 is longer than the double-sided readable feed-direction length, the second front sensor 53 maintains an on state. That is, the second front sensor 53 detects the feed-direction trailing end side of the document G1. In this case, it is judged by the control part 60 that the document G1 is a document that cannot be delivered for double-sided scanning. However, when the second front sensor 53 is off (S104 (N)), the control part 60 judges the document G1 as a document both sides of which can be scanned. In this case, the control part 60 continues scanning the first side of the document G1, and as shown in FIG. 22, carries out bidirectional feeding, second side image scanning, bidirectional feeding, and sheet discharging (S105).

On the other hand, when it is judged that the document G1 is a document which cannot be delivered for double-sided scanning (S104 (Y)), the control part 60 controls the rotation direction of the motor 67 so as to guide the document G1 to the feed path leading to the sheet discharge tray 31 without guiding it to the bidirectional feed path 39. Concretely, the control part 60 switches the rotation of the motor 67 from a CCW rotation to a CW rotation (S106). Such switching control of the rotation direction of the motor 67 is realized by changing the currently set double-sided scanning mode to the simplex scanning mode. As a result of a change in the scanning mode, the CPU 61 of the control part 60 carries out drive control of the motor 67 in accordance with the scanning mode after switching, that is, the one side scanning mode.

When the rotation of the motor 67 is switched from a CCW rotation to a CW rotation as such, the drive force transmission mechanism 170 is thereby gear-switched, and the position of the guide flap 50 is changed from the second guiding position to the first guiding position. Concretely, in order to switch the rotation of the motor 67 from a CCW rotation to a CW rotation, the CPU 61 of the control part 60 outputs a CW rotation instruction after outputting a stop instruction to the motor 67. At this time, irrespective of the rotation direction of the motor 67, the drive force transmission mechanism 120 transmits a drive force in the feed direction to the respective feed rollers 35A, 35B, 35C, and 35D and sheet discharge roller 36. Therefore, even after the rotation of the motor 67 has been switched, the respective feed rollers 35A, 35B, 35C, and 35D and sheet discharge roller 36 rotate in the feed direction. The switching of the guide flap 50 is carried out before the feed-direction leading end of the document G1 arrives at the connecting position 38. For this reason, the document G1 is not damaged even when the position of the guide flap 50 is changed. When the guide flap 50 is switched as such to thereby continue delivery of the document G1, the document G1, as shown in FIG. 40, is delivered toward the sheet discharge tray 31 along the lower portion of the document feed path 32 without being guided to the bidirectional feed path 39 side, and is discharged to the sheet discharge tray 31.

In this manner, before the leading end of the document Gn fed from the sheet feed tray 30 to the document feed path 32, in other words, before the document Gn being delivered advances into the bidirectional feed path 39, whether the document Gn being delivered is a document both sides of which can be scanned can be judged based on the detect signal of the second front sensor 53. This can prevent, when a document that cannot be delivered for double-sided scanning is fed, the document against damage or from being jammed.

Even during the time that the position of the guide flap 50 is changed from the second guiding position to the first guiding position and the document G1 is being delivered toward the sheet discharge tray 31, image scanning by the image read unit 22 is continued without being interrupted. That is, the image read unit 22 continues image scanning until the feed-direction trailing end passes through the scan point, assuming that the document G1 is being delivered at a given speed.

When the document G1 is further delivered and the feed-direction trailing end of the document G1 passes through the rear sensor 54, the rear sensor 54 detects the feed-direction trailing end of the document G1 and is thereby turned off. After the document G1 has been delivered for a given number of steps since the rear sensor 54 was turned off, the control part 60 judges that the feed-direction trailing end of the document G1 has passed through the scan point. Based on this judgment, image scanning of the first side of the document G1 by the image read unit 22 is ended (S107).

Image data of the first side of the document G1 scanned by the image read unit 22 is stored in a given area of the RAM 63. The control part 60 not only writes the image data in the RAM 63 but also writes a variable indicating that image scanning of the first side has ended and the image data has been stored into a given area of the RAM 63. This variable is a variable indicating "end of scanning of the first side" or "end of scanning of the second side" and is used as scanning state information.

Meanwhile, as described above, the motor 67 is temporarily stopped when the above-mentioned stop instruction is outputted to the motor 67. Thereby, the document in the document feed path is temporarily stopped. And, even when the above-mentioned CCW rotation instruction is outputted and a CW rotation of the motor 67 is begun, a gear loss (drive loss) occurs such that no drive force of the motor 67 is transmitted to the respective transfer rollers 35A, 35B, 35C, and 35D and sheet discharge roller 36 until the planetary gear 126 of the planetary gear unit 120 engages with the transmission gear 128 after disengaging from the transmission gear 129. During occurrence of this gear loss, the motor 67 substantially slips. Due to occurrence of the gear loss, the document G1 temporarily stops in the document feed path 32. In the present aspect, even during the time that the document G1 stops due to the above-mentioned gear loss, the image read unit 22 continues image scanning assuming that the document G1 is being delivered at a given feed speed. Therefore, of the scanned image of the first side of the document G1, only a part scan during the stoppage of the document G1 is expressed as an image elongated in the feed direction (hereinafter, referred to as an "elongated image"). However, such an elongated image is corrected by an image correction processing (S108) to be described later.

Figure 44A:
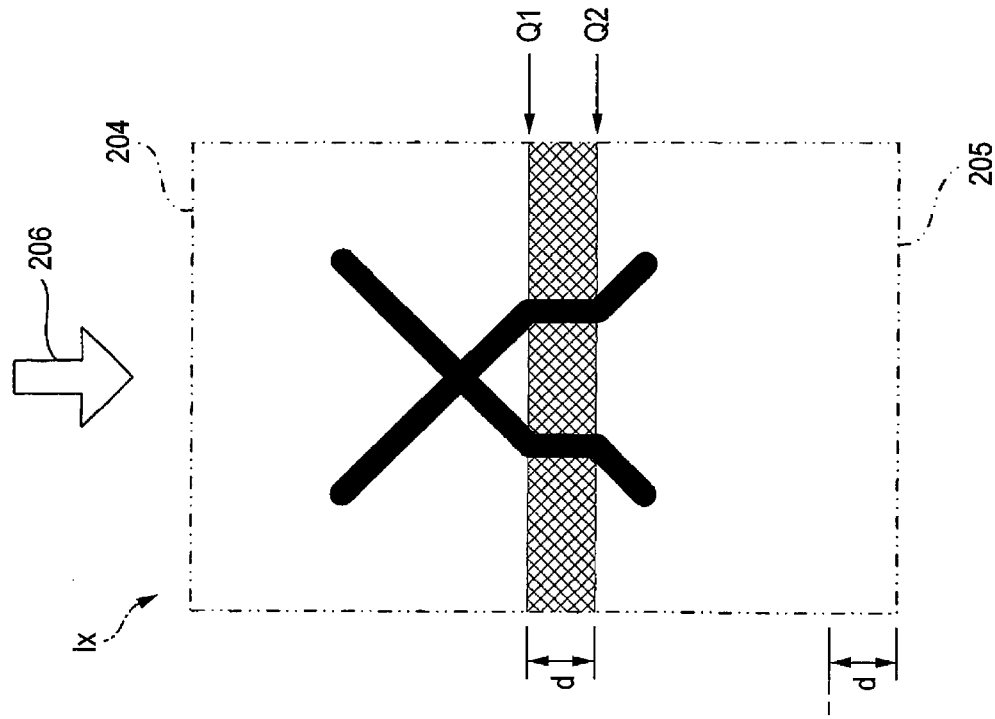
FIG. 44A is a view showing an example of a document of which both sides cannot be scanned.
Figure 44B:
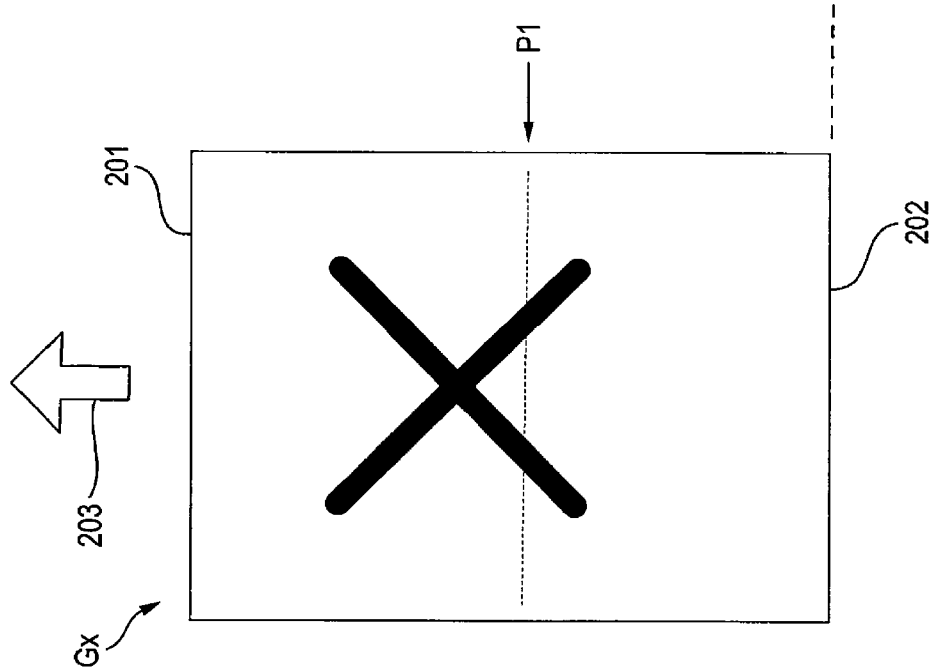
FIG. 44B is a view showing an example of a scanned image Ix of the document.
Figure 45:
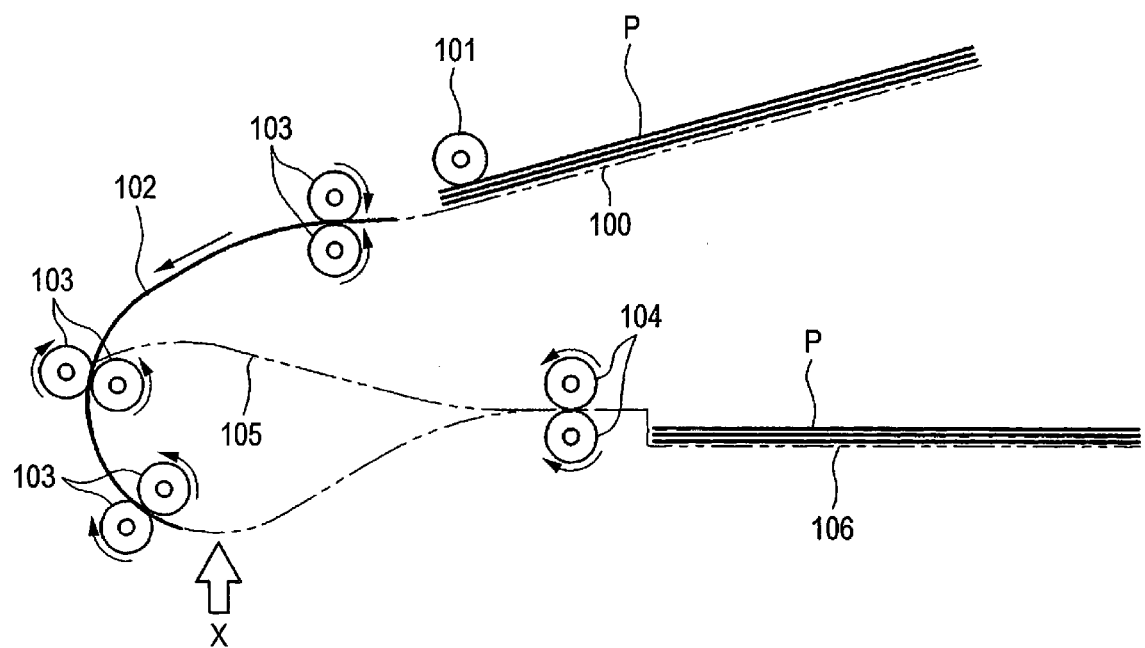
FIG. 45 is a typical view showing a document feed for double-sided scanning by a conventional document feeder.
Figure 46:
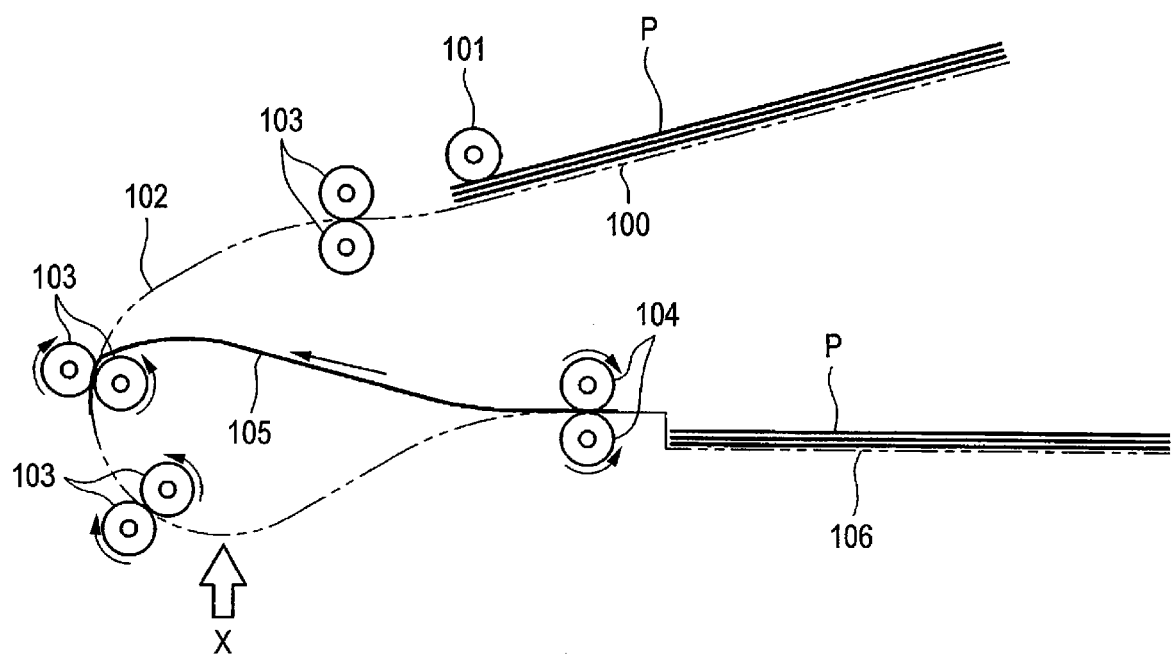
FIG. 46 is a typical view showing a document feed for double-sided scanning by a conventional document feeder.

Here, an example of a case where a document Gx (being a document both sides of which cannot be scanned, with an alphabetical letter "X" described at the center) is delivered by the ADF 3 for double-sided scanning, description will be given of the above-mentioned elongated image. Supposing that the rotation direction of the motor 67 was switched when the feed-direction leading end 201 of the document Gx was delivered up to a P1 point after passing through the scan point, a scanned image Ix (see FIG. 44B) read until the rotation direction of the motor 67 is switched is coincident with the image expressed on the document Gx from a scanning-direction front end 204 of the image Ix to a point Q1 corresponding to the above-mentioned P1. However, from the point Q1 until the slip resulting from switching of the motor 67 is canceled (to a point Q2), the image of the point P1 of the document Gx is continuously scanned. Therefore, the scanned image Ix, as shown in FIG. 44B, is elongated from the point Q1 to the point Q2. A range elongated across the entire width of the document Gx by a distance d from the point Q1 to the point Q2 is expressed as an elongated image (a shaded range in FIG. 44B) on the scanned image Ix.

When the image scanning of the first side of the document G1 by the image read unit 22 ends, subsequently, an image correction processing to correct image data of the first side written into the RAM 63 is carried out by the control part (S108). Hereinafter, with reference to a flowchart shown in FIG. 41, description will be given of the above-mentioned image correction processing.

Figure 41:
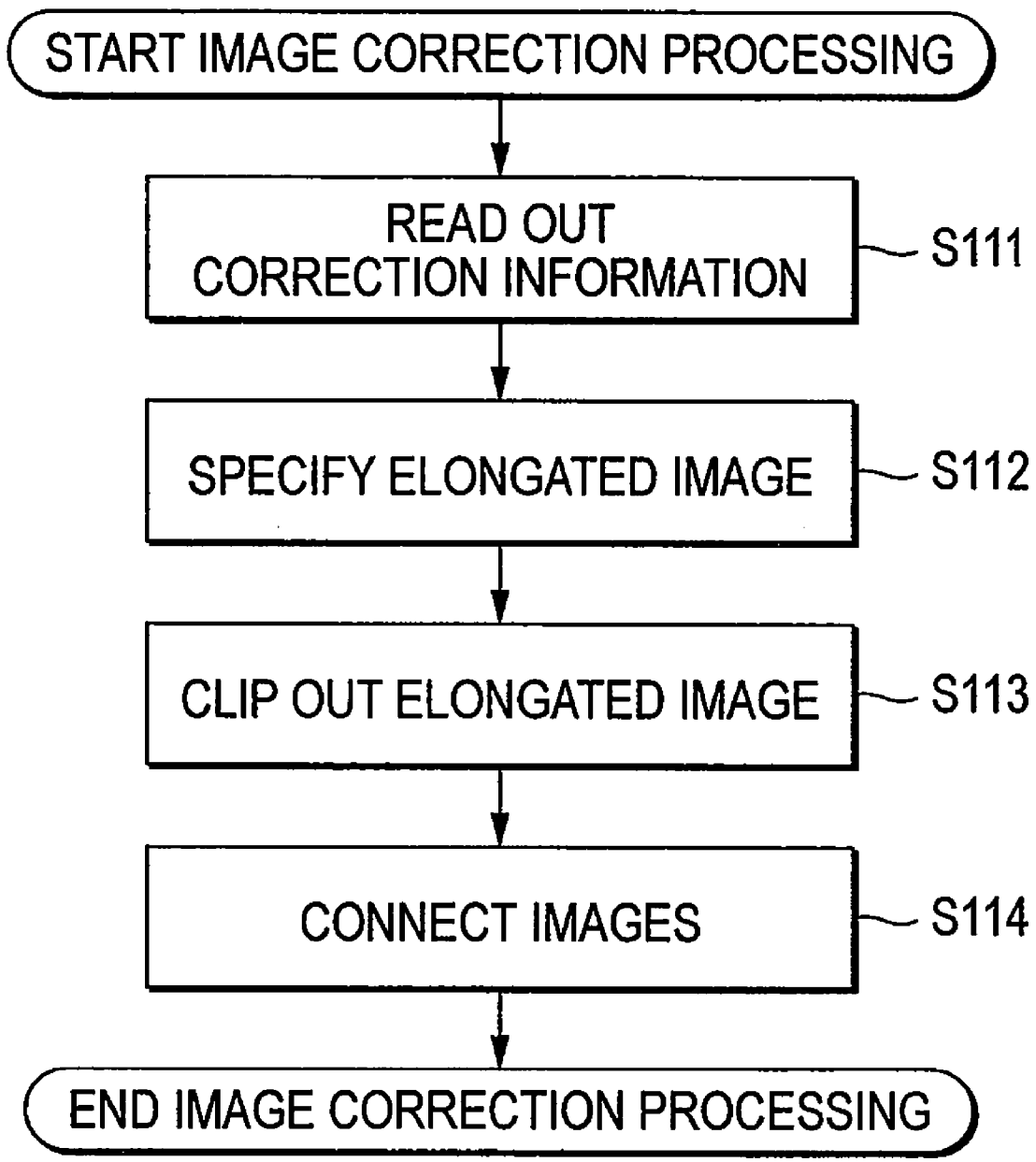
FIG. 41 is a flowchart showing an example of procedures for an image correction processing executed by a control part.

FIG. 41 is a flowchart showing an example of procedures for an image correction processing executed by the control part 60. In this image correction processing, first, correction information (an example of drive loss information) stored in the RAM 63 is read by the CPU 61 of the control part 60, and the correction information is acquired (S111). Here, the correction information is information to correct an elongated image that is produced when the rotation direction of the motor 67 is switched in the middle of scanning the first side of the document G1. For example, included is information to specify a start position and an elongated distance of the elongated image in the image data of the entire first side being scanned. Concretely, the number of steps required until the point P1 of the document Gx arrives at the scan point after the feed-direction leading end 201 of the document Gx in FIG. 44A passes through the scan point, the number of steps equivalent to the distance d from the point Q1 being the start position of the shaded area of the scanned image Ix in FIG. 44B to the point Q2, and the like correspond to the correction information. In addition, the start position Q1 of the shaded area in the scanned image Ix can be specified from the former number of steps, and the width in the scan direction of the shaded area can be specified from the latter number of steps. Such correction information can be acquired by actually measuring the start position and image range from image data having been scanned by feeding in advance a document both sides of which cannot be scanned. In addition, since the above-mentioned gear loss has a slight error from one apparatus to another, it is desirable to make the RAM 63 store, as correction information, average actual measurement values of the start position and image range acquired from a plurality of pieces of image data.

Next, the start position and elongated distance of the elongated image is specified based on the scan correction information (S111). Then, the above-mentioned specified elongated image is clipped out from the entire scanned image (S112), and a process to connect image data having been separated into two parts as a result of clipping of the elongated image is executed in the control part 60 (S113). These respective image processes are executed by the CPU 61 in a work are a allocated to the RAM 63.

Since such an image correction processing is carried out, the elongated image is deleted even when a document having a size that does not allow double-sided scanning is fed. Thereby, degradation in image quality of the scan image is prevented.

In the present aspect, it has been provided to use as correction information actual measurement data acquired by feeding in advance a document having a length that does not allow delivery for double-sided scanning and actually measuring the start position and image range from image data having been scanned in advance, however, it can also be considered to, for example, measure the number of slipping steps of the motor 67 that slips during occurrence of the gear loss and use the number of slipping steps as one of the correction information. The image range in the feed direction of the elongated image is coincident with the distance corresponding to the number of slipping steps of the motor 67 that slips during occurrence of a gear loss. Accordingly, by using such a number of slipping steps as correction information, the range of the elongated image can be correctly specified. The above-mentioned number of slipping steps can be measured by providing a torque sensor on the output shaft of the motor 67. In detail, it can be acquired by distinguishing a slip of the motor 67 based on a change point in torque read from an output signal of the torque sensor and determining the number of slipping steps of the motor 67 from the time of this slip. As a matter of course, it is possible to apply, as the torque sensor, various sensors such as a displacement sensor composed of an exciting coil and a detection coil that reads a change in magnetic resistance.

Moreover, when a servomotor is employed as the motor 67 and the motor is driven by closed-loop control to control motor rotation by feeding back of the number of rotations of the motor, it is also possible to monitor load current or load voltage of the motor and determine the number of slipping steps based on a change point thereof.

Figure 42:
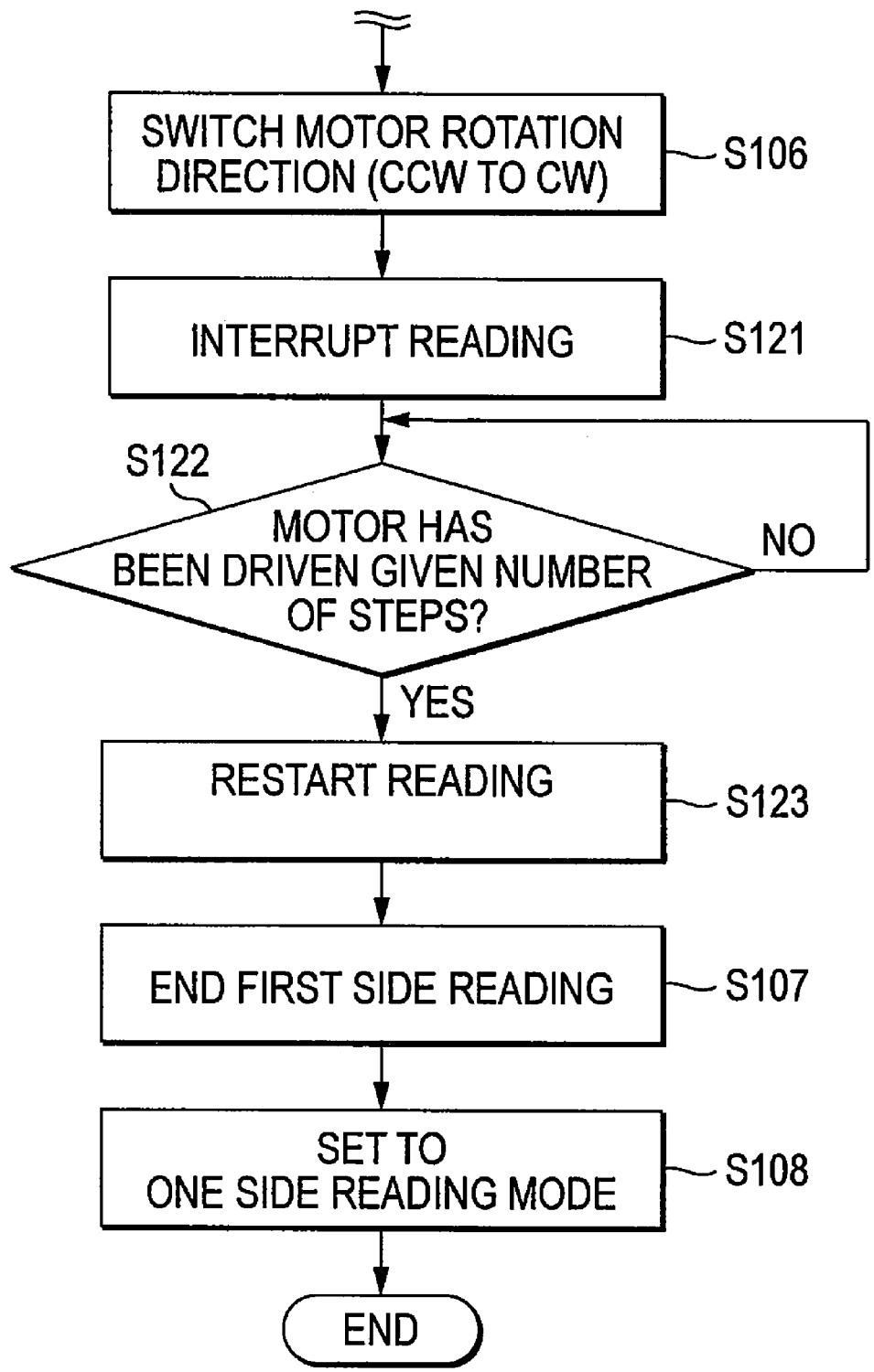
FIG. 42 is a flowchart showing an example of procedures for a first image processing executed by a control part.
Figure 43:
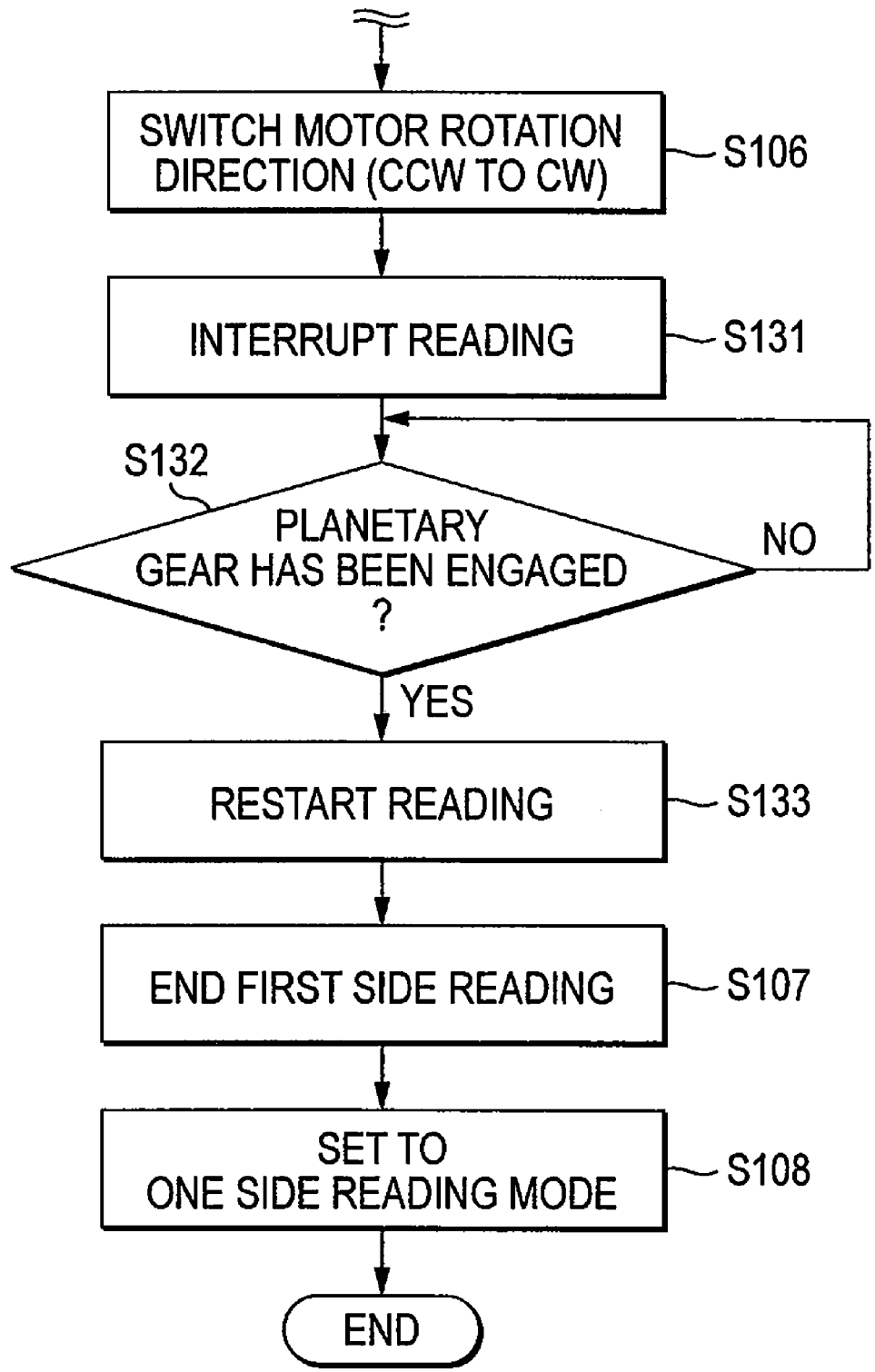
FIG. 43 is a flowchart showing an example of procedures for a second image processing executed by a control part.

In the aforementioned aspect, a description has been given of a correction example to remove an elongated image from the image data of the first side having once been scanned, however, it can also be considered to apply an image processing example to remove the elongated image from a scanned image by interrupting the scanning operation at the time of image scanning of the document G1. In the following, description will be given, with reference to FIG. 42 and FIG. 43, of a first image processing example and a second image processing example to be replaced by the above-mentioned image correction processing. Here, FIG. 42 is a flowchart showing an example of procedures for a first image processing executed by the control part 60, and FIG. 43 is a flowchart showing an example of procedures for a second image processing executed by the control part 60. For the first image processing and the second image processing, after the processes of steps S101 to S106 in the flowchart shown in FIG. 38 are conducted, processes from step S121 onward in FIG. 42 or from step 131 onward in FIG. 43 are conducted. Therefore, in FIG. 42 and FIG. 43, shown are flowcharts in which procedures from steps S101 to S105 are omitted.

First, description will be given of the first image processing example with reference to FIG. 42. When processes are conducted in sequence from step S101 in the flowchart shown in FIG. 39 and a motor rotation direction switching process is conducted in step S106, a process to interrupt the scanning operation by the image read unit 22 is conducted (S121). Concretely, almost simultaneously with switching of the rotation direction, the control part 60 outputs an interruption instruction to the image read unit 22. Thereby, the scanning operation by the image read unit 22 is interrupted. When the rotation direction of the motor 67 is switched, the planetary gear 126 is disengaged to slip the motor 67, therefore, by interrupting the scanning operation by the image read unit 22 simultaneously with switching of the rotation direction of the motor 67, image scanning is interrupted at the time that the document G1 stops.

In the middle of interruption of image scanning, it is judged by the CPU 61 of the control part 60 whether the motor 67 has been driven a given number of steps C2 (S122). Here, the number of steps C2 is a number of slipping steps of the motor 67 due to a gear loss that occurs at the time of switching of the rotation direction, and this is measured in advance by the measuring method using a change point in torque or a change point in load current or load voltage mentioned above and is recorded in the RAM 63 as threshold information. When it is judged that the motor 67 has been driven the number of slipping steps C2 (S122 (Y)), the control part 60 outputs a scan instruction to the image read unit 22 to restart image scanning. Thereafter, when the processes of steps S107 and S108 mentioned above are conducted, a series of image processing ends.

In this manner, since image scanning is interrupted for rotations equivalent to the number of slipping steps C2, image scanning is not conducted during the time that the document G1 has stopped at the time of slipping of the motor 67. Accordingly, during the image scanning process of the first side, an image corresponding to the number of slipping steps C2 is skipped. As a result, the elongated image never appears in the scanned image.

In the aforementioned step S122, it has been provided to use, as a threshold for judgment, the number of slipping steps stored in advance in the RAM 63, however, it may also be possible to use, as a threshold, the number of slipping steps of the motor 67 determined by distinguishing the change point in real time by, for example, the measuring method using a change point in torque or a change point in load current or load voltage mentioned above.

Subsequently, description will be given of the second image processing example with reference to FIG. 43. In the aforementioned first image processing example (see FIG. 42), it has been provided to restart image recording at the time that it is judged that the motor 67 has been driven the number of slipping steps C2, whereas in the present image processing example, image scanning by the image read unit 22 is interrupted almost simultaneously with switching of the rotation direction of the motor 67 (S131), and then, when it is detected that the planetary gear 126 has engaged with the transmission gear 128 (S132 (Y)), image scanning by the image read unit 22 is restarted (S133). A judgment as to disengagement and engagement of the planetary gear 126 can be achieved by providing a detection unit such as an optical sensor in the rotation range of the planetary gear 126 and support arm 125 and monitoring a detection signal thereof by the control part 60. In this manner, by directly detecting disengagement and engagement of the planetary gear 126, the presence or absence a slip of the motor 67 as well as the presence or absence of a document stop can be correctly judged. Thereby, it becomes possible to reliably remove an elongated image in a scanned image.

In the present image reading apparatus 1, the bidirectional feed path 39 to feed again the document Gn to the document feed path 32 has been formed in such a manner that it extends from the connecting position 38 on the downstream side of the scan point of the document feed path 32 and crosses at the crossing position 40 on the upstream side of the scan point. However, the feed path of the bidirectional feed path 39 is merely an example, and as a matter of course, the present invention is not limited to the feed path of the document feed path 32 and bidirectional feed path 39. Accordingly, it is possible to change the guide flap 46 and guide flap 47 appropriately according to the feed path of the bidirectional feed path, and moreover, for example, films that can be elastically deformed may be employed as guide members in place of the guide flaps 46 and 47.

What is claimed is:
1. An image reading apparatus comprising:
   a first feed path connected to a inlet from an outlet via a scanning position;
   a second feed path whose one end is connected to the first feed path at a connecting position on a feed-direction downstream side of the scan point;
   a detection unit that detects a presence or absence of a document;
   a feed system provided at least on the first feed path;
   an image scanning unit that scans an image of a document fed by the feed system at the scanning position;
   a switching unit that is provided at the connecting position and that switches a document feed path to either the second feed path or to an outlet;
   a drive source that is controlled so as to be rotary-drivable in both forward and backward directions and that applies a drive force to at least the feed system and the switching unit;
   a drive force transmission unit that transmits a drive force to switch the document feed path to the document discharge path side from the drive source to the switching unit based on a one-direction rotation of the drive source, transmits a drive force to switch the document feed path to the second feed path side from the drive source to the switching unit based on an other-direction rotation of the drive source, and transmits a document-feed-direction drive force irrespective of the rotation direction of the drive source;
   a control unit that has a first mode that feeds a document from the first feed path to the document discharge portion by rotating the drive source in one direction and a second mode that feeds a document from the first feed path to the second feed path by rotating the drive source in the other direction, and switches a current mode from the second mode to the first mode by controlling the rotation direction of the drive source based on a detection result by the detection unit during the document fed in the second mode; and
   an image modification unit that modifies the image read by the image read unit based on drive loss information acquired with regard to a drive loss of the drive force transmission unit occurring at a time of switching the current feed mode by the control unit.

2. The image reading apparatus according to claim 1, wherein
   when a feed-direction leading end of a document is determined to arrive at a given position on a feed-direction upstream side of the connecting position of the first feed path and on a feed-direction downstream side of the scan point, and that the document fed along the first feed path is longer than a predetermined length based on a detection result by the detection unit, the control unit shifts the current feed mode from the second feed mode to the first feed mode by controlling the rotation direction of the drive source.

3. The image reading apparatus according to claim 1, wherein
the drive force transmission unit includes a sun gear to which a drive force is transmitted from the drive source and a planetary gear engaged with the sun gear, and the planetary gear is engaged with a transmission gear corresponding to the rotation direction of the drive source to thereby transmit a drive force to the feed system.

4. The image reading apparatus according to claim 3, wherein
the drive force transmission unit comprises:
a first transmission gear to which a drive force is transmitted from the drive source;
a sun gear formed in two stages of a small-diameter gear and a large-diameter gear, the large-diameter gear being engaged with the first transmission gear;
a planetary gear engaged with the small-diameter gear of the sun gear;
a second transmission gear and a third transmission gear respectively engaged with the planetary gear and engaged with each other;
a fourth transmission gear that transmits a drive force to the feed system as a result of the second transmission gear or the third transmission gear being engaged therewith; and
a rotation member that pivotally supports the planetary gear, is pivotally supported so as to rotate in a same direction as a rotation of the sun gear, and is freely rotatably provided coaxially with the sun gear, so as to disengage the planetary gear from the second transmission gear and also engage the planetary gear with the third transmission gear when the rotation member is rotated in one direction, and so as to disengage the planetary gear from the third transmission gear and also engage the planetary gear with the second transmission gear when the rotation member is rotated in the other direction.

5. The image reading apparatus according to claim 3, further comprising:
a storage unit that stores a number of slipping steps equivalent to a slip of the drive source when the planetary gear is engaged and disengaged with respect to the transmission gear at the time of switching in the rotation direction of the drive source as the drive loss information, when the drive source is driven by a pulse driving method; and
a first drive loss information acquisition unit that reads out information concerning the number of slipping steps stored in the storage unit to acquire the drive loss information.

6. The image reading apparatus according to claim 1, further comprising:
a torque monitoring unit that monitors a drive torque transmitted from the drive source to the drive force transmission unit; and
a second drive loss information acquisition unit that acquires drive loss information concerning a drive loss of the drive force transmission unit based on a fluctuation in the torque monitored by the torque monitoring unit.

7. The image reading apparatus according to claim 1, further comprising:

a load monitoring unit that monitors a load on the drive source based on a current value supplied to the drive source; and
a third drive loss information acquisition unit that acquires drive loss information concerning a drive loss of the drive force transmission unit based on a fluctuation in the load monitored by the load monitoring unit.

8. The image reading apparatus according to claim 1, wherein
the image modification unit deletes an image corresponding to the drive loss from the image read by the image read unit.

9. The image reading apparatus according to claim 1, wherein
the image modification unit skips an image corresponding to the drive loss from the image reading by the image read unit.

10. The image reading apparatus according to claim 1, wherein
the second feed path is formed so as to be extended from the connecting position and crosses at a crossing position on a feed-direction upstream side of the scan point of the first feed path.

11. An image reading apparatus that is operable in a first mode that guides a document from an input to an endpoint located above the input through a scan point and a second mode that guides the document during the document fed from the endpoint to the input through the scan point, the image reading apparatus comprising:
a determination unit that determines whether or not a document processing is operable, during the document fed in the first mode;
a control unit that switches a current mode from the first mode to the second mode when the document processing is unoperable in the first mode; and
a detection unit that detects a length of the document,
wherein the determination unit determines whether or not the document processing is operable based on a detection result by the detection unit.

12. The image reading apparatus according to claim 11, wherein
the detection unit is located upstream side of the scan point.

13. The image reading apparatus according to claim 11, further comprising:
a drive source;
a first drive force transmission unit that transmits a drive force from the drive source to a transfer system in the first mode; and
a second drive force transmission unit that transmits a drive force from the drive source to a feeding unit in the first mode in the second mode, wherein
at least one part of the transfer system rotates in one direction in the first mode and rotates in another direction in the second mode.

14. The image reading apparatus according to claim 11, wherein
the determination unit determines whether or not the document processing is operable, before the document arrives the scan point.

* * * * *